US007650065B2

(12) United States Patent
Takahashi

(10) Patent No.: US 7,650,065 B2
(45) Date of Patent: Jan. 19, 2010

(54) IMAGE STABILIZER, LENS APPARATUS AND IMAGER APPARATUS

(75) Inventor: Tatsuyuki Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 333 days.

(21) Appl. No.: 11/446,269

(22) Filed: Jun. 5, 2006

(65) Prior Publication Data

US 2007/0009244 A1 Jan. 11, 2007

(30) Foreign Application Priority Data

Jul. 11, 2005 (JP) ............................. 2005-201826

(51) Int. Cl.
*G03B 17/00* (2006.01)
(52) U.S. Cl. ........................................ 396/55; 359/556
(58) Field of Classification Search .................. 396/55; 359/554–557; 348/208.1, 208.2, 208.5, 208.11; 310/354
See application file for complete search history.

(56) References Cited

U.S. PATENT DOCUMENTS

| | | | | | |
|---|---|---|---|---|---|
| 4,644,205 | A | * | 2/1987 | Sudo et al. | .................. 310/90.5 |
| 4,834,006 | A | * | 5/1989 | Goto | ........................... 112/103 |
| 5,266,988 | A | * | 11/1993 | Washisu | ...................... 396/55 |
| 5,689,369 | A | | 11/1997 | Noguchi | |
| 5,723,933 | A | | 3/1998 | Grundl et al. | |
| 5,835,799 | A | * | 11/1998 | Washisu | ...................... 396/55 |
| 5,880,455 | A | | 3/1999 | Otaki et al. | |
| 5,883,742 | A | | 3/1999 | Kamata | |
| 5,910,859 | A | | 6/1999 | Takahashi et al. | |
| 5,974,269 | A | * | 10/1999 | Sato et al. | ...................... 396/55 |
| 5,978,137 | A | | 11/1999 | Takahashi et al. | |
| 5,995,762 | A | | 11/1999 | Enomoto et al. | |
| 6,052,240 | A | * | 4/2000 | Ikari | ........................... 359/819 |

(Continued)

FOREIGN PATENT DOCUMENTS

DE 198 21 224 A1 11/1998

(Continued)

OTHER PUBLICATIONS

Non-final Office Action in related U.S. Appl. No. 11/446,268, dated Aug. 18, 2008 (11 pages).

(Continued)

*Primary Examiner*—Christopher E Mahoney
*Assistant Examiner*—Linda B Smith
(74) *Attorney, Agent, or Firm*—Finnegan, Henderson, Farabow, Garrett and Dunner, L.L.P.

(57) ABSTRACT

An image stabilizer can steady blurry images. The image stabilizer includes first and second Hall elements and a yoke with a magnet fixed thereto, the yoke including a projected portion to escape magnetic flux from the edge portion of the magnet. In the state in which one of magnets and a coil supporting holder are fixed to a moving frame and in which the optical axis of the correcting lens is matched with the optical axis of the lens system, the first and second Hall elements are moved to the first and second directions so that the first and second Hall elements are properly positioned at the positions in which magnetic force received by the two Hall elements from the magnet becomes a reference value, whereafter the other of the magnets and the coil supporting member are fixed to a supporting frame.

7 Claims, 39 Drawing Sheets

U.S. PATENT DOCUMENTS

| | | | |
|---|---|---|---|
| 6,057,963 | A | 5/2000 | Hirunuma et al. |
| 6,226,123 | B1 | 5/2001 | Kanai et al. |
| 6,327,433 | B1 * | 12/2001 | Ishikawa et al. ............... 396/55 |
| 6,456,444 | B1 * | 9/2002 | Yumiki et al. ............... 359/696 |
| 6,587,270 | B2 | 7/2003 | Terada |
| 6,819,500 | B2 * | 11/2004 | Tsuzuki ..................... 359/696 |
| 6,856,345 | B1 | 2/2005 | Yamamoto et al. |
| 7,009,321 | B1 | 3/2006 | Mahoney et al. |
| 7,330,405 | B2 * | 2/2008 | Matsui .................... 369/44.15 |
| 2001/0014213 | A1 | 8/2001 | Terada |
| 2003/0184878 | A1 | 10/2003 | Tsuzuki |
| 2004/0245861 | A1 | 12/2004 | Miyajima et al. |
| 2006/0285840 | A1 | 12/2006 | Takahashi |

FOREIGN PATENT DOCUMENTS

| | | |
|---|---|---|
| JP | 3-186823 | 8/1991 |
| JP | 03-188430 | 8/1991 |
| JP | 2000-258813 | 9/2000 |
| JP | 2003-270695 | 9/2003 |

OTHER PUBLICATIONS

Non Final Office Action in related U.S. Appl. No. 11/446,268, dated Feb. 12, 2009 (14 pages).

Notice of Allowance with Notice of Allowability dated Jan. 25, 2008 (11 pages).

International Search Report from the European Patent Office mailed Nov. 2, 2009, for International Application No. EP 06 25 2903.

* cited by examiner

Yoke with Projected Portion

Yoke without Projected Portion

R' = Differentiated Value of R (Skew)

$$\text{Magnetic Flux Density } \Delta = \frac{\text{Output of Hall Element}}{\text{Moving Distance}} \text{ (Gauss)}$$

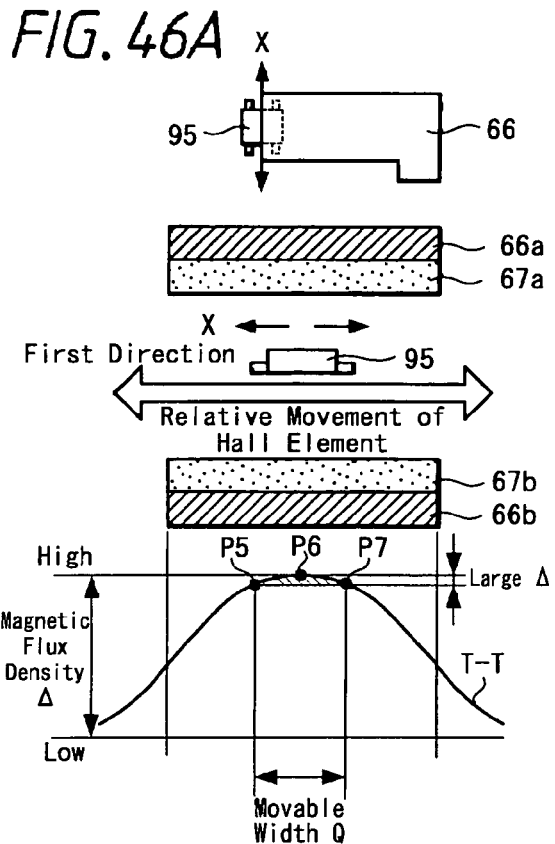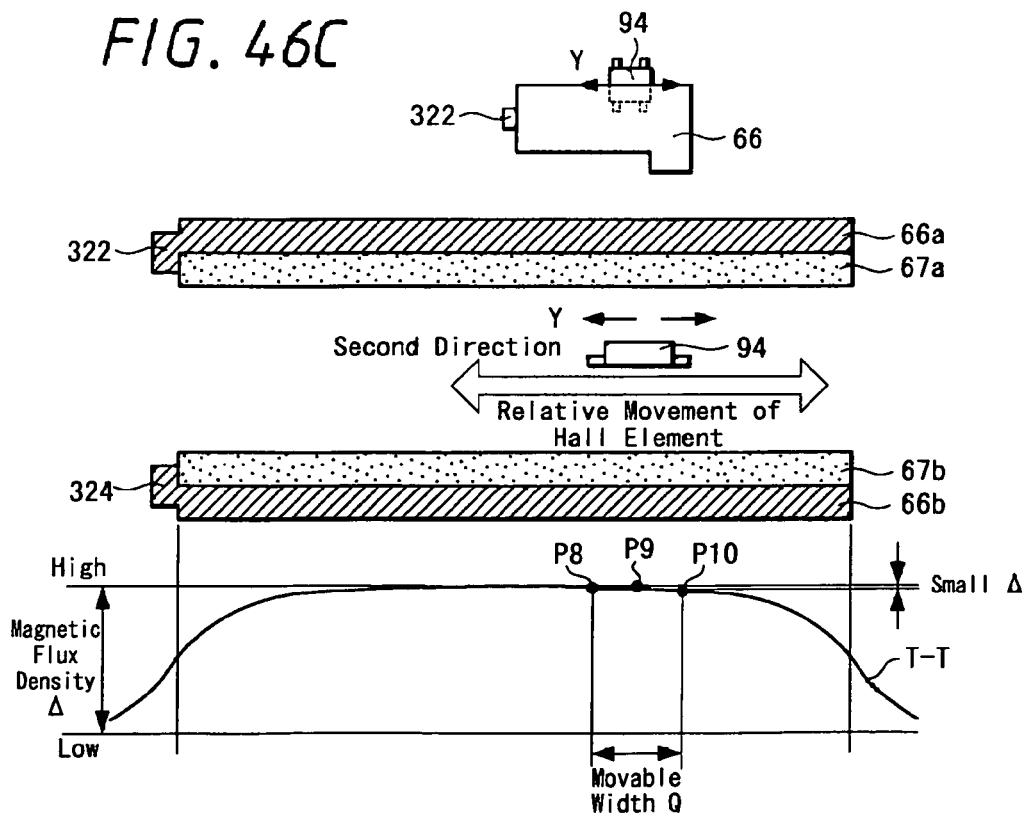

IMAGE STABILIZER, LENS APPARATUS AND IMAGER APPARATUS

CROSS REFERENCES TO RELATED APPLICATIONS

The present invention contains subject matter related to Japanese Patent Application JP 2005-201826 filed in the Japanese Patent Office on Jul. 11, 2005, the entire contents of which being incorporated herein by reference.

BACKGROUND OF THE INVENTION

1. Field of the Invention

The present invention relates to an image stabilizer capable of stabilizing blurry images produced from movement and vibration upon shooting by moving a correcting lens in the direction perpendicular to an optical axis of a lens system so that the optical axis of the correcting lens is matched with the optical axis of the lens system, a lens apparatus including such an image stabilizer and an imager apparatus including such a lens apparatus.

2. Description of the Related Art

In recent years, performance of an imager apparatus such as a digital still camera and a video camera has been improved remarkably, and it became possible for anyone to easily shoot still pictures and moving pictures with high image quality and with high efficiency. Improved efficiency of such an imager apparatus owes to high performance of a lens, a CCD (charge-coupled device), that is, a solid-state image pickup device and an image processing circuit.

However, even though the lens, the CCD and the like can be made higher in performance, if hand shake occurs in photographer's hands by which a camera (imager apparatus) is held, blurring occurs in images with high resolution and shot images are blurred unavoidably. To solve this problem, a part of relatively expensive cameras is equipped with an image stabilizer capable of correcting images blurred by camera shake and the like upon shooting. However, cameras that require such image stabilizer are not professional-level cameras, and it is to be understood that image stabilizers are indispensable to consumer cameras for a large number of amateur photographers with less shooting experience.

In general, a demand for smaller and lighter cameras (imager apparatus) is strong and most of photographers like cameras which are light in weight and easy to carry. However, since an image stabilizer according to the related art is comparatively large in size, when such large image stabilizer is mounted on a camera body, the whole of the camera becomes large in size unavoidably, which is against a demand for making cameras smaller in size and lighter in weight. In addition, the image stabilizer according to the related art requires a large number of parts and a problem arises, in which a cost of cameras is increased as the number of parts is increased.

Cited Patent Reference 1, for example, has described this kind of an image stabilizer according to the related art. The Cited Patent Reference 1 has described an image stabilizer for use with optical equipment such as a video movie and a lens-barrel of lens using the image stabilizer. The image stabilizer described in this Cited Patent Reference 1 (hereinafter referred to as a "first related-art example") is characterized as follows. In an image stabilizer capable of correcting blurred images by moving a part of a shooting lens relative to the optical axis within the vertical plane, this image stabilizer includes a lens holding frame for holding a correcting lens, a first guiding mechanism for guiding movement of the lens holding frame to the first direction relative to the optical axis within the vertical plane and a second guiding mechanism for guiding movement of the lens holding frame to the second direction perpendicular to the first direction. This image stabilizer further includes a first driver for driving the lens holding frame to the first direction, a second driver for driving the lens holding frame to the second direction and a position detector for detecting the position of the correcting lens. The first guiding mechanism and a part of the second driver or the second guiding mechanism and a part of the first driver are located at the position in which they are overlapping with each other as seen from the optical axis direction.

According to the image stabilizer having the above arrangement described in the Cited Patent Reference 1, since the guide shaft for moving the correcting lens and the coil or the magnet for driving the guide shaft are located at the position in which they are overlapping with each other when a pitch shifter and a yaw driver or a yaw shifter and a pitch driver are seen from the optical axis direction, effects such as to reduce the width and height of the image stabilizer can be expected.

Cited Patent Reference 2, for example, has described a second example of the image stabilizer according to the related art. The Cited Patent Reference 2 has described an image stabilizer for use with optical equipment such as a video movie and a lens-barrel of lens using the image stabilizer. The image stabilizer described in this Cited Patent Reference 2 (hereinafter referred to as a "second related-art example") is characterized as follows. In an image stabilizer capable of correcting blurred images by moving a part of a shooting lens relative to the optical axis within the vertical plane, this image stabilizer includes a lens holding frame for holding a correcting lens. The correcting lens includes a first restricting portion for restricting a movement range of the correcting lens, a first guiding mechanism for guiding a movement of the lens holding frame to the first direction relative to the optical axis within the vertical plane and a second guiding mechanism for guiding a movement of the lens holding frame to the second direction perpendicular to the first direction. The image stabilizer further includes a first driver for driving the lens holding frame to the first direction, a second driver for driving the lens holding frame to the second direction, a position detector for detecting the position of the correcting lens and a fixing mechanism having a second restricting portion engaged with the first restricting portion to restrict a moving range of the correcting lens. The first and second restricting portions are located on the inside of the first and second drivers as well as nearly concentrically.

According to the image stabilizer having the above arrangement described in the Cited Patent Reference 2, since the movable restricting members are located between the correcting lens and the drivers on nearly a concentric circle relative to the optical axis and non-engagement members to be engaged with the restricting members are provided on a fixed frame in order to restrict the movement range of the correcting lens, the movable range of the correcting lens can be restricted within the movable portion. Thus, effects such as to construct a small image stabilizer can be expected.

Also, Cited Patent Reference 3, for example, has described a third example of the related-art image stabilizer. The Cited Patent Reference 3 has described a vibration isolator mounted on a camera and the like, the vibration isolator for detecting vibration of comparatively low frequency and preventing blurry images by using the detected vibration as blurry image preventing information. A vibration isolator described in this Cited Patent Reference 3 (hereinafter referred to as a "third related-art example") includes a correcting optical mechanism located within a lens-barrel for holding a lens group and which deviates the optical axis of the lens group, a vibration detector for detecting vibration applied to the lens-barrel and a vibration isolation controller for driving the correcting optical mechanism based on a signal from the vibration detector to isolate vibration. The correcting optical mechanism includes a correcting lens, a fixed frame for fixing the correcting lens, a first holding frame for holding the fixed frame in such a manner that the fixed frame can be moved in the first direction different from the optical axis direction of the lens group, a second holding frame for holding the first holding frame in such a manner that the first holding frame can be moved in the second direction different from the optical axis direction and the first direction and which is fixed to the lens-barrel of the lens. The correcting optical mechanism further includes first and second coils for moving the first and second holding frames in the first and second directions, first and second drivers formed of first and second magnetic field generating members opposed to the first and second coils and first and second position detectors for detecting amounts in which the fixed frame and the first holding frame are moved in the first and second directions. At least one of the first and second magnetic field generating members and the first and second position detectors are provided on a fixed member fixed to the lens-barrel of lens and which contains the second holding frame.

According to the vibration isolator having the above arrangement described in the Cited Patent Reference 3, there can be expected the effect in which the vibration isolator can respond to vibrations up to high-frequency vibrations without increasing the cost and the large space.

[Cited Patent Reference 1]: Japanese Published Patent Application No. 2000-258813

[Cited Patent Reference 2]: Japanese Published Patent Application No. 2003-270695

[Cited Patent Reference 3]: Japanese Published Patent Application No. 3-186823

However, while the first to third related-art examples include the position detector to detect the position of the correcting lens, the position detector in any of the above cases is composed of a light-emitting device formed of a light-emitting diode (LED) and a light-receiving device formed of a position sensitive diode (PSD). In the case of the third related-art example, the light-emitting device is attached to a stator and the light-receiving device is attached to the second holding frame, and the position of the fixed frame relative to the first holding frame in the pitch direction may be detected in relation to the light-emitting device and the light-receiving device.

In this case, the light-emitting device and the light-receiving device should be positioned properly after they were attached to the stator and the second holding frame. Since the central portions of the light-emitting device and the light-receiving device could not be visually confirmed, it was difficult to properly position the light-emitting device and the light-receiving device and a problem arises, in which work efficiency required upon manufacturing is not so high. Also, since the position detector needs two kinds of special electronic devices such as the LED and the PSD, the number of parts is increased, which is not economical. Further, a problem arises, in which control of the whole of the apparatus in addition to the position detection becomes complex.

SUMMARY OF THE INVENTION

In the image stabilizer according to the related art, since the position detector is composed of the LED (light-emitting diode) and the PSD (position sensitive diode), it is difficult to properly position the LED and the PSD. Also, since it becomes necessary to control the LED and the PSD, a control mechanism therefore becomes complex and work efficiency required upon manufacturing process is not so high.

According to an aspect of the present invention, there is provided an image stabilizer in which a correcting lens including a driver having a coil and a magnet relatively movable and which is held to a moving frame by the driver in which one of the coil and magnet is fixed to the moving frame. Further, in this image stabilizer, the other is fixed to a supporting frame which movably supports the moving frame can be moved in a first direction perpendicular to an optical axis of a lens system and in a second direction perpendicular to the first direction and which is also perpendicular to the optical axis, an optical axis of the correcting lens is controlled so as to coincide with the optical axis of the lens system. This image stabilizer further includes a first Hall element for detecting positional information concerning the first direction of the correcting lens by detecting magnetic force of the magnet, a second Hall element for detecting positional information concerning the second direction of the correcting lens by detecting magnetic force of the magnet, a yoke with the magnet fixed thereto and having a projected portion to escape magnetic flux from an edge portion of the magnet. In this image stabilizer, the first and second Hall elements are positioned at positions at which magnetic force received by the first and second Hall elements from the magnet becomes a reference value by moving the first and second Hall elements to the first and second directions in the state in which one of the magnet and the coil is fixed to the moving frame. Further, the other of the magnet and the coil supporting member is fixed to the supporting frame and in which the optical axis of the correcting lens is made coincident with the optical axis of the lens system and in which the other of the magnet and the coil supporting member are fixed to the supporting frame.

According to the image stabilizer, the lens apparatus and the imager apparatus of the present invention, since the Hall elements are used as the position detectors, the magnets of the drivers can serve as the parts for supplying necessary information to the Hall elements as well. As a result, the number of parts required by the position detector can be decreased and control for correcting blurry images can be carried out easily and reliably. Further, since the yoke includes the projected portion, the magnetic flux of the yoke opposing the Hall element can be aggressively escaped to the projected portion and magnetic flux density near the projected portion can be kept substantially uniform in the direction parallel to the edge of the magnet and the like. Thus, when the moving frame is moved to the first direction, the change of the magnetic flux density of the second Hall element can be decreased greatly. Also, similarly when the moving frame is moved to the second direction, the change of the magnetic flux density of the first Hall element can be decreased greatly. As a consequence, mutual interference between the first and second Hall elements can be decreased greatly and position can be detected extremely accurately.

An image stabilizer, a lens apparatus including the image stabilizer and an imager apparatus including the lens apparatus can be realized by simple structures. According to these structures of the image stabilizer, the lens apparatus and the imager apparatus, since the Hall element is used as the position detector, the yoke that holds the magnet includes the projected portion and the magnetic flux of the yoke opposing the Hall element can be aggressively escaped to the projected portion, magnetic flux density near the projected portion can be kept substantially uniform in the direction parallel to the edge of the magnet and the like. Thus, when the moving frame is moved to the first direction, the change of the magnetic flux density of the second Hall element can be decreased greatly. Also, similarly when the moving frame is moved to the second direction, the change of the magnetic flux density of the first Hall element can be decreased greatly. As a consequence, mutual interference between the first and second Hall elements can be decreased greatly and position can be detected extremely accurately.

BRIEF DESCRIPTION OF THE DRAWINGS

FIGS. 36A and 36B are diagrams showing the image stabilizer shown in FIG. 34, wherein FIG. 36A is a plan view thereof and FIG. 36B is a bottom view thereof, respectively;

FIGS. 37A, 37B, 37C and 37D are diagrams showing the image stabilizer shown in FIG. 34, wherein FIG. 37A is a front view thereof, FIG. 37B is a rear view thereof, FIG. 37C is a right-hand side elevational view thereof and FIG. 37D is a left-hand side elevational view thereof, respectively;

FIGS. 40A and 40B are diagrams showing the image stabilizer shown in FIG. 38, wherein FIG. 40A is a plan view thereof and FIG. 40B is a bottom view thereof, respectively;

FIGS. 41A, 41B, 41C and 41D are diagrams showing the image stabilizer shown in FIG. 38, wherein FIG. 41A is a front view thereof, FIG. 41B is a rear view thereof, FIG. 41C is a right-hand side elevational view thereof and FIG. 41D is a left-hand side elevational view thereof, respectively;

FIGS. 42A, 42B, 42C and 42D are diagrams used to explain relationships among a magnet, a yoke and a Hall element according to an embodiment of the present invention, wherein FIG. 42A is a plan view of the yoke and the magnet, FIG. 42B is a longitudinal cross-sectional view thereof, FIG. 42C is an explanatory diagram showing relationships among the yoke, the magnet, the Hall element and the coil and FIG. 42D is an explanatory diagram showing a relationship between the Hall element and the coil, respectively;

FIGS. 43A and 43B are tables showing results obtained when magnetic flux densities are detected by the Hall element shown in FIG. 42C, wherein FIG. 43A shows results obtained when magnetic flux densities are detected by the Hall element in the state in which a yoke is provided with a projected portion and FIG. 43B shows results obtained when magnetic flux densities are detected by the Hall element in the state in which a yoke is not provided with a projected portion, respectively;

FIGS. 44A and 44B are tables showing results obtained when magnetic flux densities are detected by the Hall element shown in FIGS. 43A and 43B, wherein FIG. 44A shows results obtained when magnetic flux densities are detected by the Hall element in the state in which a yoke is provided with a projected portion and FIG. 44B shows results obtained when magnetic flux densities are detected by the Hall element in the state in which a yoke is not provided with a projected portion, respectively;

FIGS. 46A, 46B and 46C are diagrams used to explain the state in which magnetic flux densities are detected by the Hall element shown in FIG. 45, wherein FIG. 46A is a diagram used to explain the side of the short side without the projected portion, FIG. 46B is a diagram used to explain the side of the short side with the projected portion and FIG. 46C is a diagram used to explain the side of the long side, respectively.

DESCRIPTION OF THE PREFERRED EMBODIMENTS

Embodiments of the present invention will be described below with reference to the accompanying drawings. FIGS. 1 to FIGS. 46A, 46B and 46C are diagrams used to explain the embodiments of the present invention.

Figure 1:
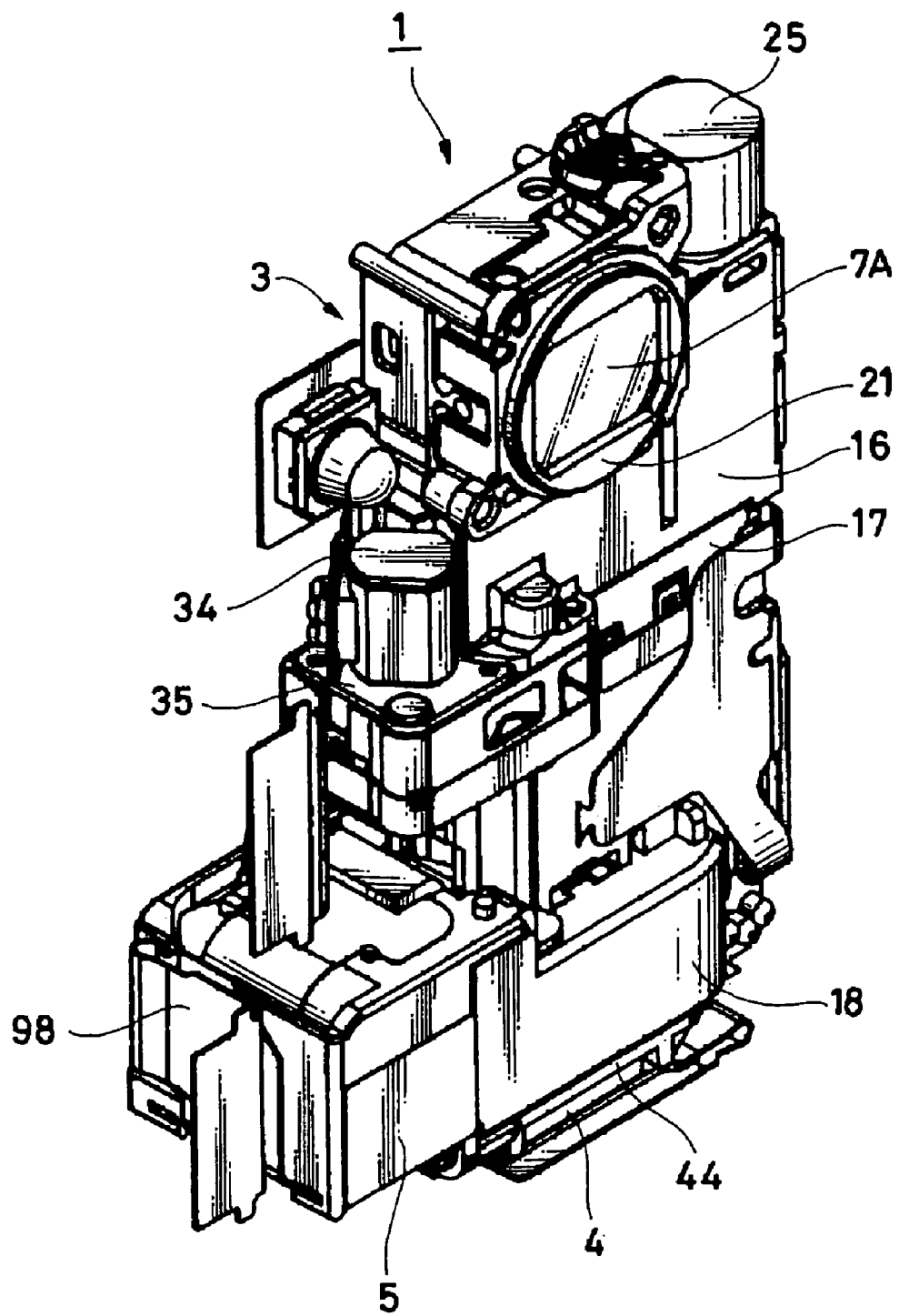
FIG. 1 is a perspective view showing a lens apparatus according to a first embodiment of the present invention from the front side.
Figure 2:
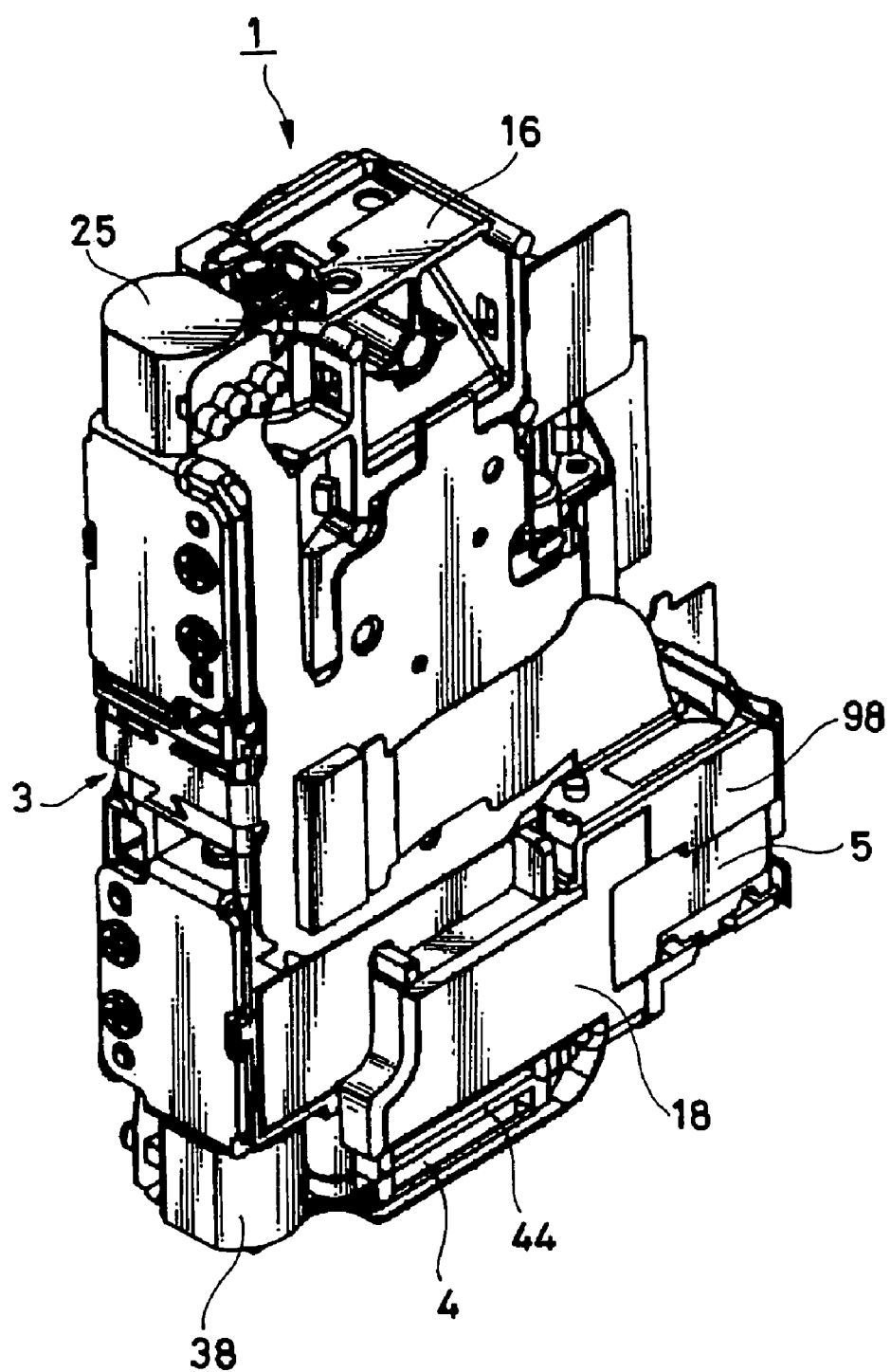
FIG. 2 is a perspective view showing the lens apparatus shown in FIG. 1 from the rear side.
Figure 3:
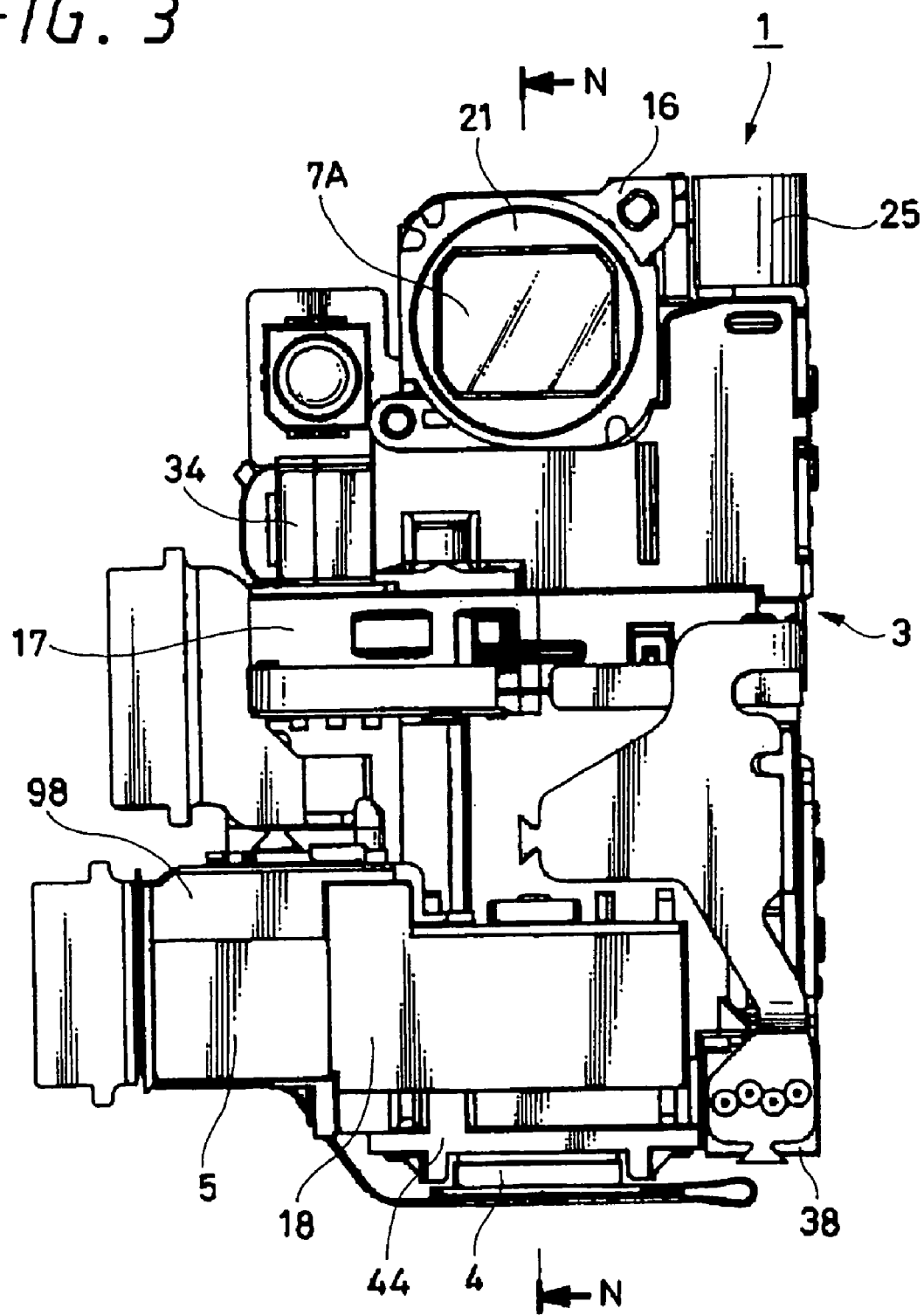
FIG. 3 is a front view of the lens apparatus shown in FIG. 1.
Figure 4:
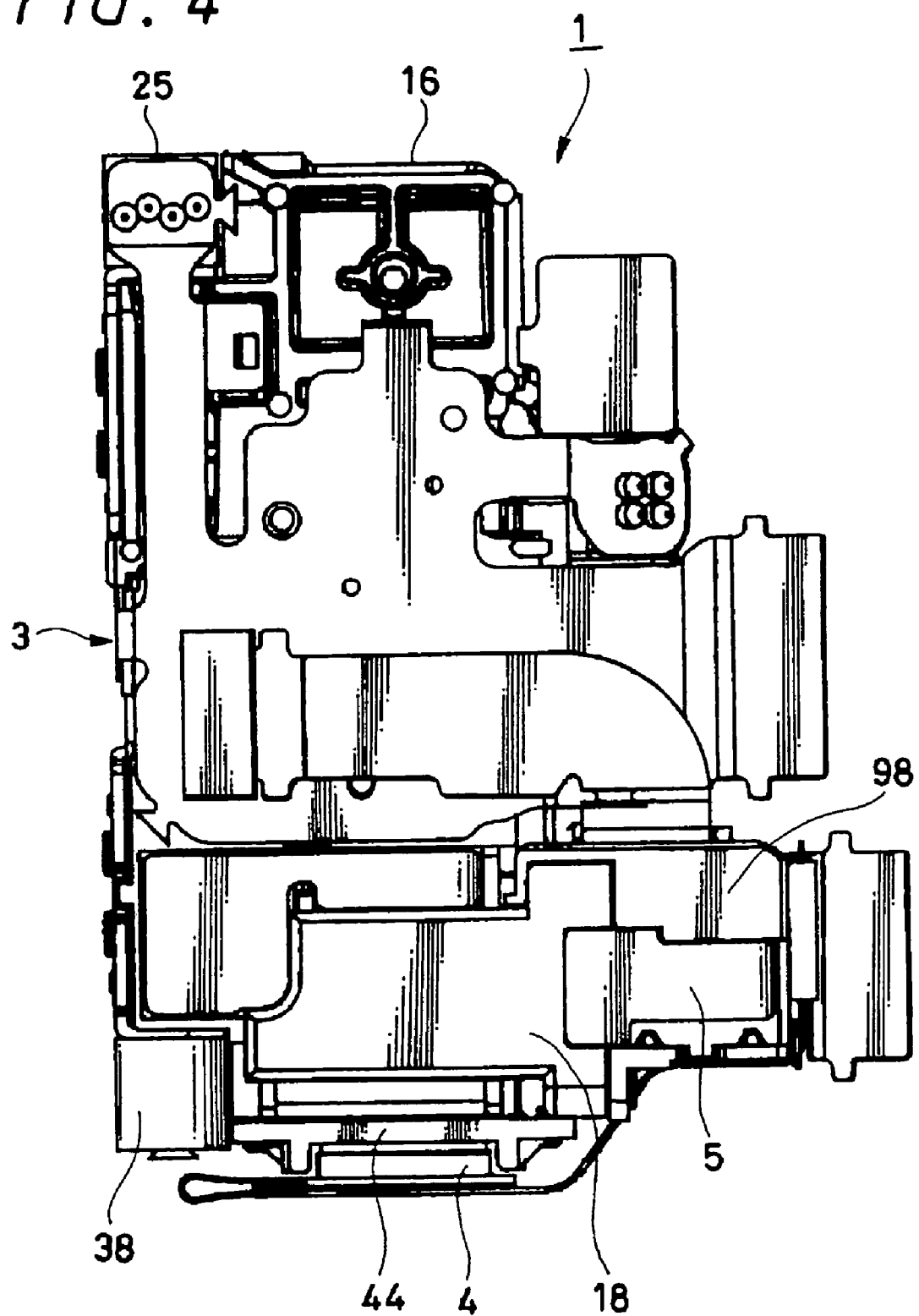
FIG. 4 is a rear view of the lens apparatus shown in FIG. 1.
Figure 5:
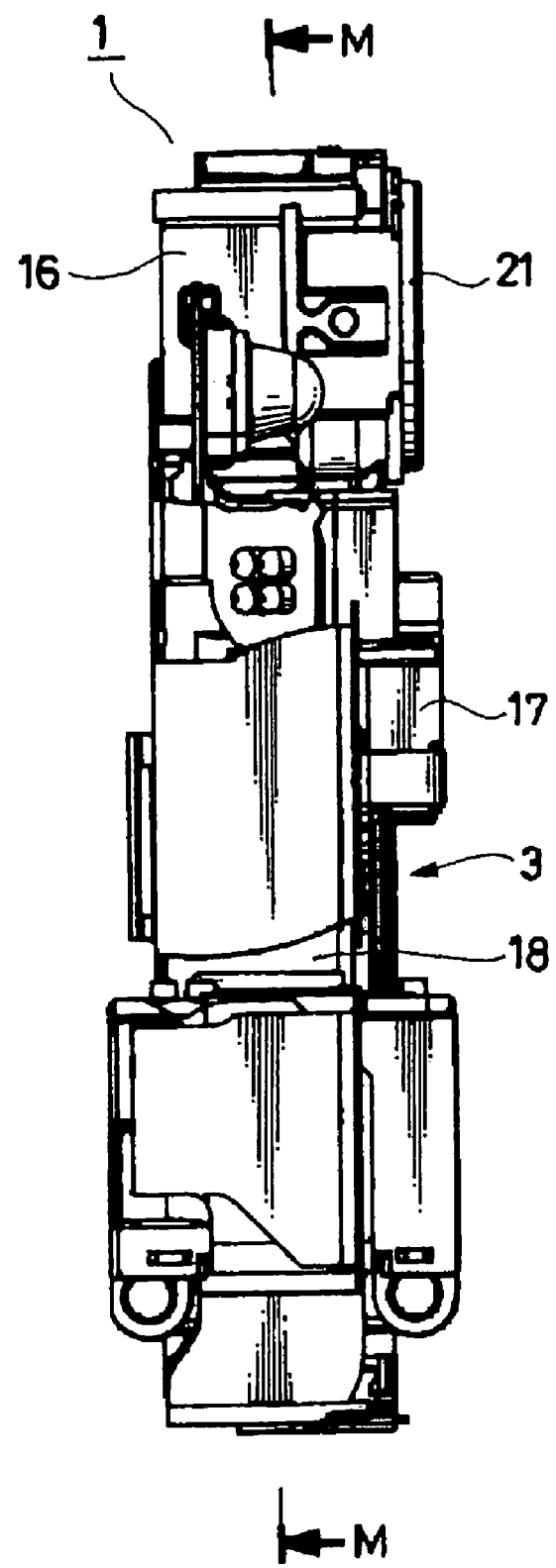
FIG. 5 is a left-hand side elevational view of the lens apparatus shown in FIG. 1.
Figure 6:
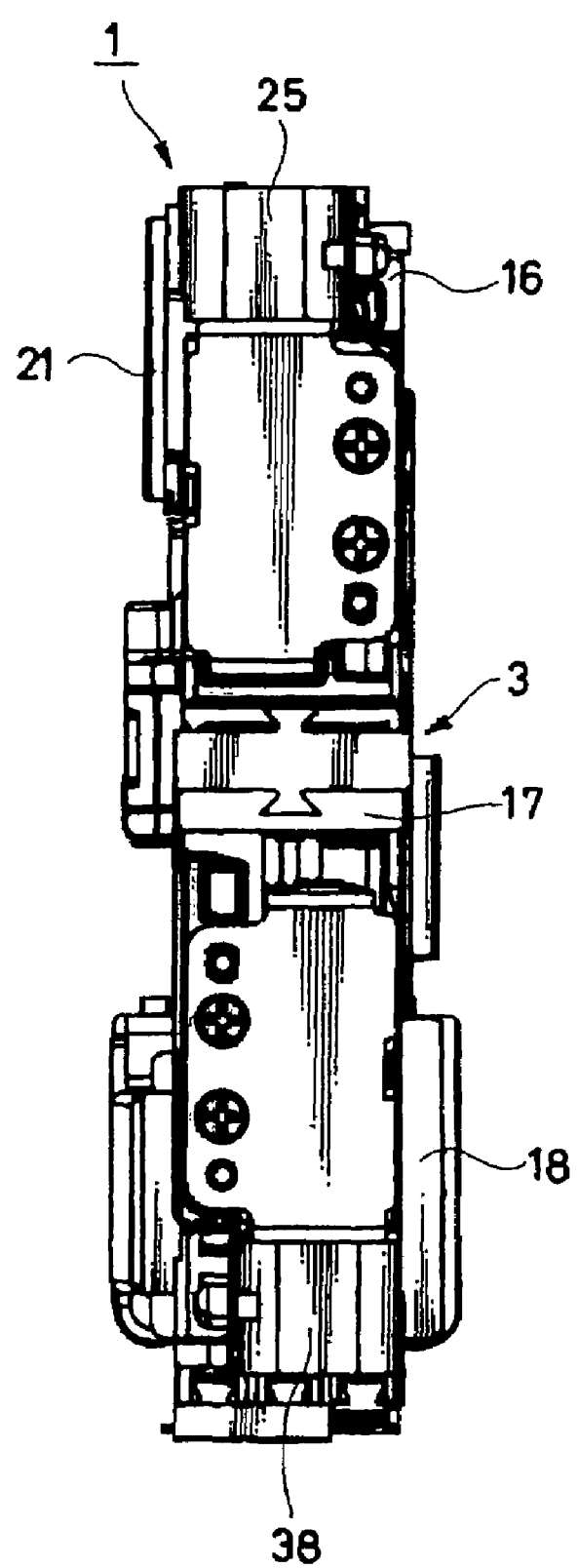
FIG. 6 is a right-hand side elevational view of the lens apparatus shown in FIG. 1.
Figure 7:
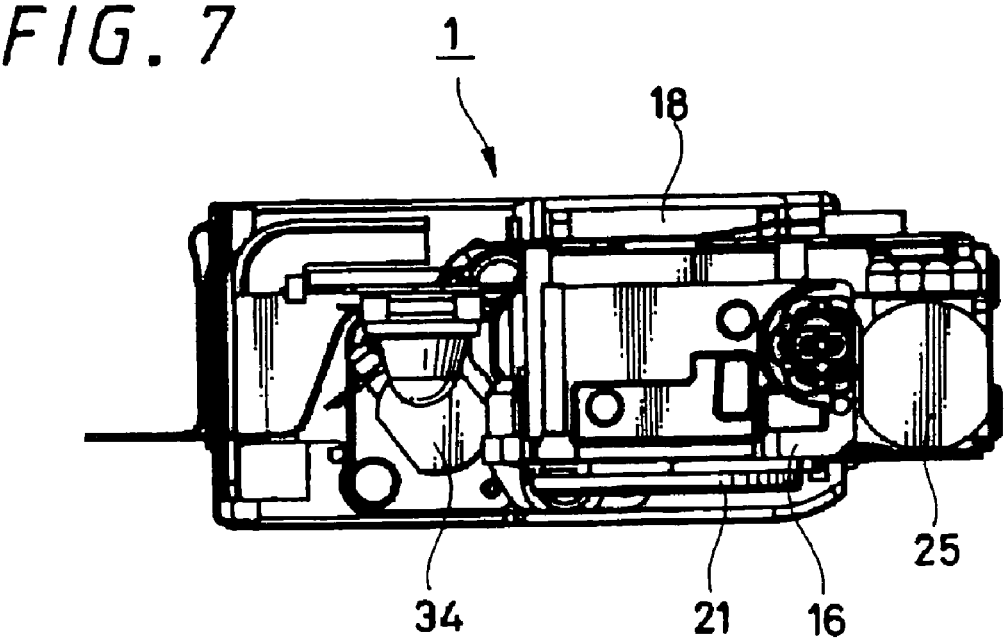
FIG. 7 is a plan view of the lens apparatus shown in FIG. 1.
Figure 8:
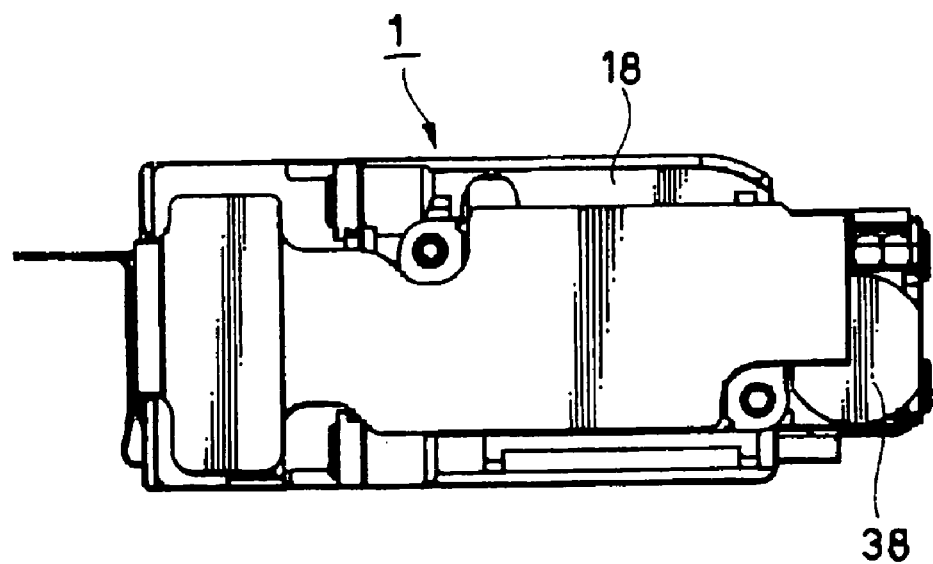
FIG. 8 is a bottom view of the lens apparatus shown in FIG. 1.
Figure 9:
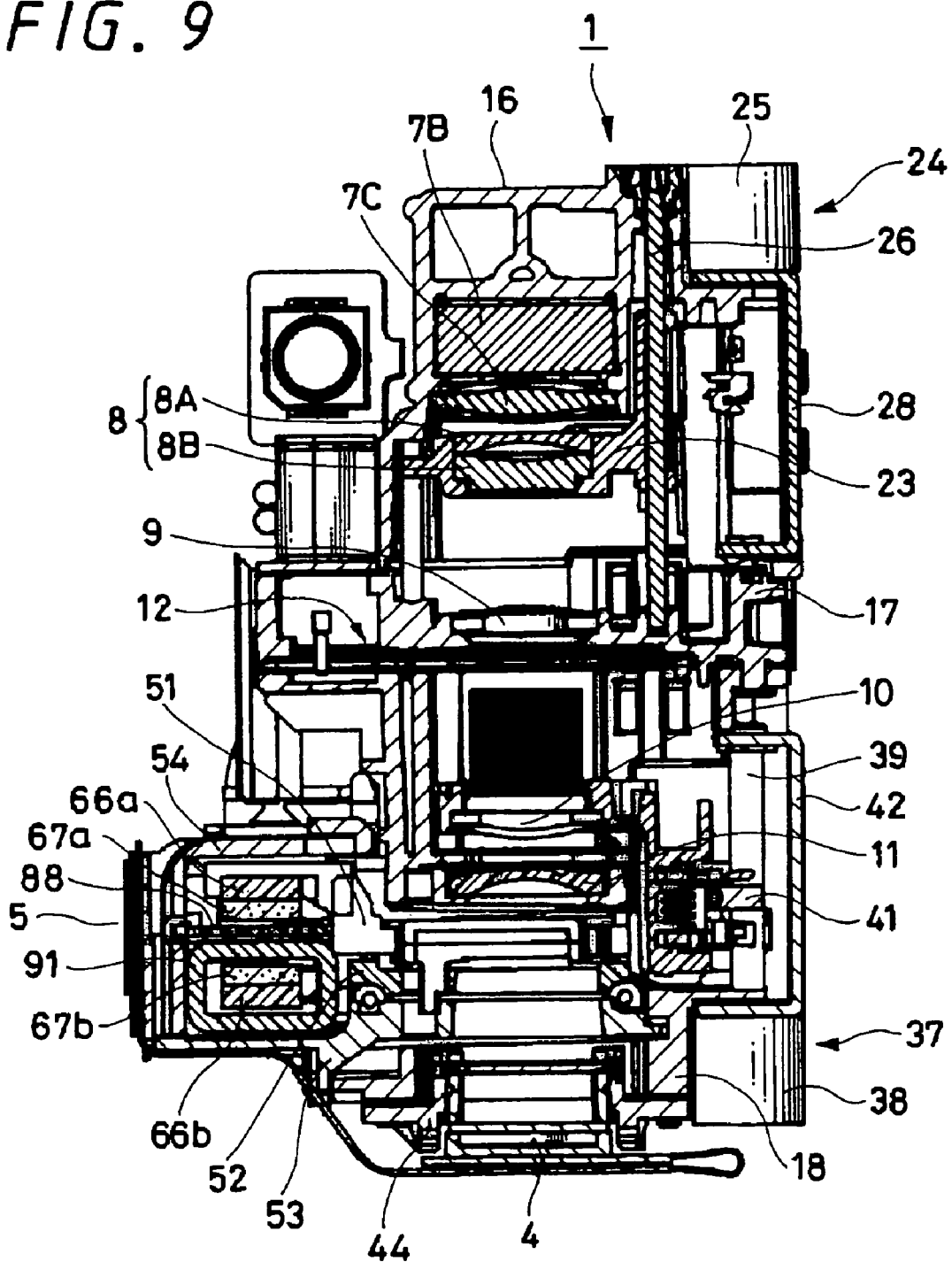
FIG. 9 is a cross-sectional view taken along the line M-M of the lens apparatus shown in FIG. 5.
Figure 10:
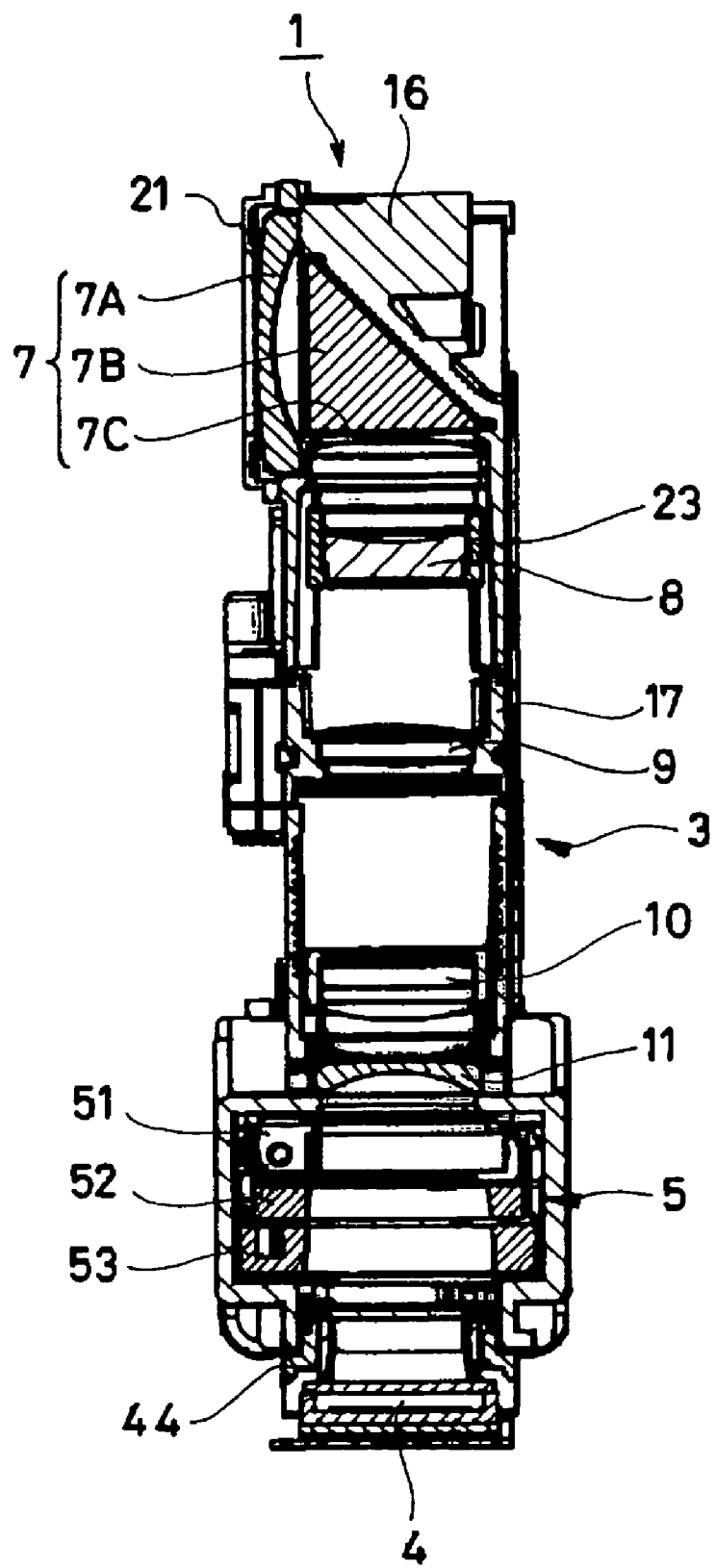
FIG. 10 is a cross-sectional view taken along the line N-N of the lens apparatus shown in FIG. 3.
Figure 11:
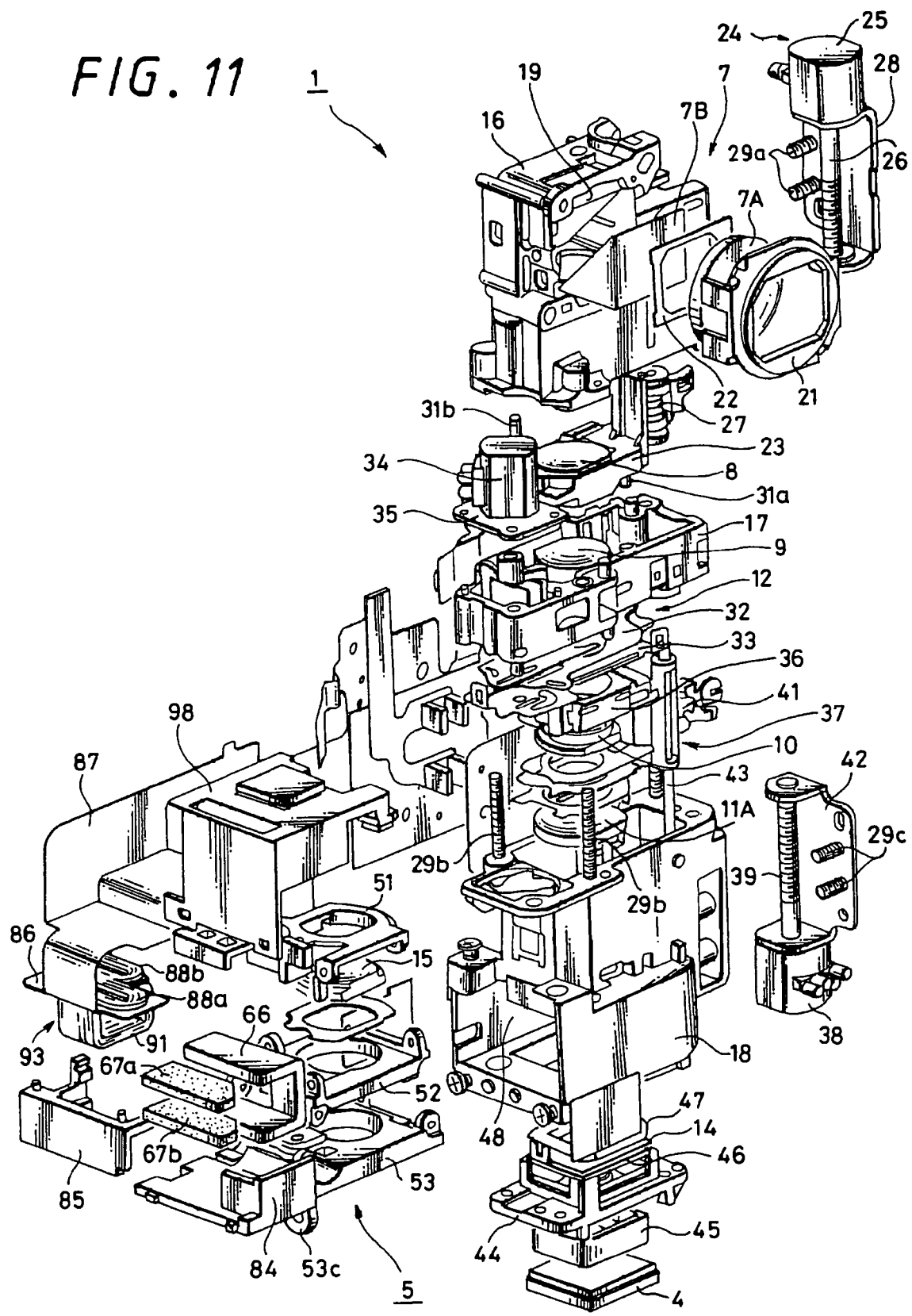
FIG. 11 is an exploded perspective view of the lens apparatus shown in FIG. 1.
Figure 12:
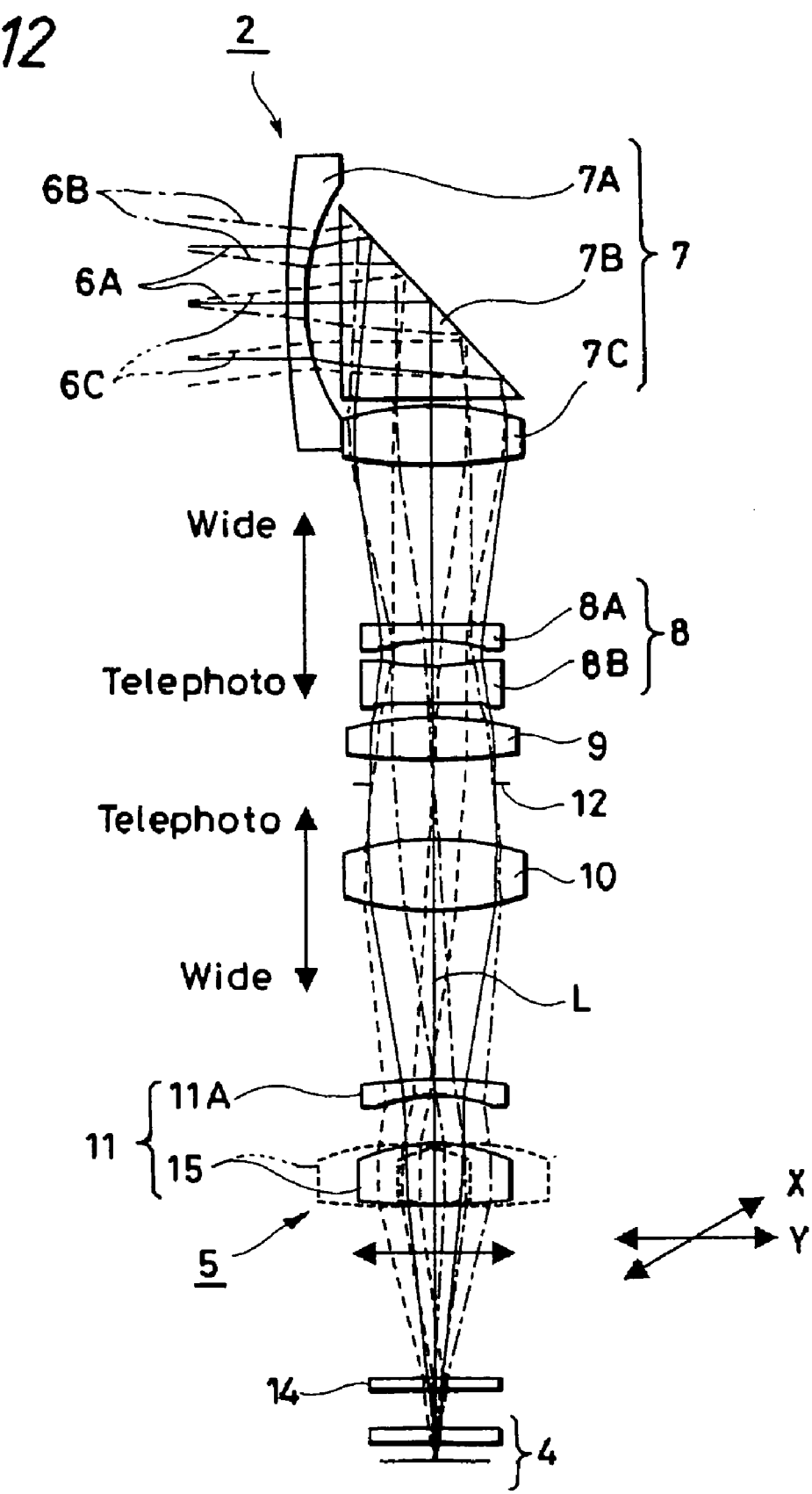
FIG. 12 is an explanatory diagram useful for explaining a lens system of the lens apparatus shown in FIG. 1.
Figure 13:
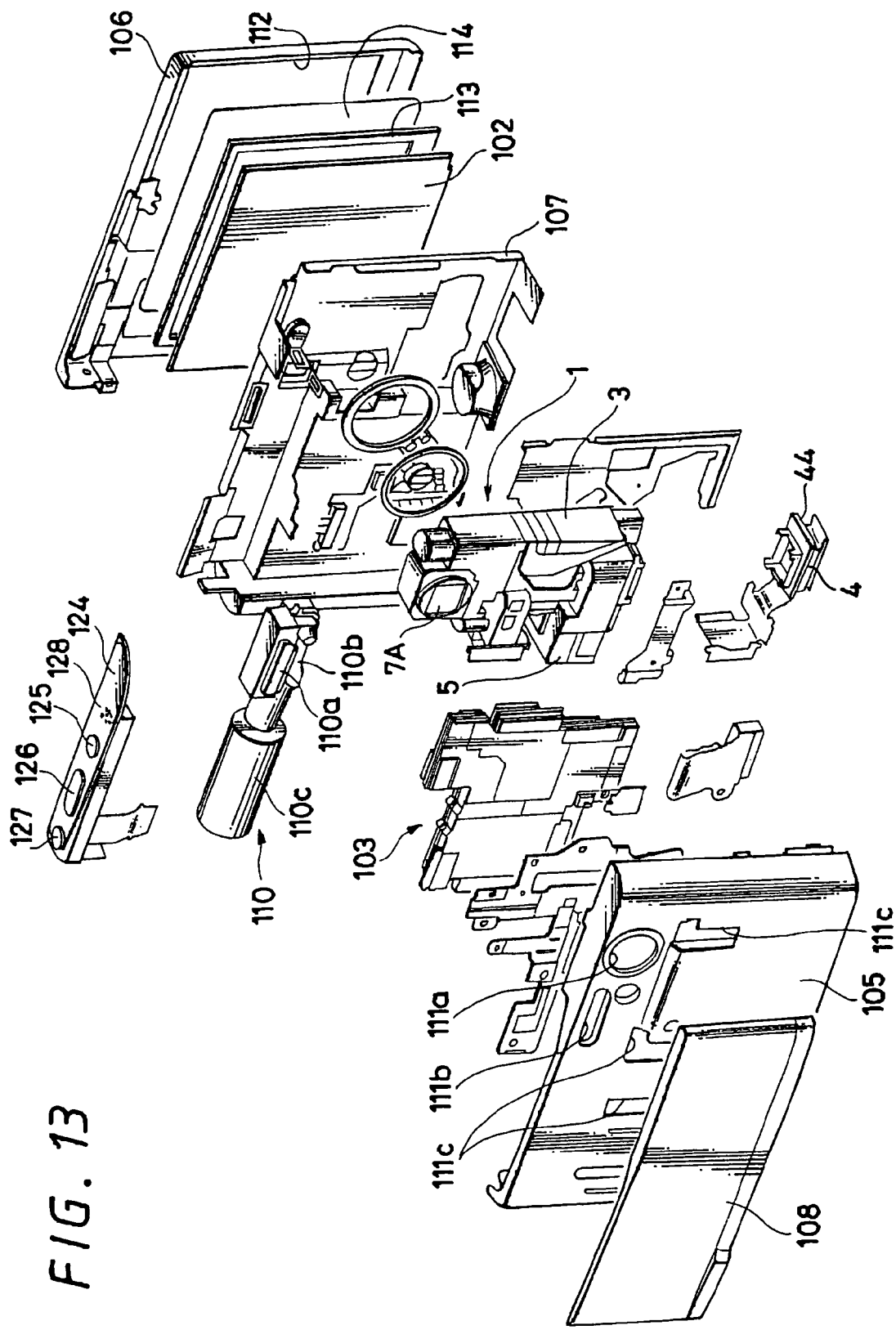
FIG. 13 is an exploded perspective view showing an imager apparatus according to a first embodiment of the present invention and shows the case in which the above imager apparatus is applied to a digital still camera.
Figure 14:
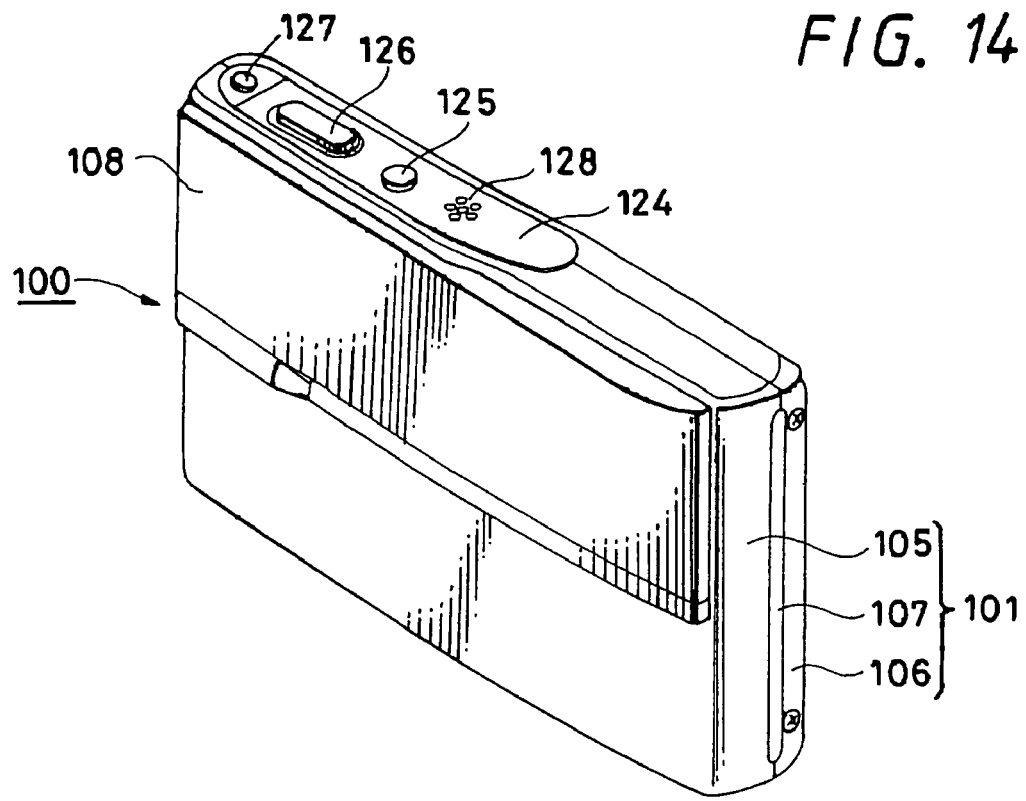
FIG. 14 is a perspective view showing an imager apparatus according to a first embodiment of the present invention and shows a digital still camera from the front side in the state in which an objective lens is closed by a lens cover.
Figure 15:
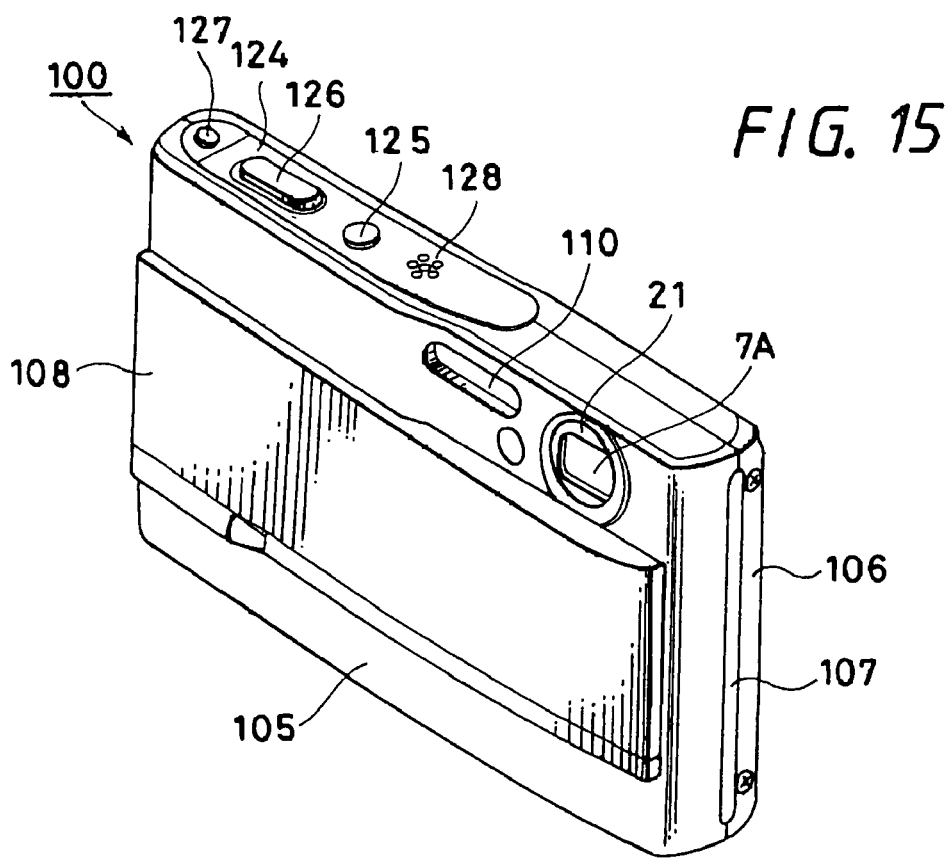
FIG. 15 is a perspective view showing an imager apparatus according to a first embodiment of the present invention and shows a digital still camera from the front side in the state in which an objective lens is exposed by opening a lens cover.
Figure 16:
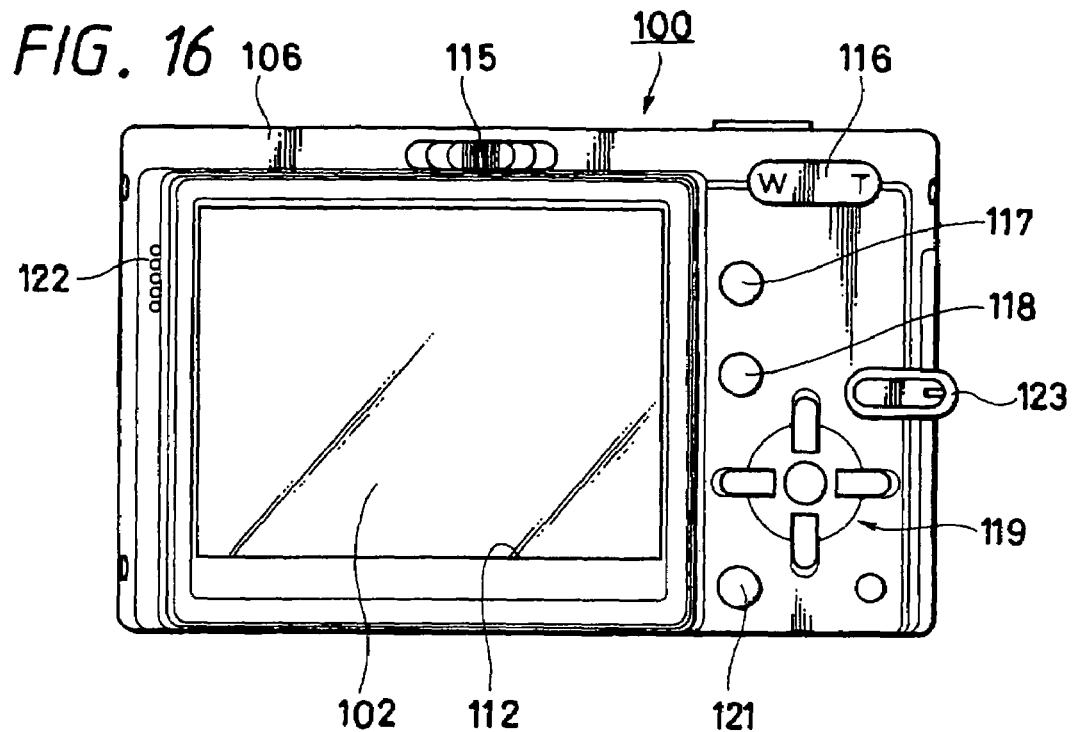
FIG. 16 is a rear view of the digital still camera shown in FIG. 14.
Figure 17:
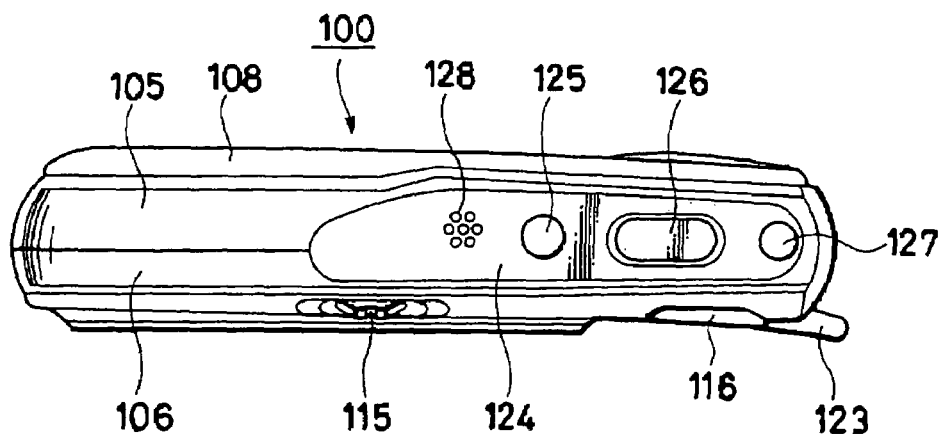
FIG. 17 is a plan view of the digital still camera shown in FIG. 14.

FIG. 1 is a perspective view showing a lens apparatus according to a first embodiment of the present invention from the front side. FIG. 2 is a perspective view showing the lens apparatus from the rear side. FIG. 3 is a front view thereof. FIG. 4 is a rear view thereof. FIG. 5 is a left-hand side elevational view thereof. FIG. 6 is a right-hand side elevational view thereof. FIG. 7 is a plan view thereof. FIG. 8 is a bottom view thereof. FIG. 9 is a cross-sectional view taken along the line M-M in FIG. 5. FIG. 10 is a cross-sectional view taken along the line N-N in FIG. 3. FIG. 11 is an exploded perspective view thereof. FIG. 12 is a diagram used to explain a lens system. FIG. 13 is an exploded perspective view of a digital still camera which shows a first example of an imager apparatus. FIG. 14 is a perspective view showing a digital still camera from the front side. FIG. 15 is a perspective view showing the state in which an objective lens is exposed by moving a lens cover. FIG. 16 is a rear view thereof and FIG. 17 is a plan view thereof.

Figure 18:
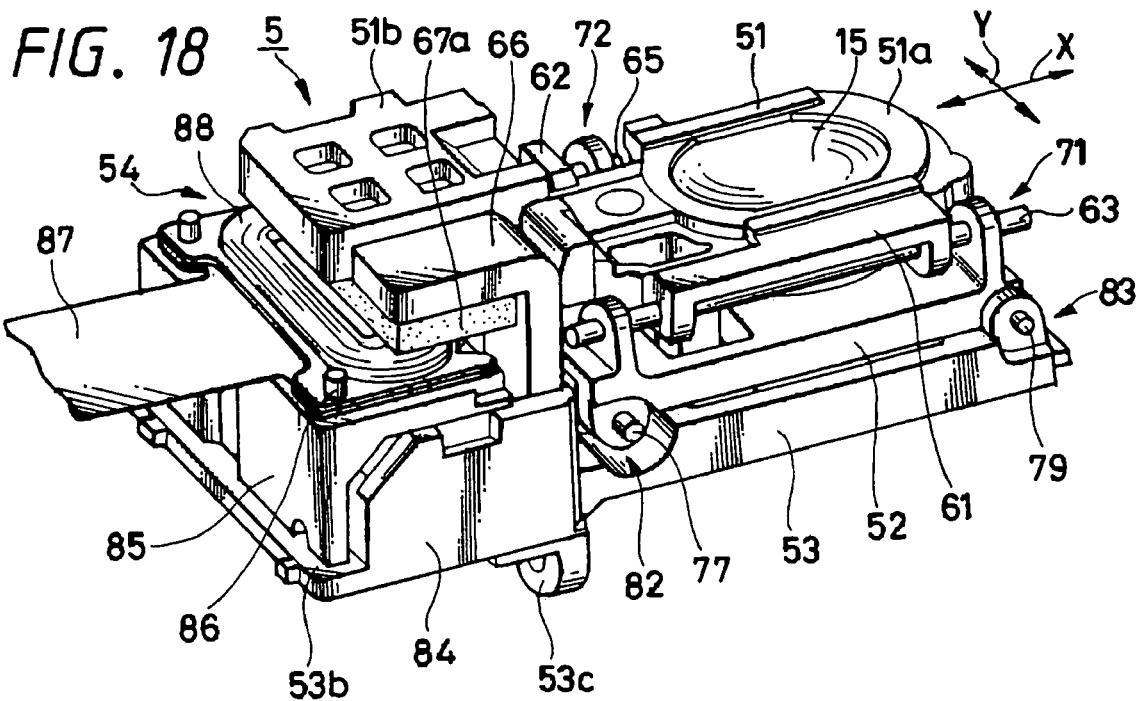
FIG. 18 is a perspective view showing an image stabilizer according to a first embodiment of the present invention and shows the image stabilizer from the front side.
Figure 19:
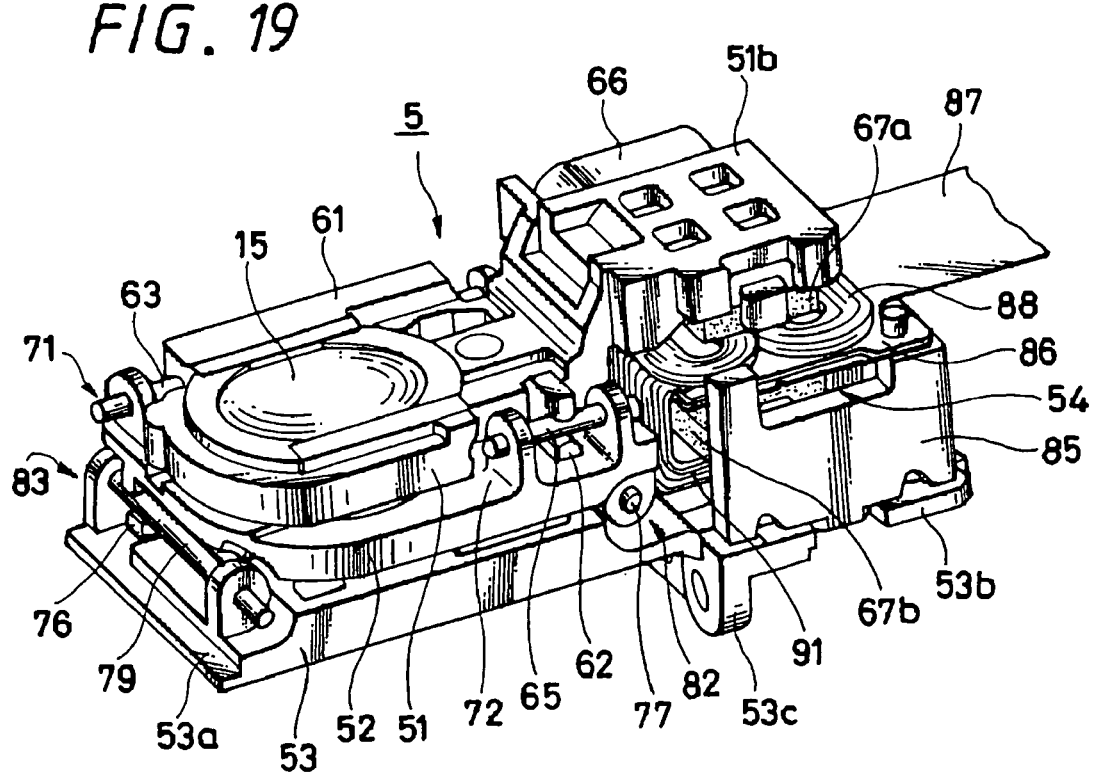
FIG. 19 is a perspective view showing the image stabilizer shown in FIG. 18 from the rear side.
Figure 20:
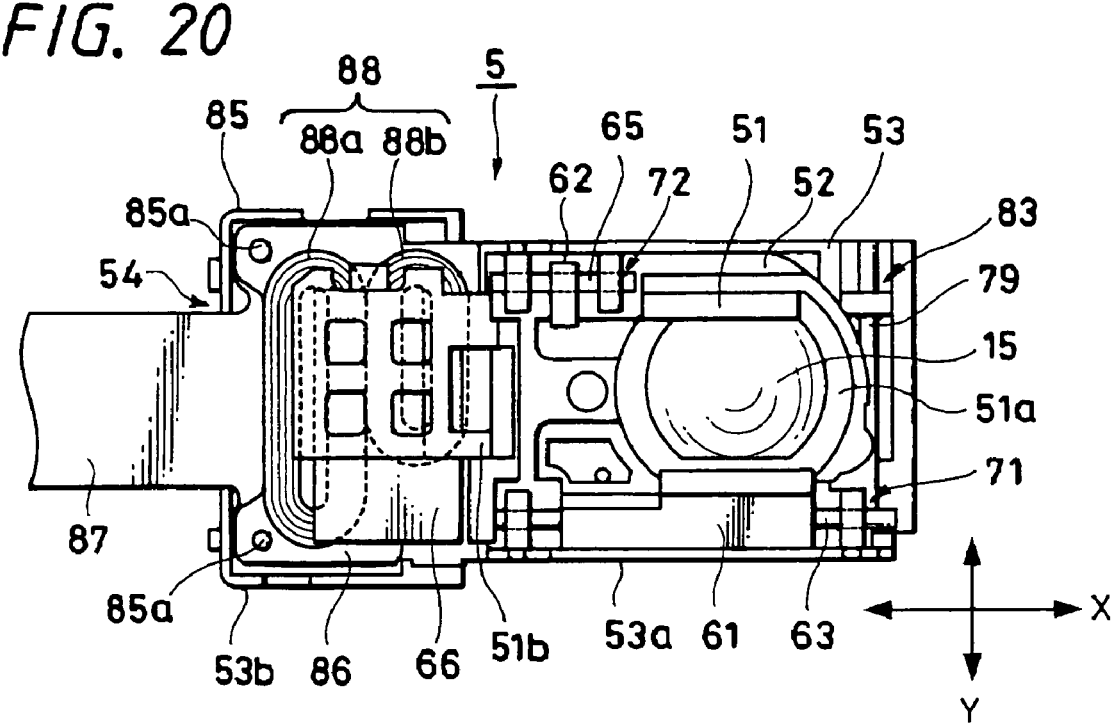
FIG. 20 is a plan view of the image stabilizer shown in FIG. 18.
Figure 21:
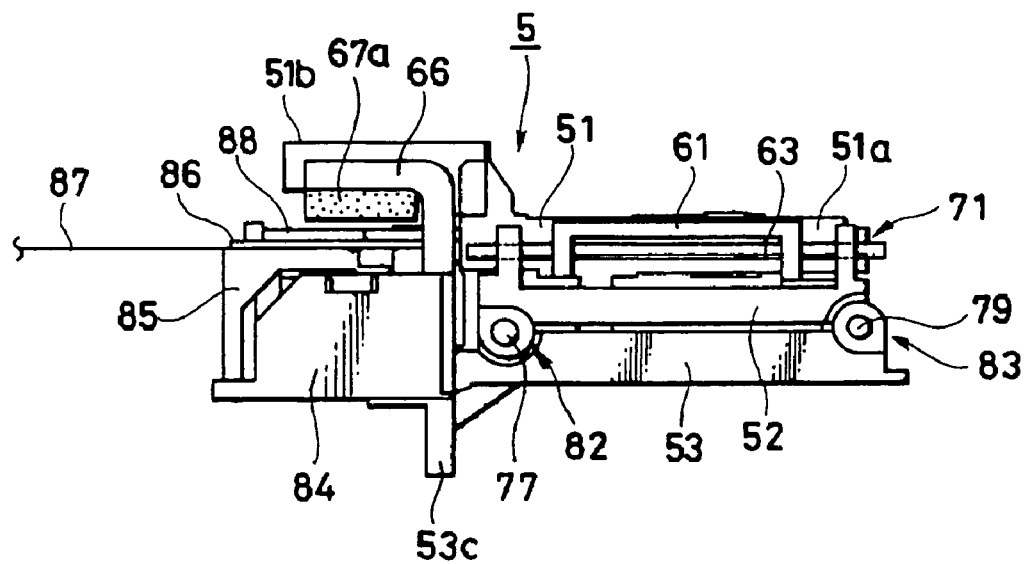
FIG. 21 is a front view of the image stabilizer shown in FIG. 18.
Figure 22:
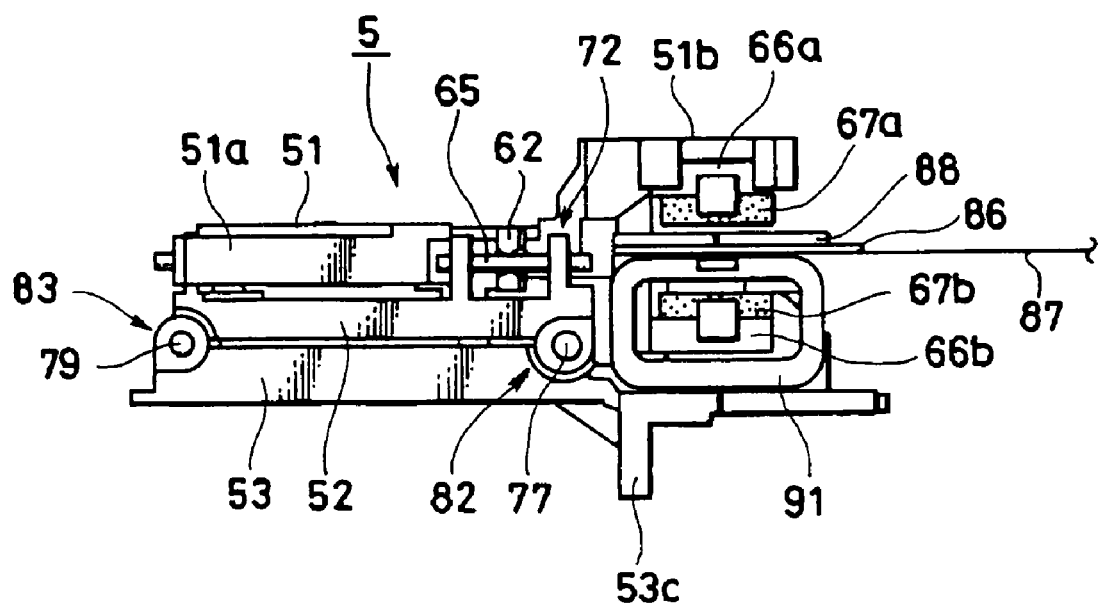
FIG. 22 is a rear view of the image stabilizer shown in FIG. 18.
Figure 23:
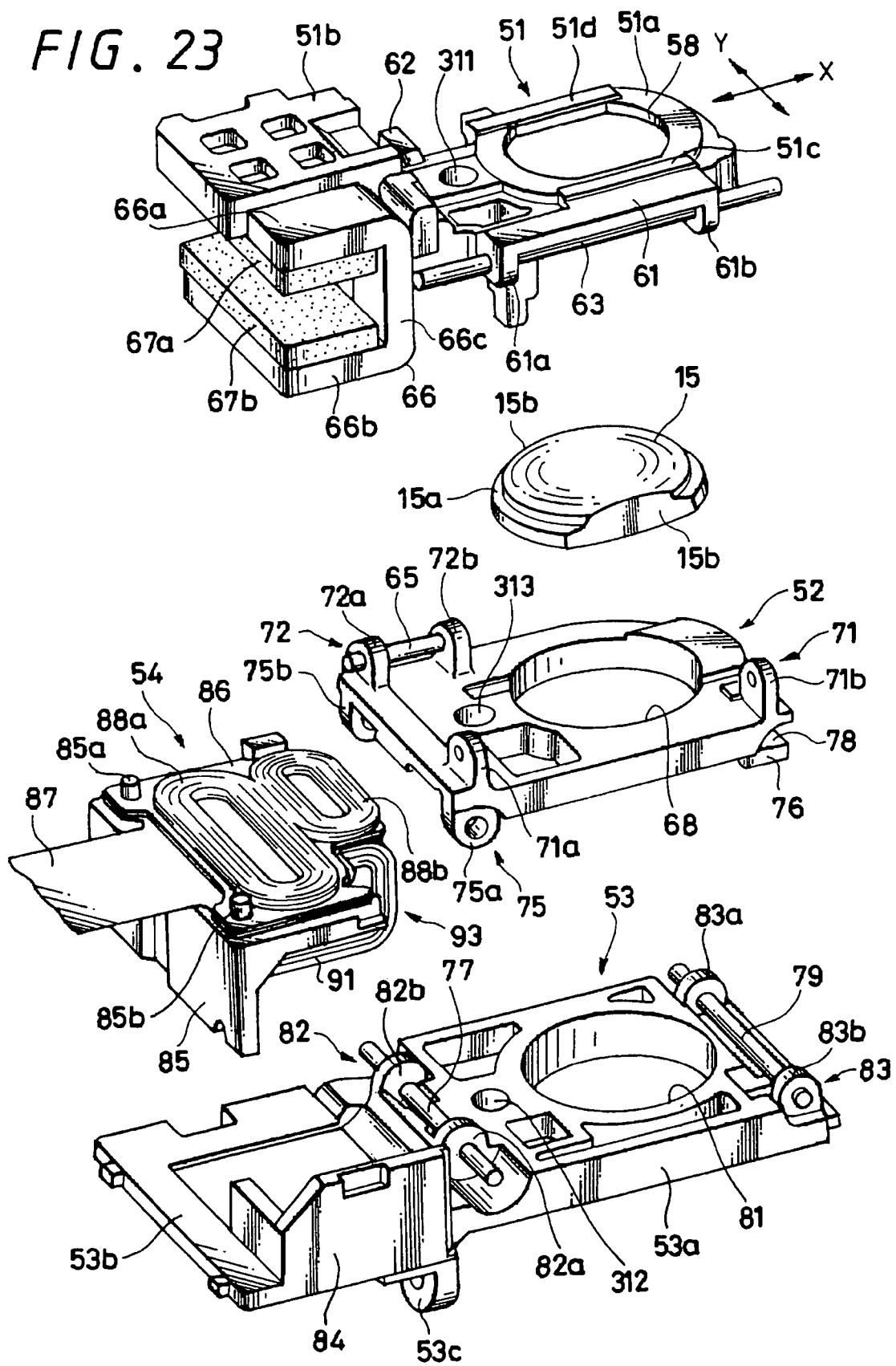
FIG. 23 is an exploded perspective view of the image stabilizer shown in FIG. 18.
Figure 24:
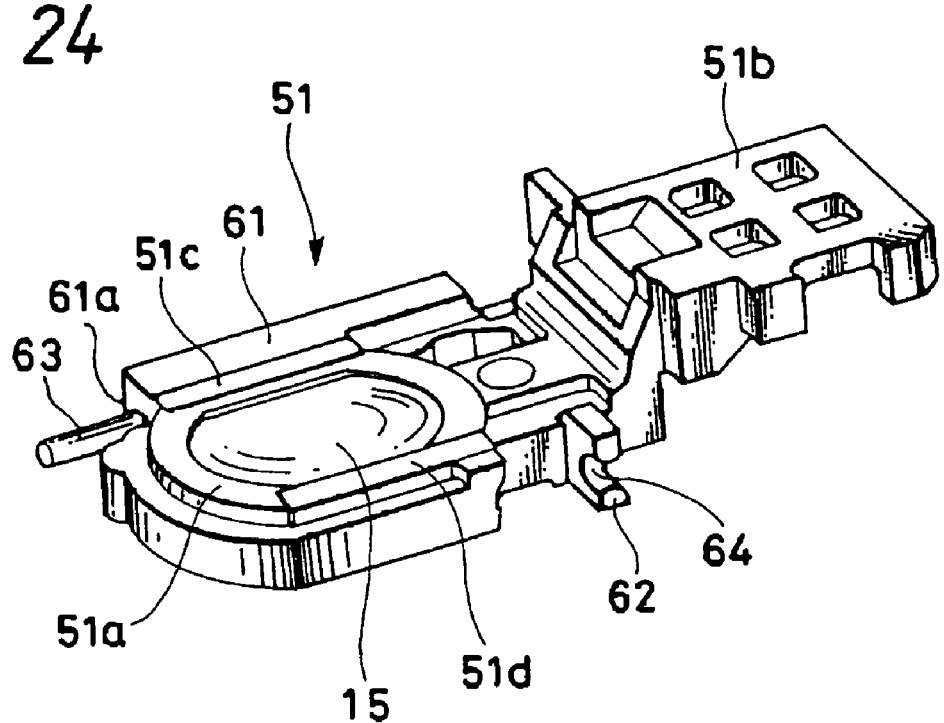
FIG. 24 is a perspective view showing a first moving frame of the image stabilizer shown in FIG. 18.
Figure 25:
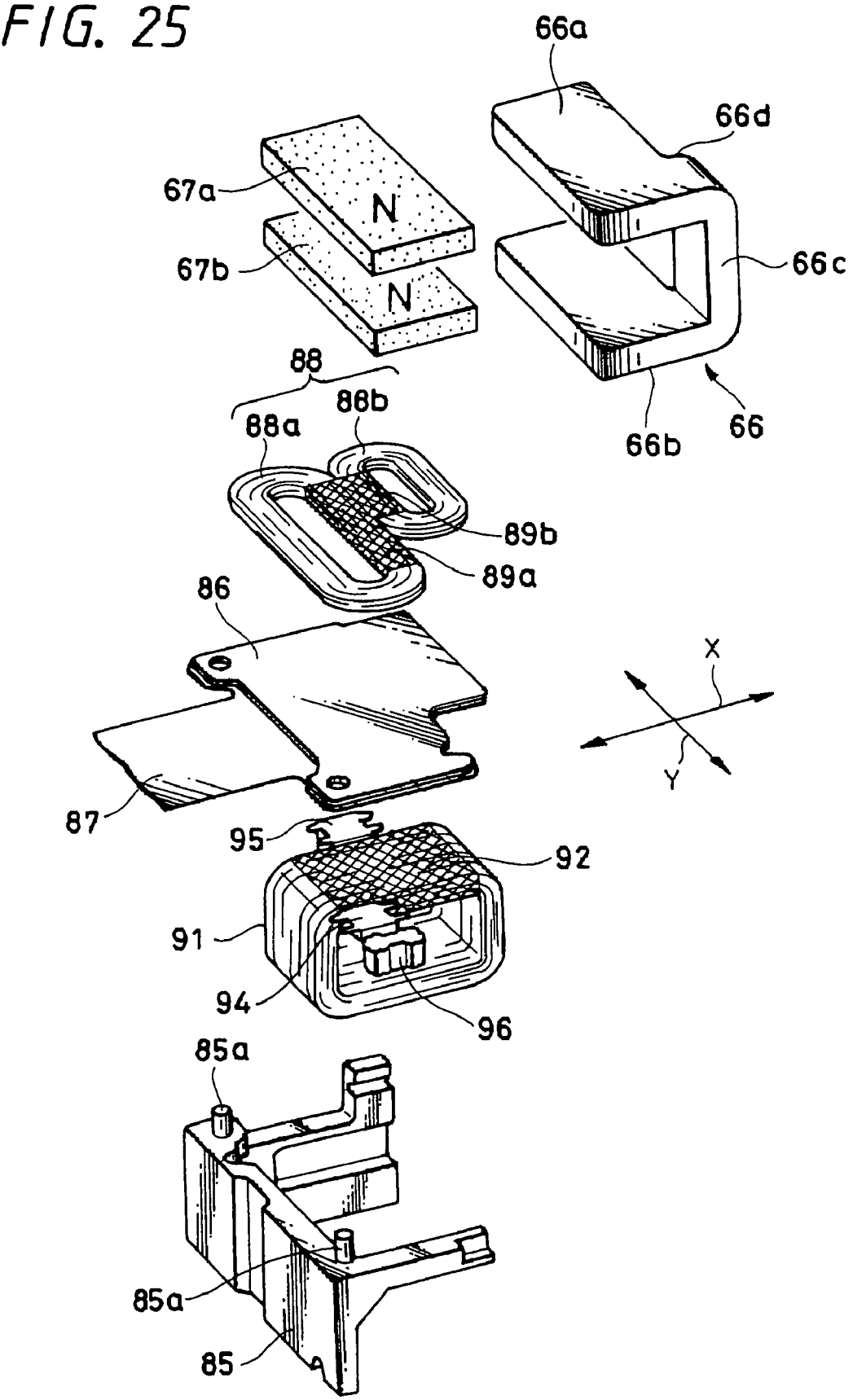
FIG. 25 is an exploded perspective view showing a coil assembly body, a magnet and a yoke of the image stabilizer shown in FIG. 18.
Figure 26:
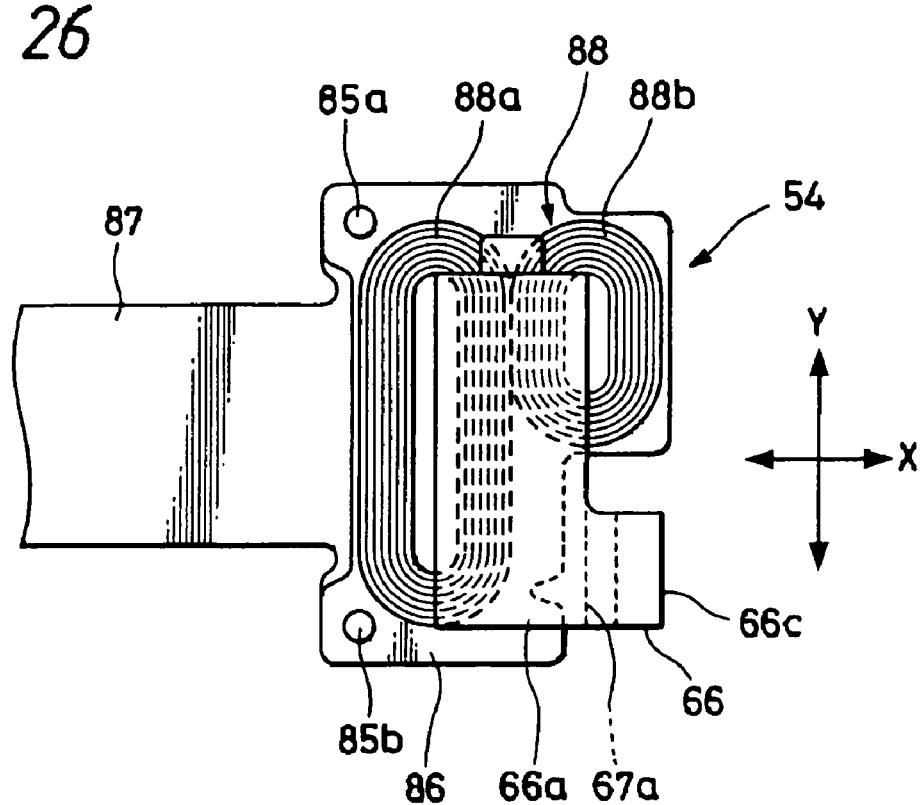
FIG. 26 is a plan view showing the coil assembly body, the magnet and the yoke of the image stabilizer shown in FIG. 18 in an enlarged-scale.
Figure 27:
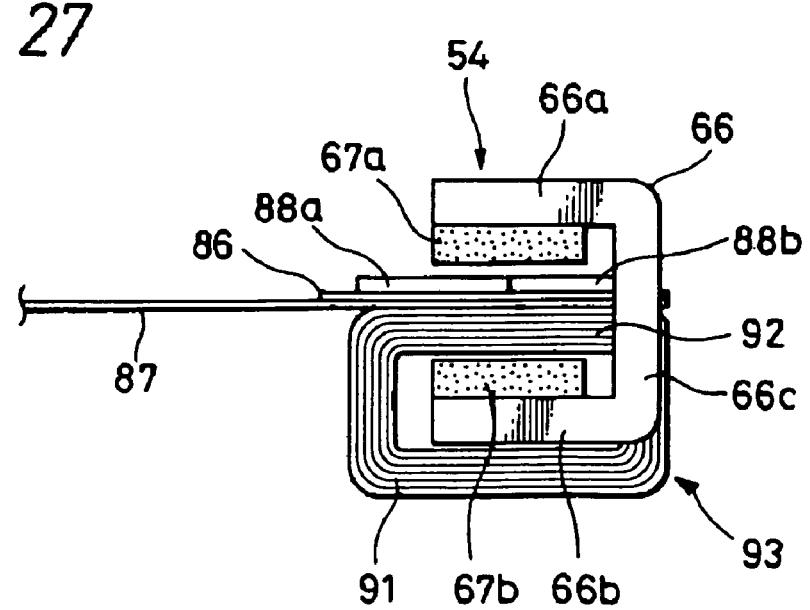
FIG. 27 is a front view showing the coil assembly body, the magnet and the yoke of the image stabilizer shown in FIG. 18 in an enlarged-scale.
Figure 28:
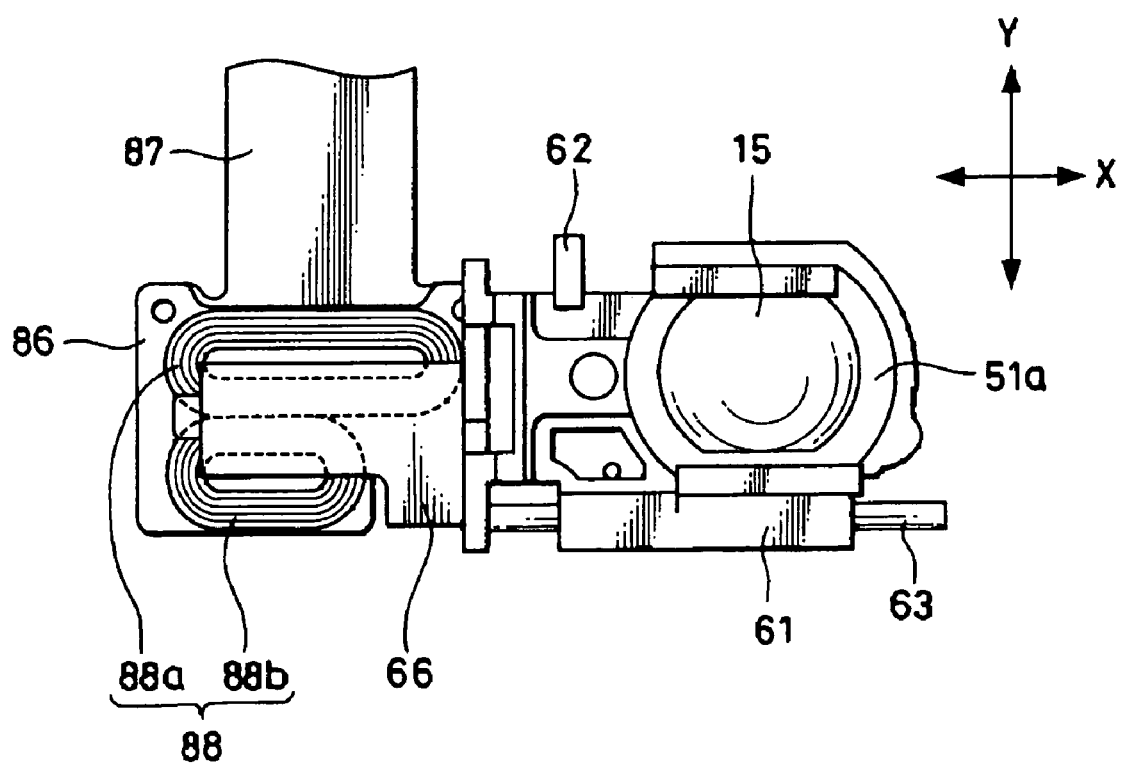
FIG. 28 is a plan view showing a coil assembly body, a magnet and a yoke of an image stabilizer according to a second embodiment of the present invention.
Figure 29:
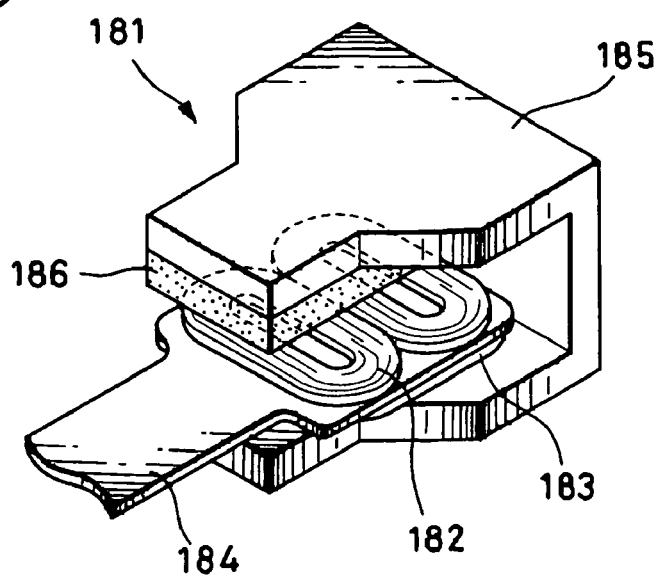
FIG. 29 is a plan view showing a coil assembly body, a magnet and a yoke of an image stabilizer according to a third embodiment of the present invention.
Figure 30:
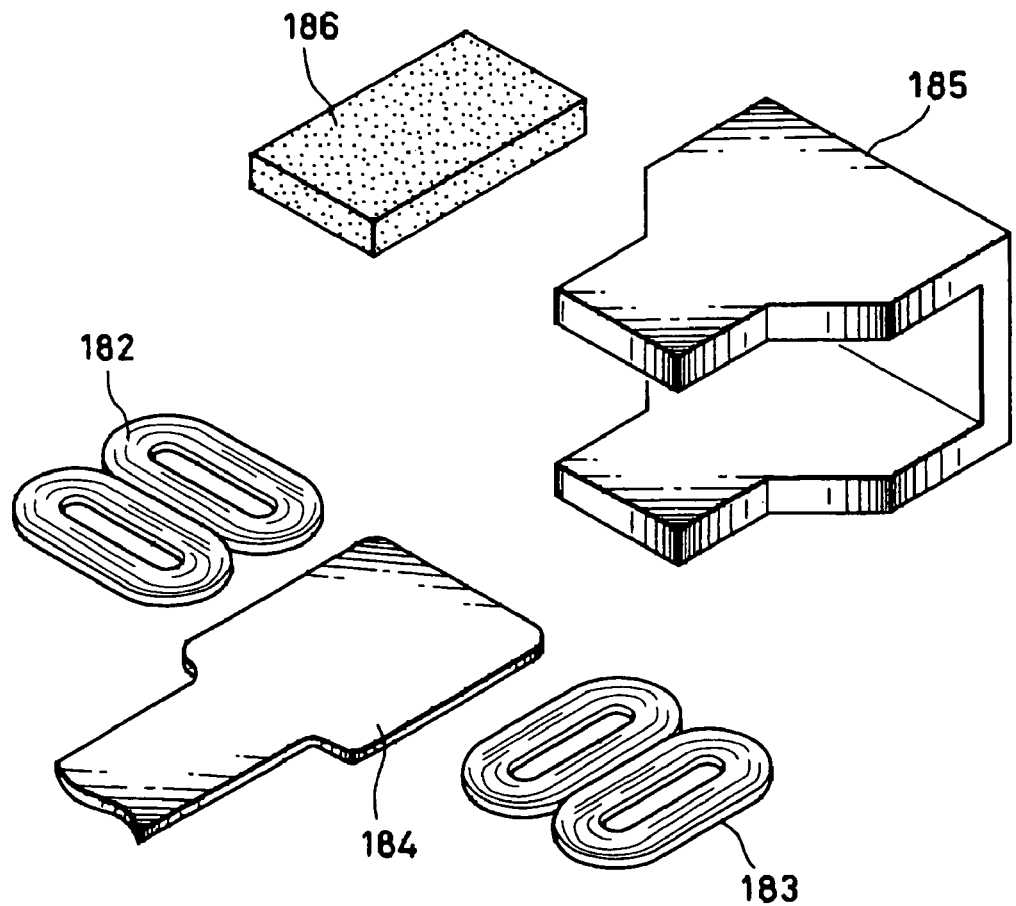
FIG. 30 is an exploded perspective view of the coil assembly body, the magnet and the yoke shown in FIG. 29.
Figure 31:
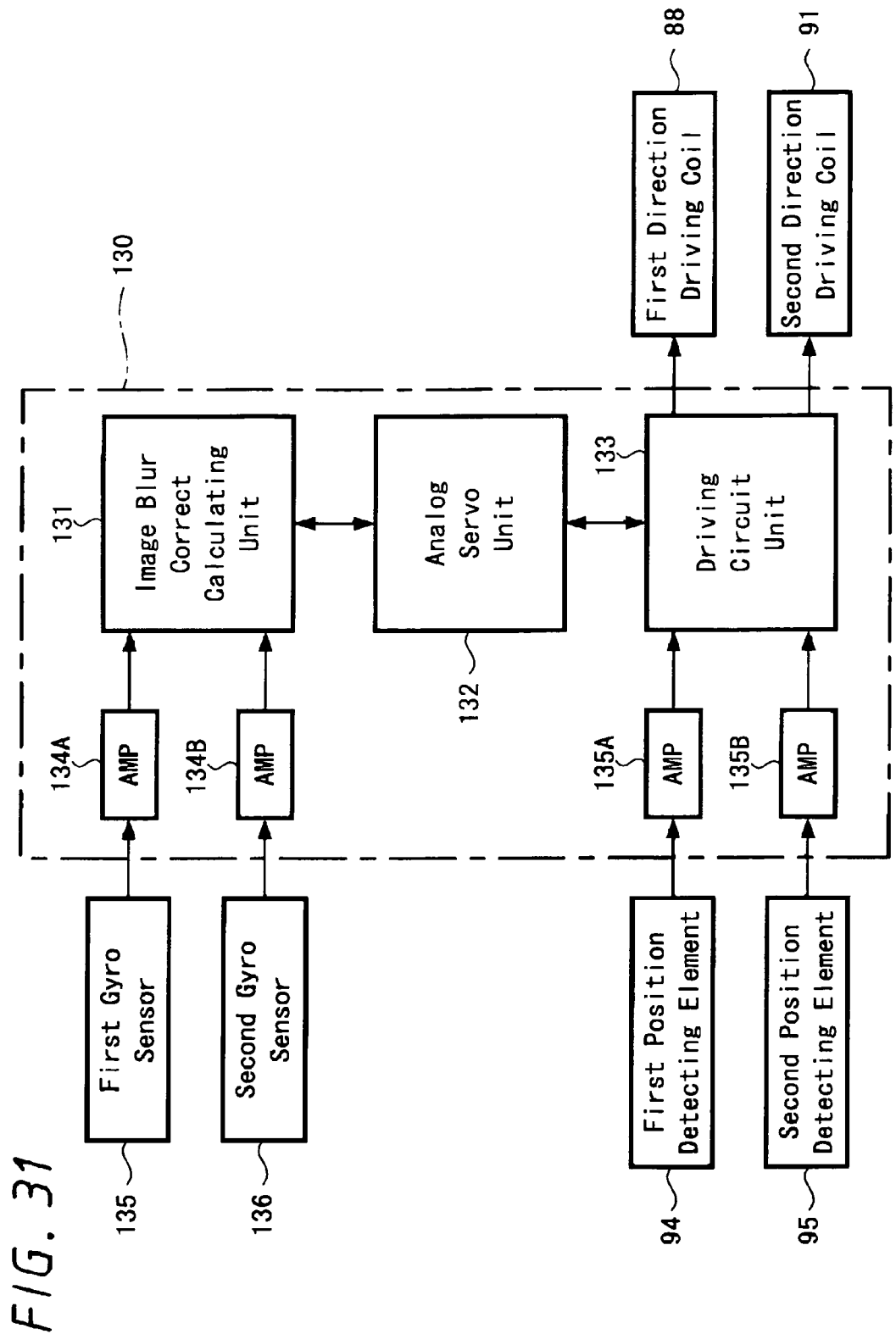
FIG. 31 is a block diagram used to explain a concept by which an image stabilizer according to an embodiment of the present invention is to be controlled.
Figure 32:
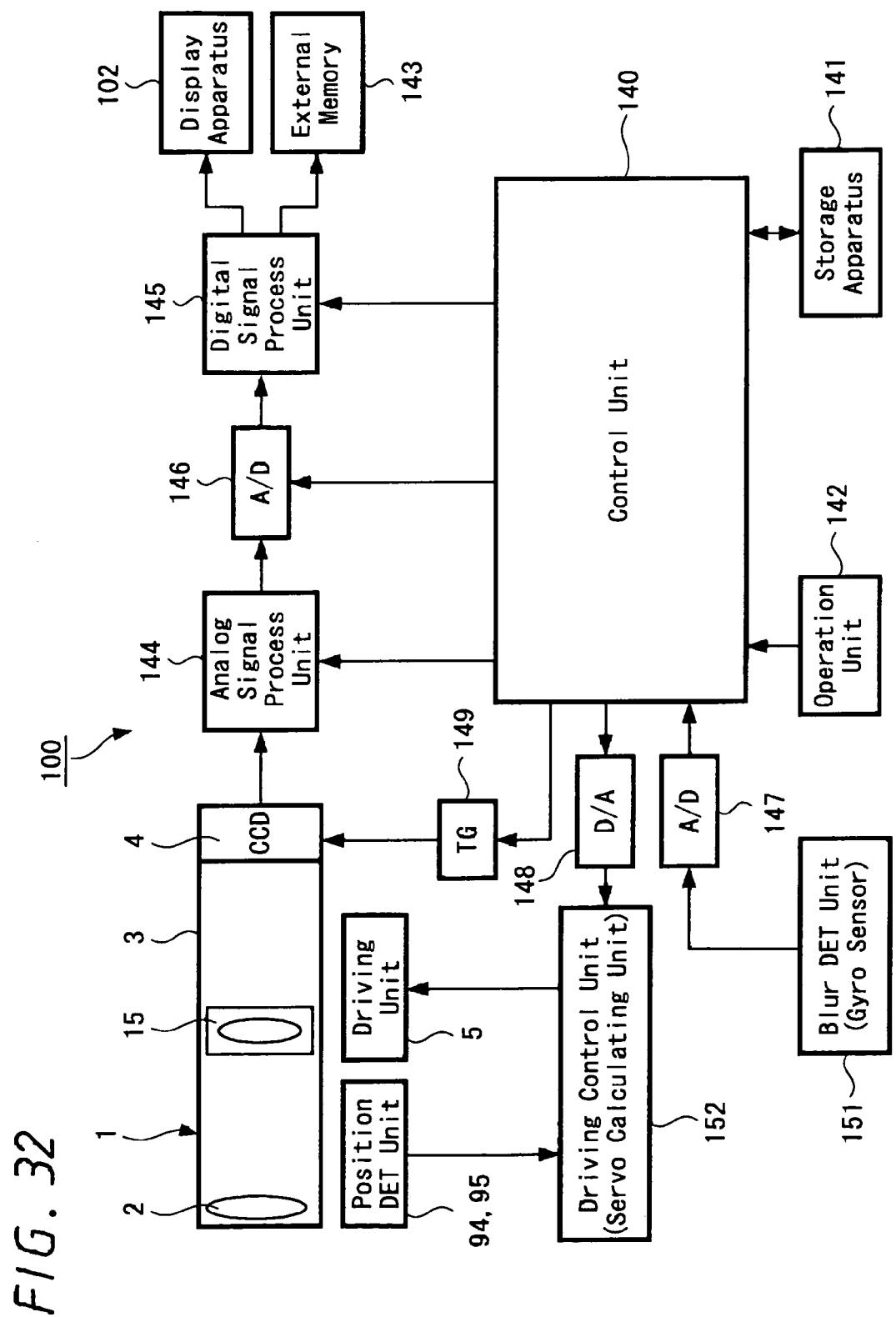
FIG. 32 is a block diagram showing a first embodiment of a schematic arrangement of an imager apparatus according to an embodiment of the present invention.
Figure 33:
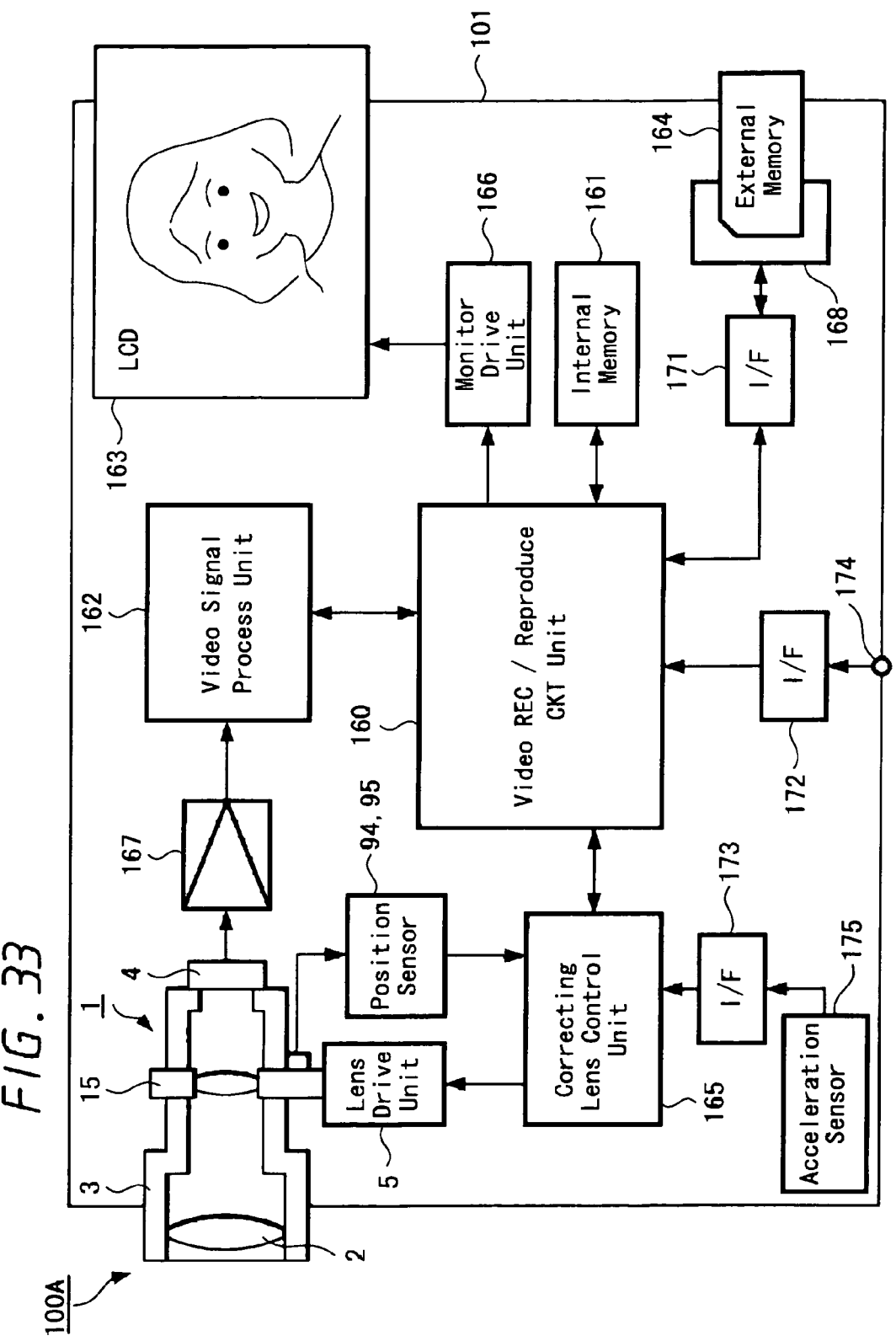
FIG. 33 is a block diagram showing a second embodiment of a schematic arrangement of an imager apparatus according to an embodiment of the present invention.

FIG. 18 is a perspective view showing from the front side an image stabilizer according to a first embodiment of the present invention. FIG. 19 is a perspective view showing this image stabilizer from the rear side. FIG. 20 is a plan view thereof. FIG. 21 is a front view thereof, FIG. 22 is a rear view thereof and FIG. 23 is an exploded perspective view thereof. FIG. 24 is a perspective view showing a first moving frame. FIG. 25 is an exploded perspective view showing a coil assembly body, a magnet and a yoke. FIG. 26 is a plan view of the coil assembly body and so forth. FIG. 27 is a front view thereof. FIG. 28 is a plan view showing a coil assembly body, a magnet and a yoke according to a second embodiment of the present invention. FIG. 29 is a perspective view showing a coil assembly body and so forth according to a third embodiment of the present invention. FIG. 30 is an exploded perspective view thereof. FIG. 31 is a block diagram used to explain a concept to control an image stabilizer according to the embodiment of the present invention. FIG. 32 is a block diagram showing a schematic arrangement of an imager apparatus according to a first embodiment of the present invention. FIG. 33 is a block diagram showing a schematic arrangement of an imager apparatus according to a second embodiment of the present invention.

FIG. 34 to FIGS. 46A, 46B and 46C are respectively diagrams used to explain relationships between magnetic force of a magnet and a Hall element that is a position detector to detect the magnetic force of the magnet. In FIG. 34 to FIGS. 42A, 42B, 42C and 42D, a coil constructing a part of a driver is not shown so as to more easily understand the sheet of drawings.

Figure 34:
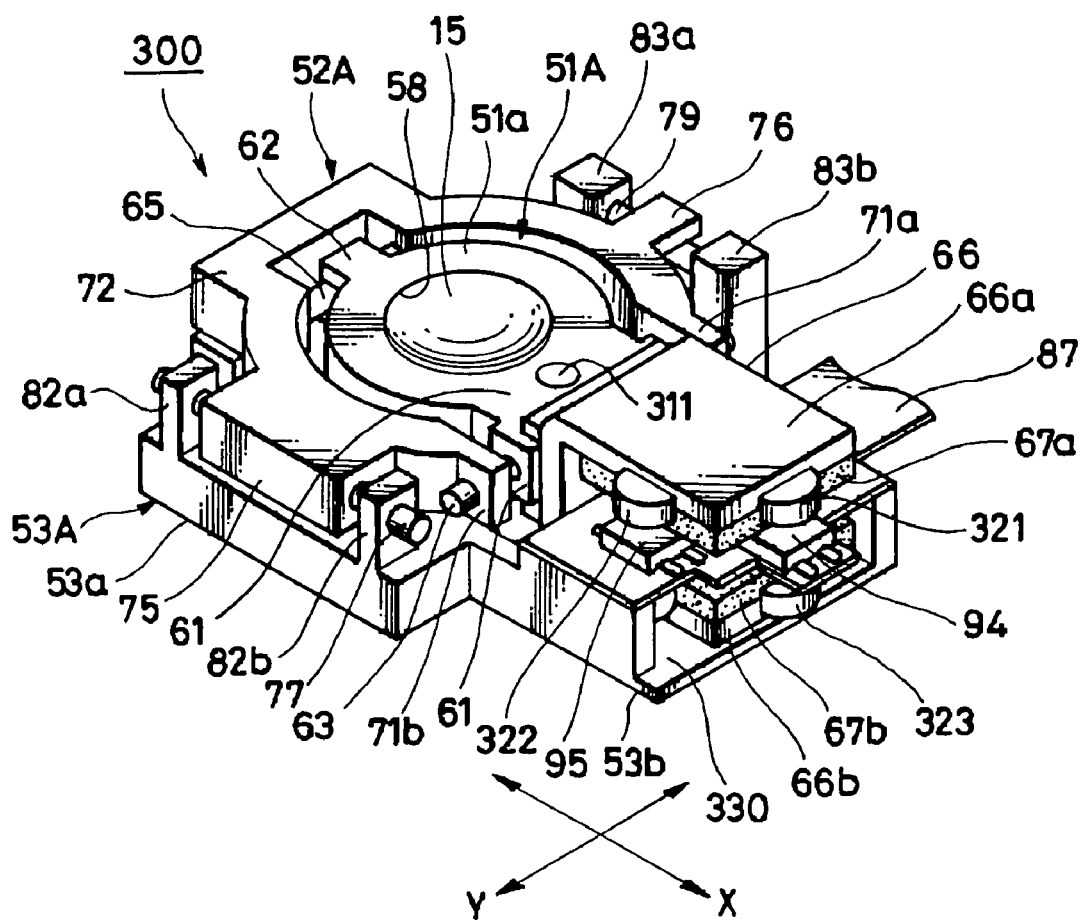
FIG. 34 is a perspective view showing a moving magnet system image stabilizer according to an embodiment of the present invention.
Figure 35:
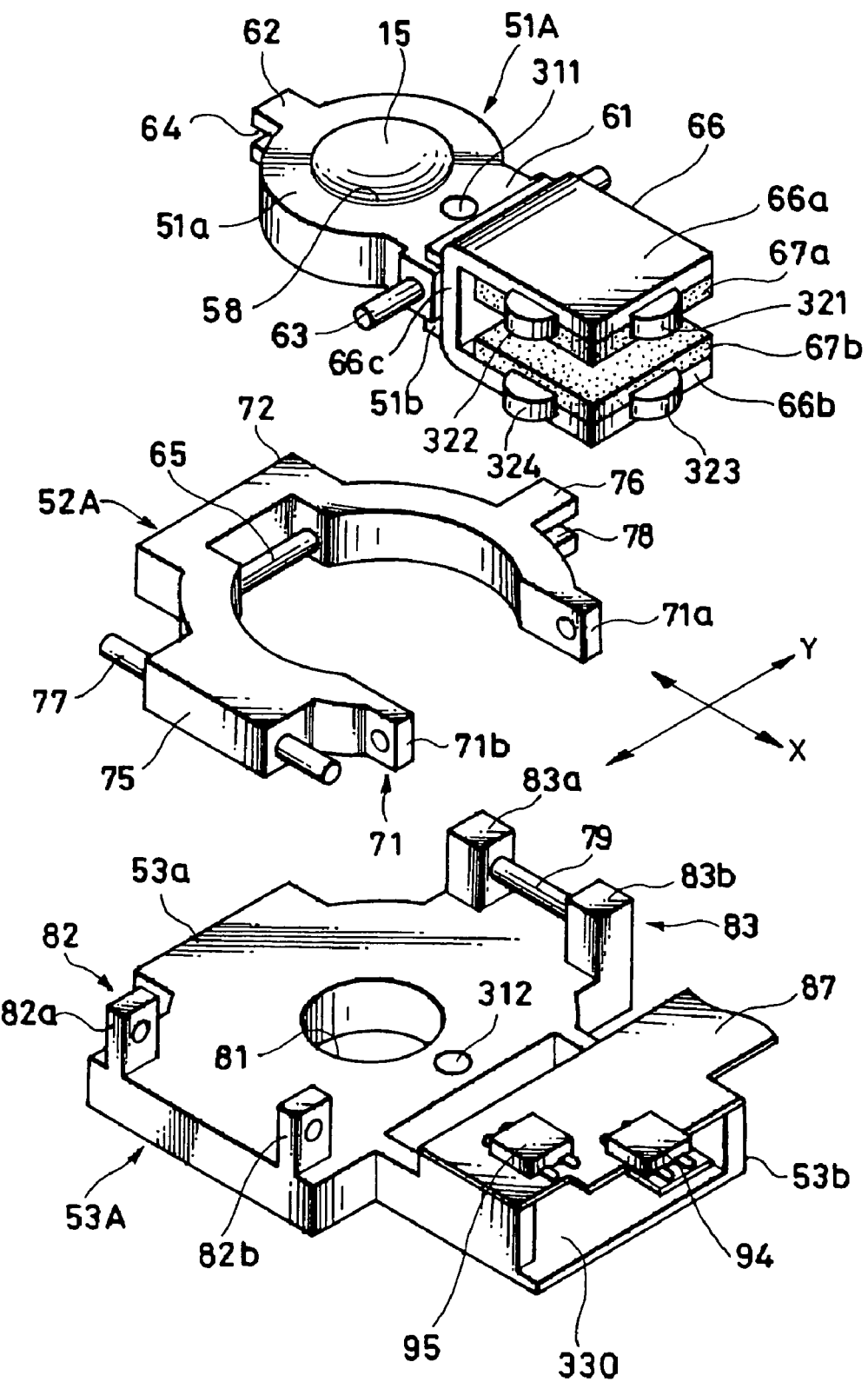
FIG. 35 is an exploded perspective view showing the image stabilizer shown in FIG. 34.
Figure 36A:
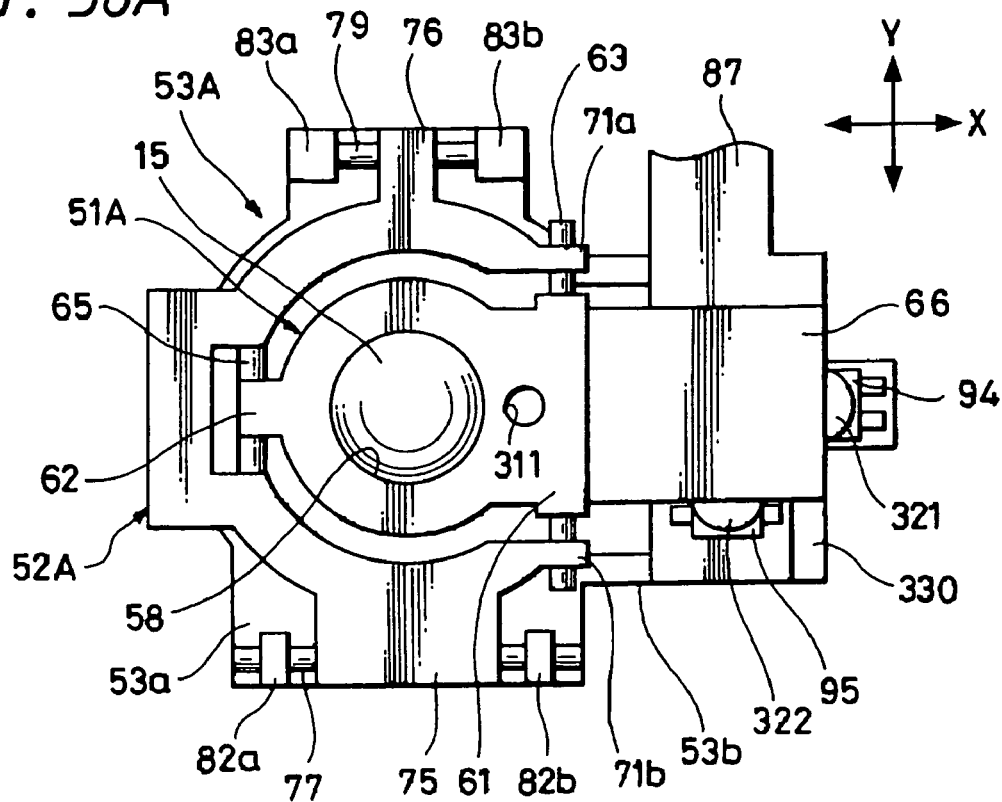
Figure 36B:
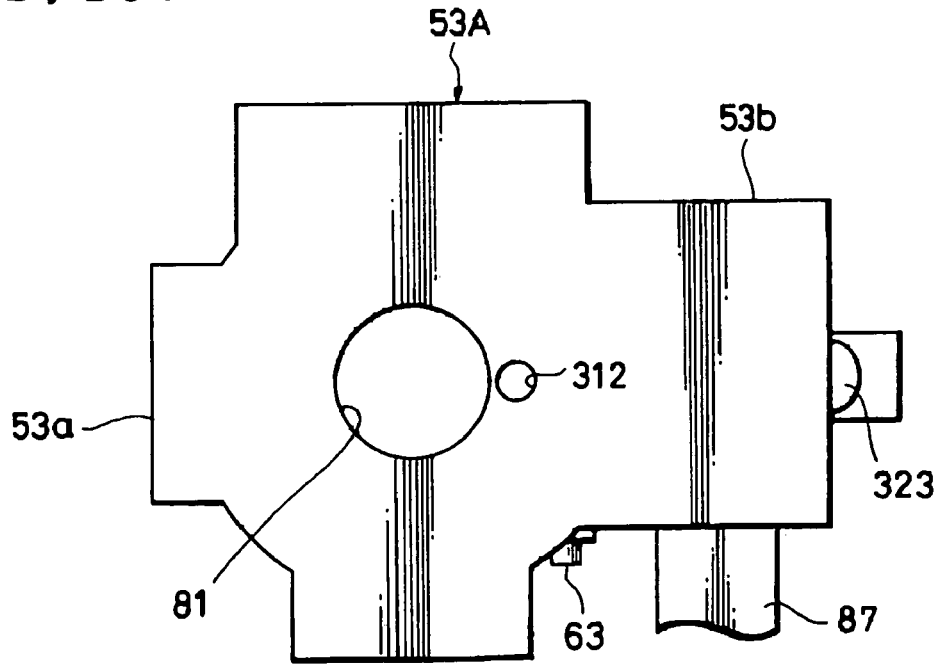
Figure 37A:
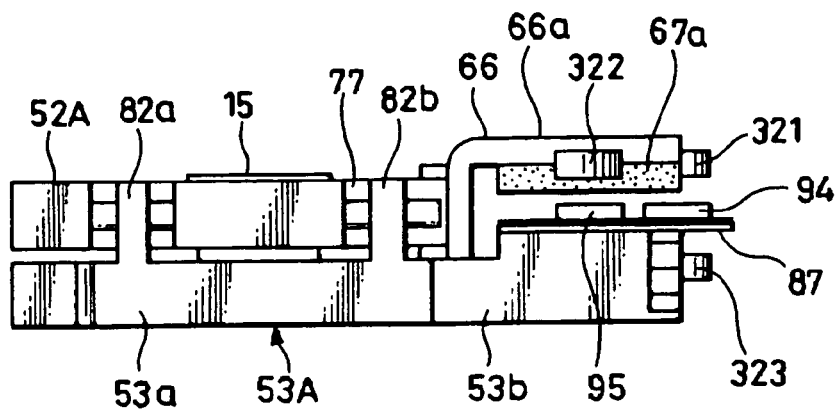
Figure 37B:
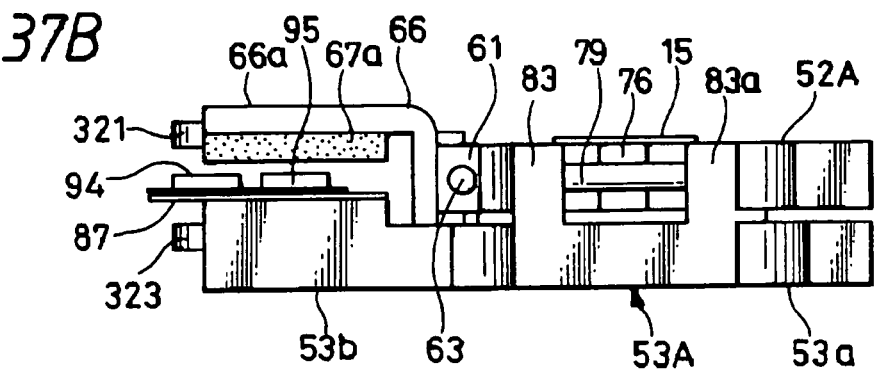
Figure 37C:
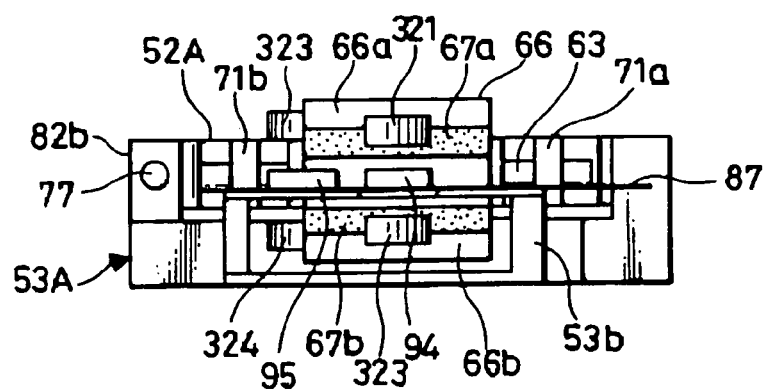
Figure 37D:
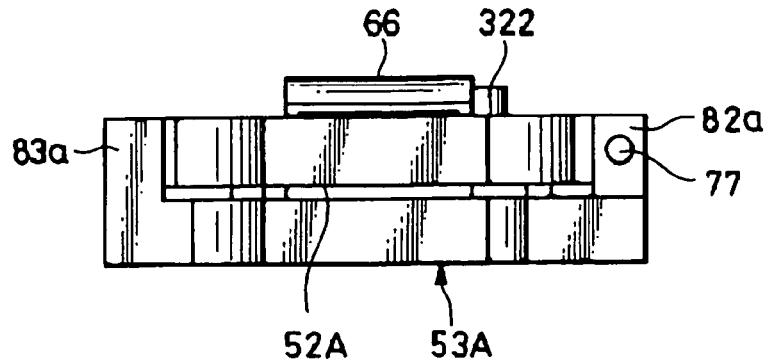
Figure 38:
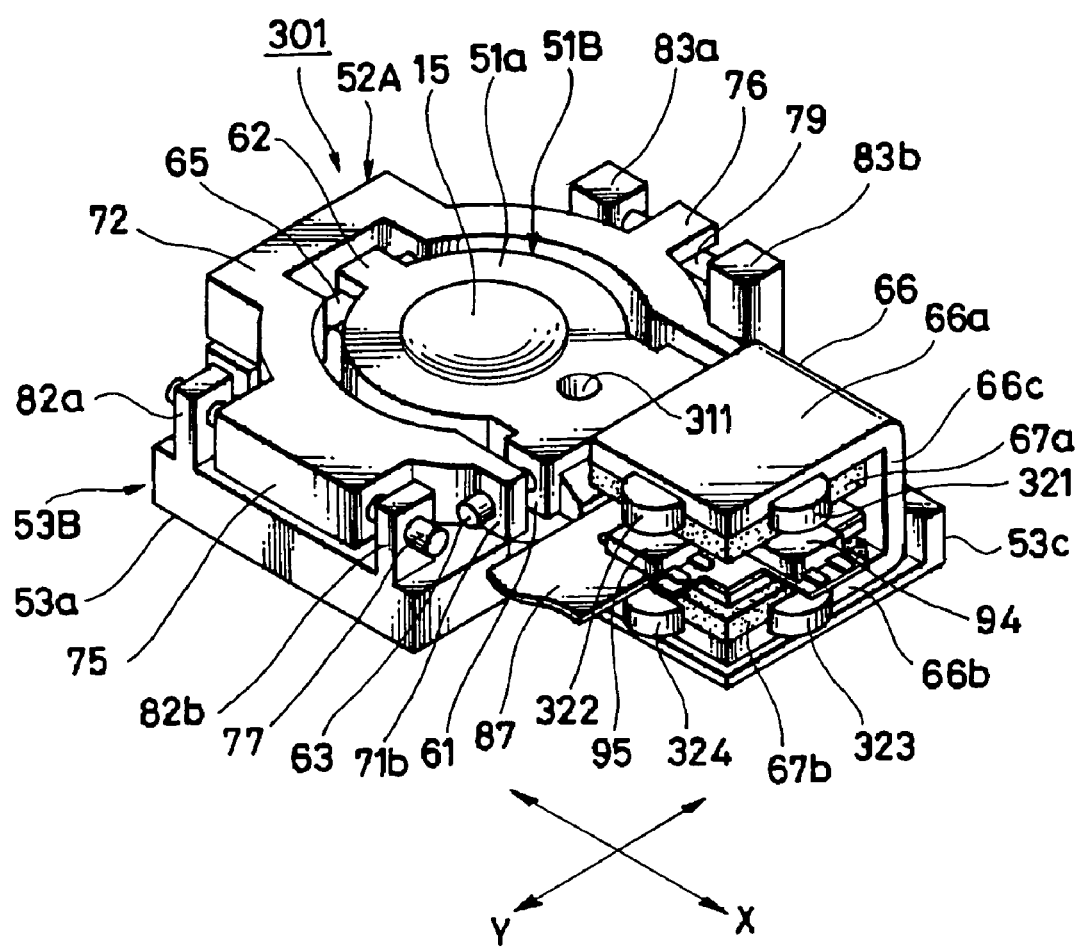
FIG. 38 is a perspective view showing a moving Hall element system image stabilizer according to an embodiment of the present invention.
Figure 39:
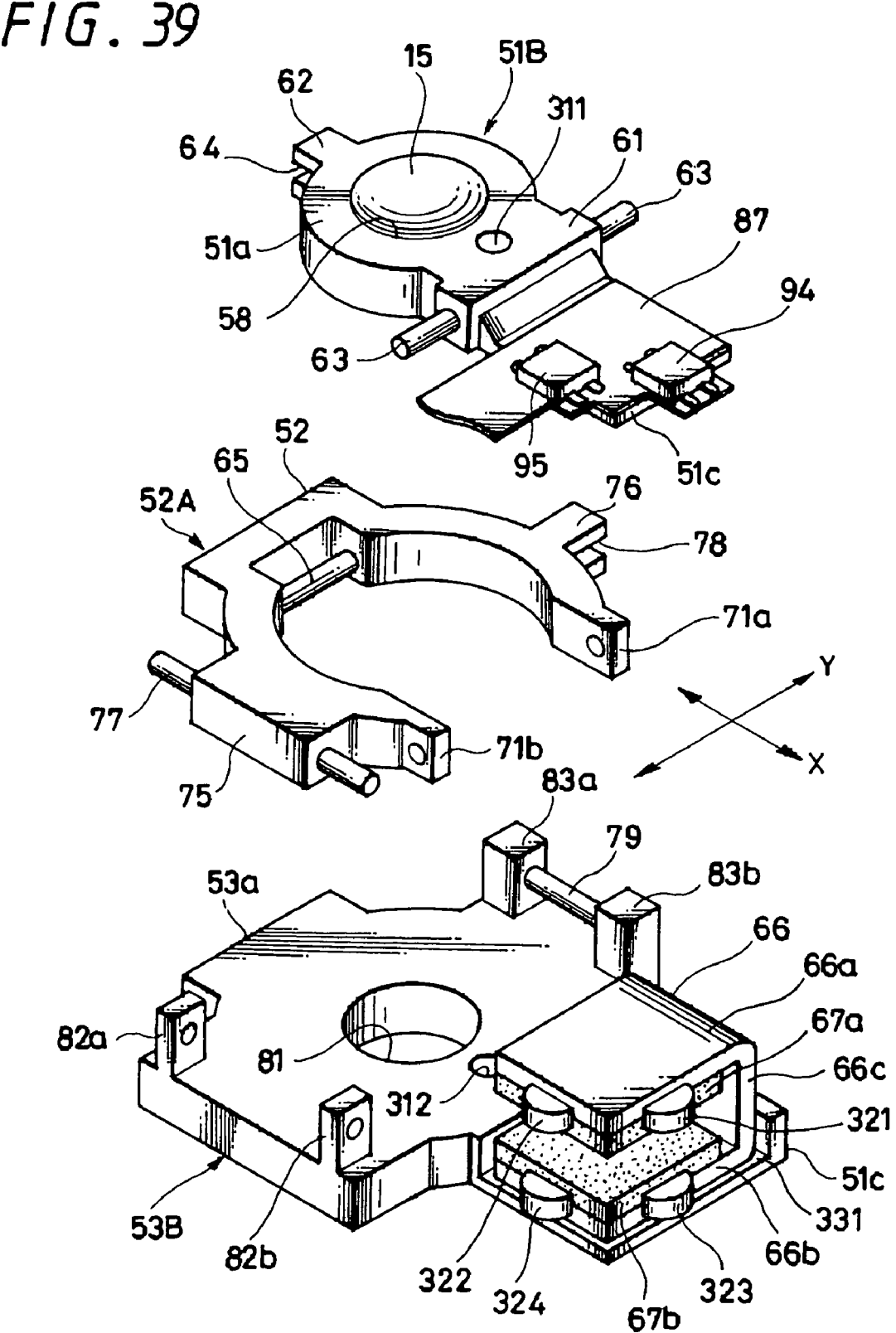
FIG. 39 is an exploded perspective view showing the image stabilizer shown in FIG. 38.
Figure 40A:
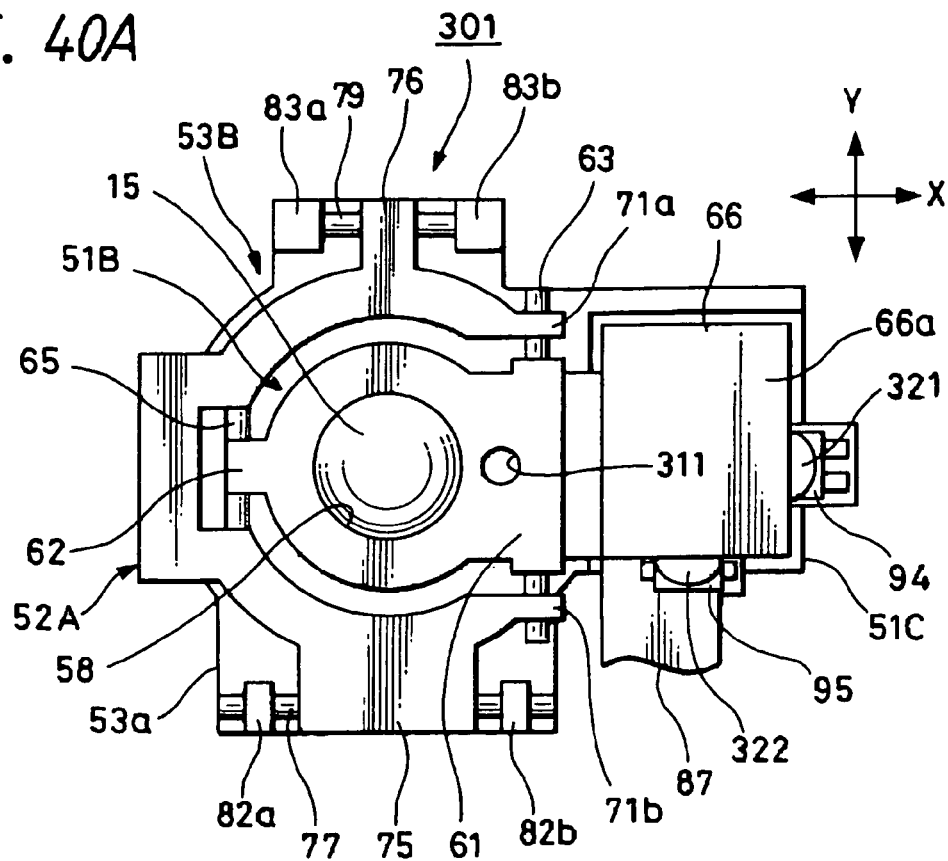
Figure 40B:
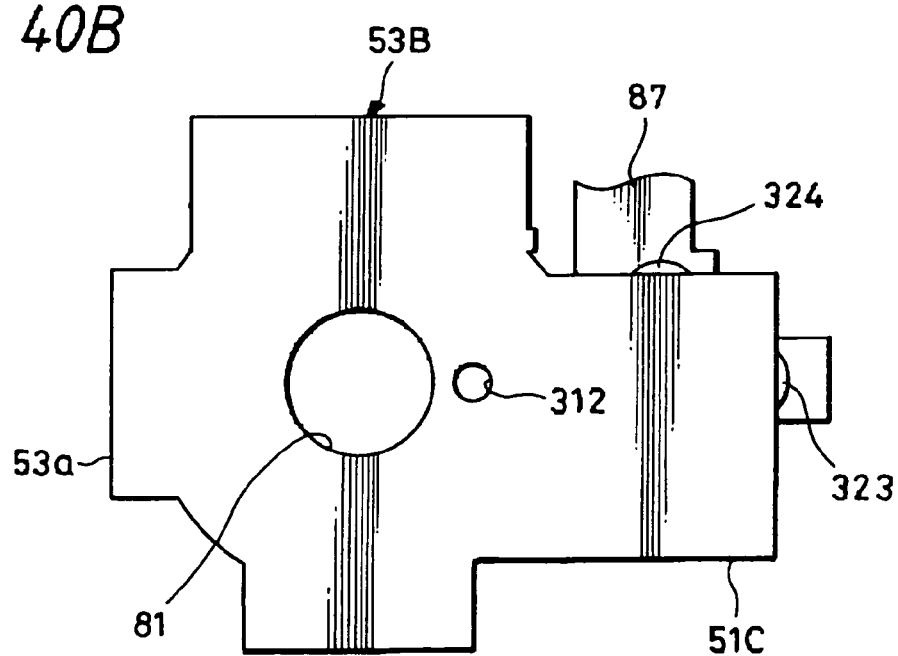
Figure 41A:
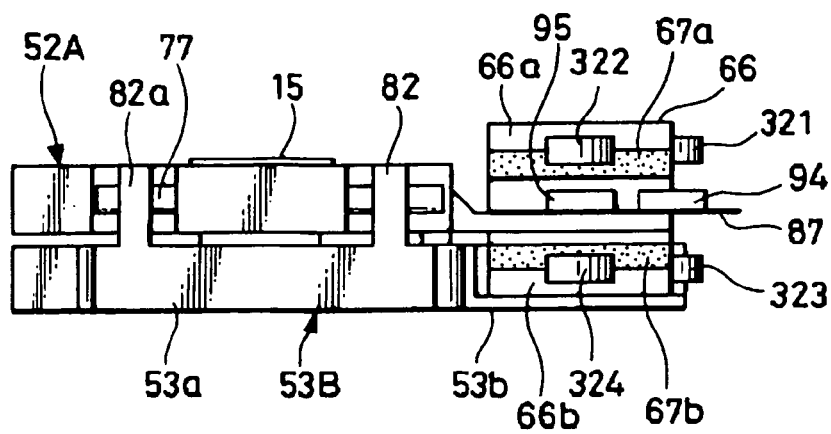
Figure 41B:
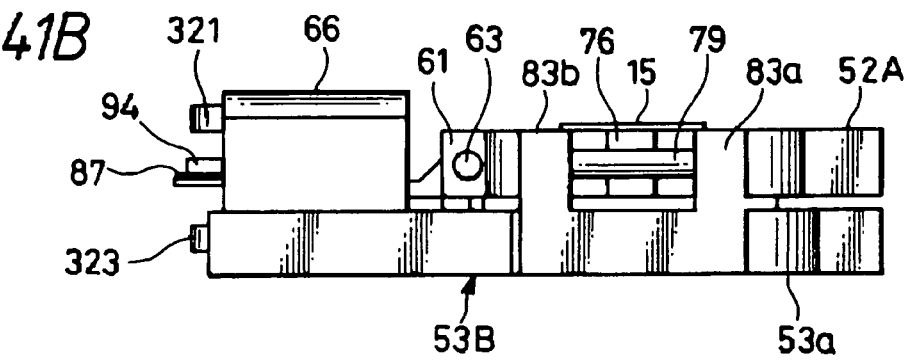
Figure 41C:
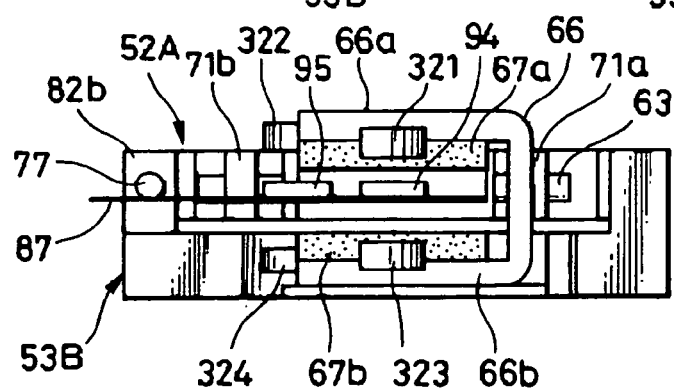
Figure 41D:
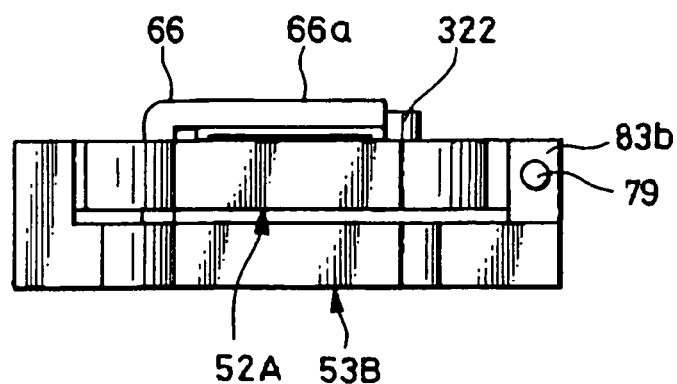

Specifically, FIG. 34 to FIGS. 37A, 37B, 37C and 37D show the example in which the present invention is applied to an image stabilizer including a moving magnet system driver in which the coil of the driver and the two Hall elements are fixed, the magnet being made movable. FIG. 34 is a perspective view showing the outward appearance of the image stabilizer. FIG. 35 is an exploded perspective view thereof, FIG. 36A is a plan view thereof, FIG. 36B is a bottom view thereof, FIG. 37A is a front view thereof, FIG. 37B is a right-hand side elevational view thereof and FIG. 37D is a left-hand side elevational view thereof. FIG. 38 to FIGS. 41A, 41B, 41C and 41D show the example in which the present invention is applied to an image stabilizer equipped with a moving coil (moving Hall element) system driver in which the magnet of the driver is fixed, the two Hall elements being made movable. FIG. 38 is a perspective view showing an outward appearance of the image stabilizer, FIG. 39 is an exploded perspective view thereof, FIG. 40A is a plan view thereof, FIG. 40B is a bottom view thereof, FIG. 41A is a front view thereof, FIG. 41B is a rear view thereof, FIG. 41C is a right-hand side elevational view and FIG. 41D is a left-hand side elevational view thereof.

Figure 42B:
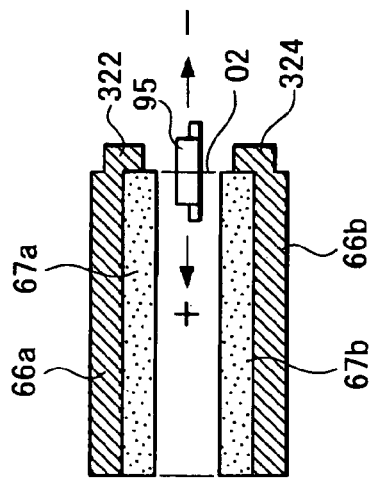
Figure 42D:
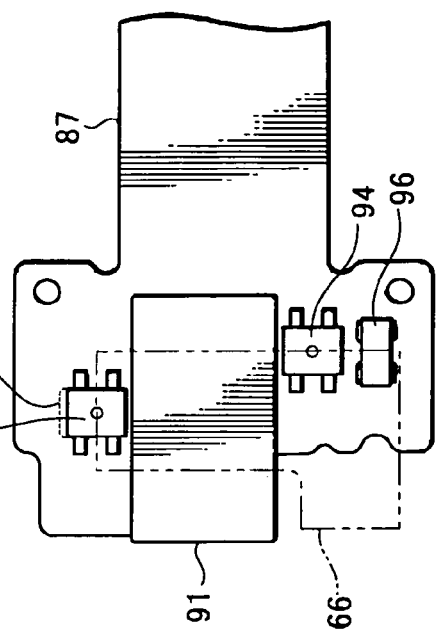
Figure 42A:
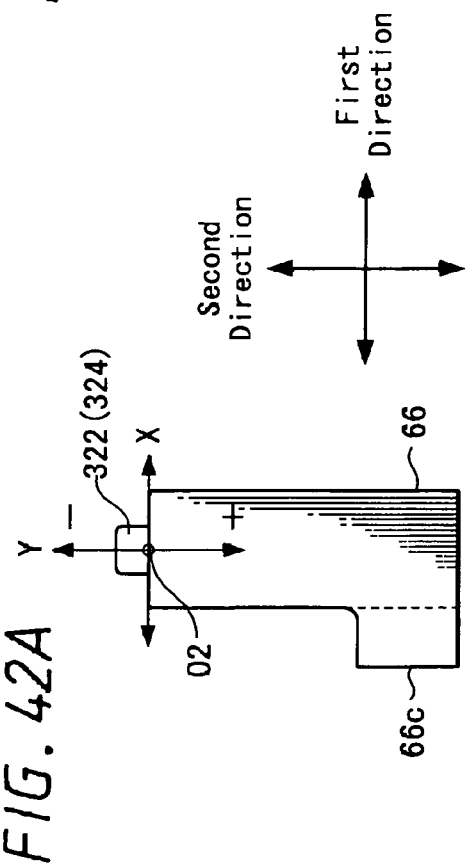
Figure 42C:
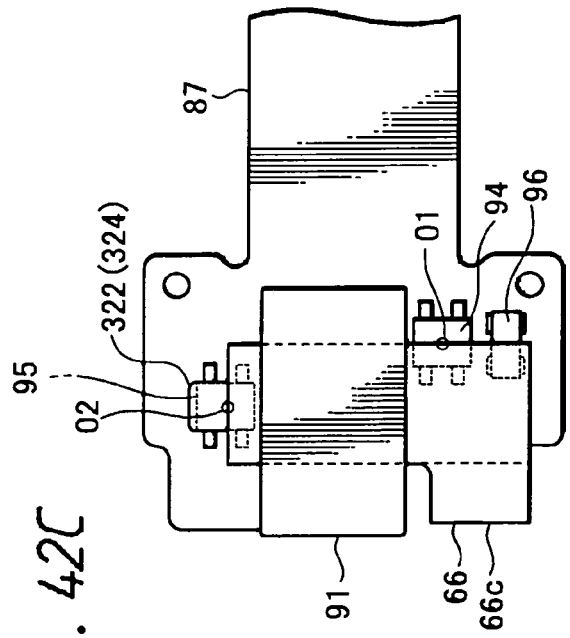
Figure 43A:
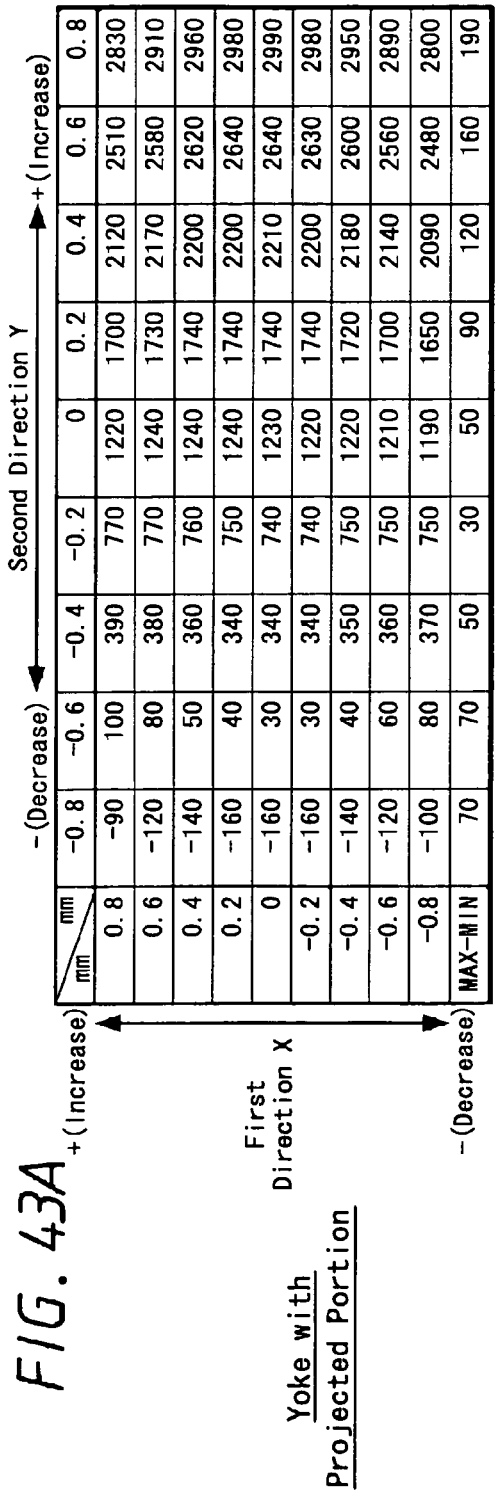
Figure 43B:
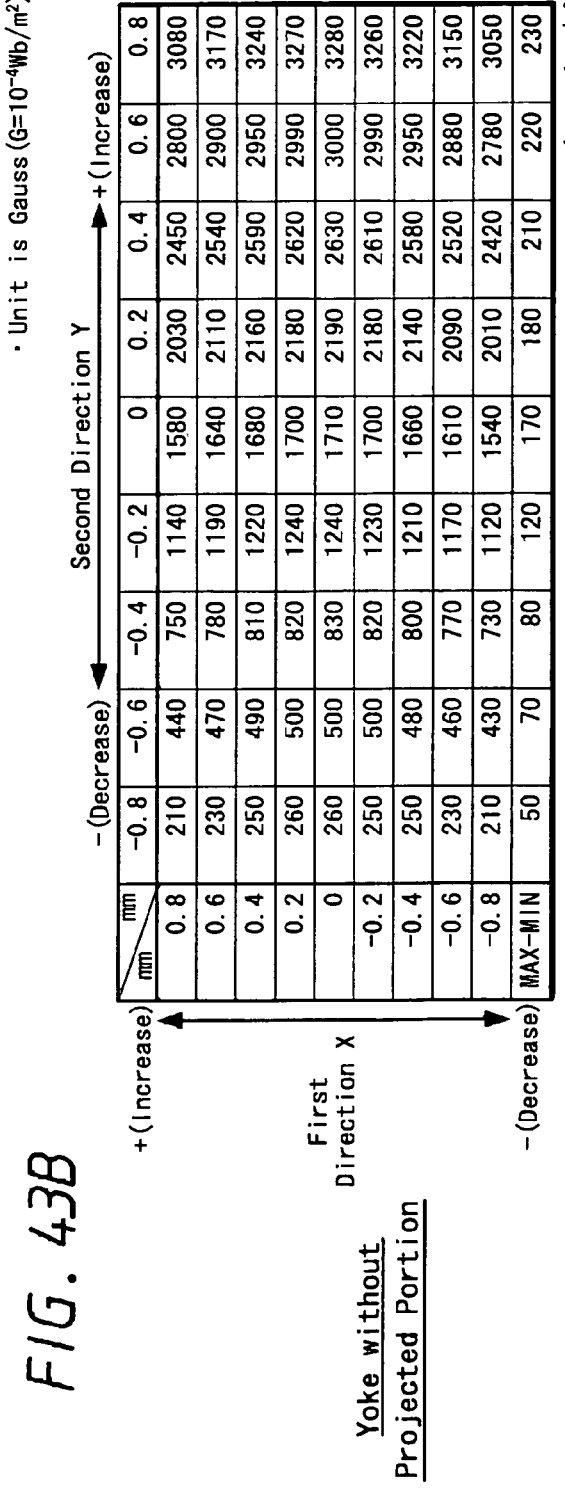
Figure 44A:
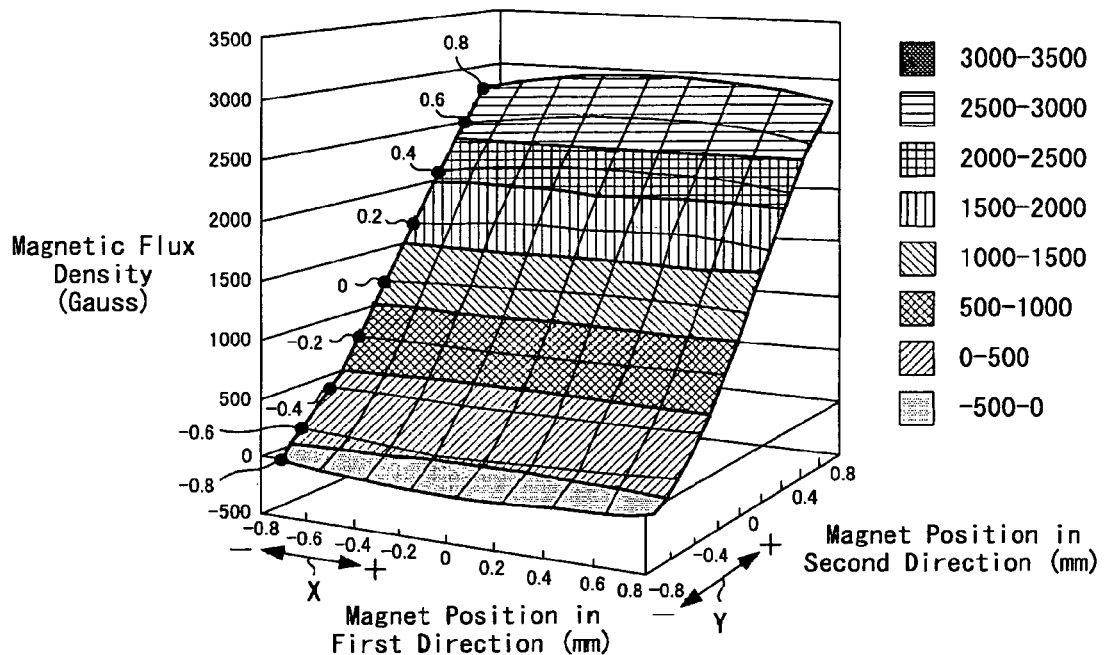
Figure 44B:
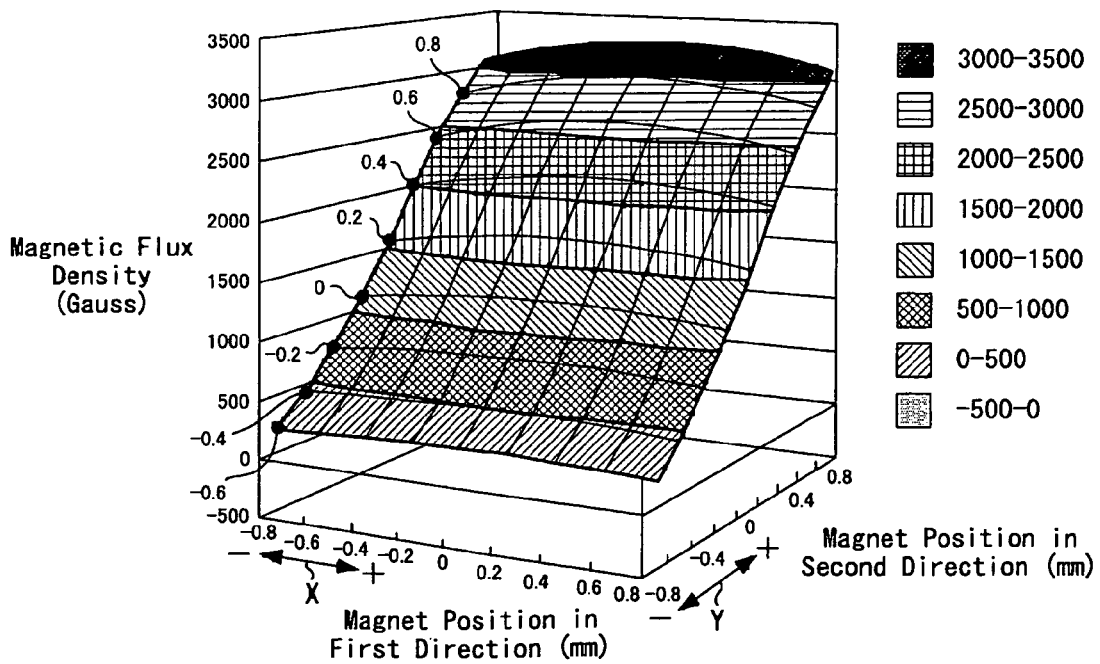
Figure 45:
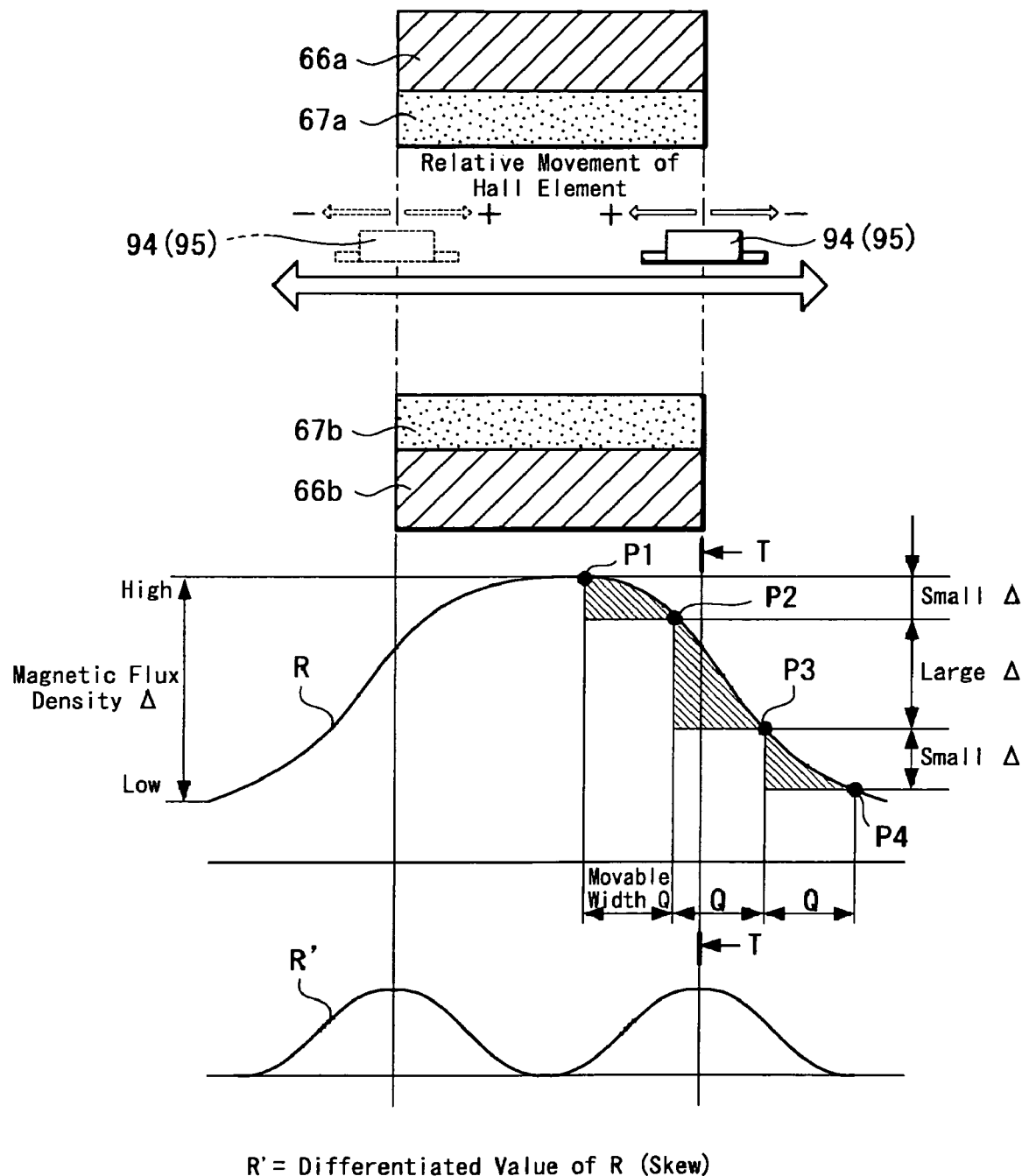
FIG. 45 is an explanatory diagram used to explain the state in which magnetic flux densities are detected by the Hall element shown in FIG. 42C.

FIGS. 42A, 42B, 42C and 42D are respectively diagrams used to explain positional relationships among the magnet, the yoke and the two Hall elements and so forth. FIG. 42A is a plan view of the magnet and the yoke, FIG. 42B is a longitudinal cross-sectional view thereof, FIG. 42C is an explanatory diagram showing positional relationships among the magnet, the yoke, the coil and the two Hall elements and FIG. 42D is an explanatory diagram showing positional relationships among the coil and the two Hall elements while the magnet and the yoke are omitted. FIGS. 43A and 43B are tables showing differences between values of magnetic flux densities detected by the Hall elements in the case in which the yoke includes the projected portion and in the case in which the yoke does not include the projected portion. FIG. 43A is a table showing detected values obtained when the yoke includes the projected portion, FIG. 43B is a table showing detected values obtained when the yoke does not include the projected portion, and FIGS. 44A and 44B are explanatory diagrams showing detected values shown in FIGS. 43A and 43B in the form of graphs. FIG. 45 is an explanatory diagram showing relationships between the position of the Hall element relative to the magnet and the magnetic flux density and FIGS. 46A, 46B and 46C are explanatory diagrams showing the cases in which the relationship shown in FIG. 45 is applied to the specific position.

As shown in FIGS. 1 to 11, a lens apparatus 1 shows a lens apparatus according to a first embodiment of the present invention. The lens apparatus 1 is composed of a lens system 2 including 5-group lenses having a plurality of lenses located on the same optical axis L, a lens-barrel 3 of lens for fixing the lenses of this lens system 2 or supporting the lenses of this lens system 2 such that they may become movable, a CCD ((charge-coupled device), that is, a solid-state imager device) 4 that shows a specific example of an imager fixed to the lens-barrel 3 of the lens, an image stabilizer 5 mounted onto the lens barrel 3 and which may stabilize the image of the lens system 2 and the like.

The lens system 2 of the lens apparatus 1 is configured as a collapsible lens composed of five-group lenses 7 to 11 having five-set lens groups located on the same optical axis L. Of the five-group lenses 7 to 11, the first group lens 7 located at the tip end side is composed of a first lens 7A which is an objective lens opposing the subject, a prism 7B located on the side of the objective lens 7A at its side opposite to the subject and a second lens 7C opposing the prism 7B. The prism 7B is a triangular prism of which cross-section is a rectangular equilateral triangle. The objective lens 7A opposes one of two surfaces adjoining to the positions displaced 90 degrees and the second lens 7C opposes the other surface.

In the first group lens 7, light introduced from one surface through the objective lens 7A into the prism 7B is reflected on the reflecting surface inclined 45 degrees relative to the optical axis L and thereby its traveling direction is bent 90 degrees. Then, this light is emitted from the other surface, passed through the second lens 7C and traveled toward the two-group lens 8 along the optical axis L. The two-group lens 8 is configured by a combination of the third lens 8A and the fourth lens 8B so as to become movable on the optical axis L. Light passed through the two-group lens 8 is introduced into the three-group lens 9.

The three-group lens 9 is composed of a fifth lens fixed to the lens-barrel 3 of the lens. The four-group lens 10 composed of a sixth lens is located behind the three-group lens 9. An iris mechanism 12 that can adjust a quantity of light passing through the lens system 2 is located between the four-group lens 10 and the three-group lens 9. The four-group lens 10 is constructed so as to become able to move the optical axis L. The five-group lens 11 composed of a seventh lens 11A and a correcting lens 15, which will be described later on, is located behind the four-group lens 10. Of the five-group lens 11, the seventh lens 11A is fixed to the lens-barrel 3 of the lens and the correcting lens 15 is located behind the seventh lens 11A such that it can move. Further, the CCD 4 is located behind the correcting lens 15.

The two-group lens 8 and the four-group lens 10 can separately and independently move toward the optical axis direction along the optical axis L. The user can adjust zooming and focusing by moving the two-group lens 8 and the four-group lens 10 in predetermined directions. More specifically, upon zooming adjustment, the user is able to adjust zooming by moving the two-group lens 8 and the four-group lens 10 from the wide-angle to the telephoto. Upon focusing adjustment, the user is able to adjust focusing by moving the four-group lens 10 from the wide-angle to the telephoto.

The CCD 4 is fixed to a CCD adapter and it is attached to the lens-barrel 3 of the lens through this CCD adapter. An optical filter 14 is located ahead of the CCD 4 and the image stabilizer 5 including the correcting lens 15 is located between this optical filter 14 and the seventh lens 11A. The image stabilizer 5 that will be described in detail later on is adapted to correct blurry images generated on the shot image from movement and vibration of the lens system 2. In the ordinary state, the correcting lens 15 is attached in such a manner that the optical axis thereof is matched with the optical axis L of the lens system 2. When an image is blurred on the focusing screen of the CCD 4 by movement and vibration of the camera body and the like, the image stabilizer 5 is able to correct blurry images on the focusing screen of the CCD 4 by moving the correcting lens 15 in the two directions (first direction X and second direction Y) perpendicular to the optical axis L.

The lens-barrel 3 of the lens which holds the lens system 2 having the above-mentioned arrangement is composed of an upper lens-barrel 16, a middle lens-barrel 17 and a lower lens-barrel 18 which can be assembled and joined in the upper and lower direction as shown in FIGS. 1 to 11. The upper lens-barrel 16 is composed of an opening window 19 which is opened in the upper portion of the front and a case having an opening portion opened in the lower surface. The objective lens 7A of the one-group lens 7 is mounted onto the opening window 19 and the objective lens 7A is attached to the upper lens-barrel 18 by a panel 21 mounted onto the front of the opening window 19. The prism 7B located at the back of the objective lens 7A through a light-shielding plate 22 and the second lens 7C located on the lower surface of this prism 7B are fixed within the upper lens-barrel 16.

Within the upper lens-barrel 16, a first movable holding frame 23 is supported in such a manner that it may be able to move in the upper and lower direction parallel to the optical axis L of the lens system 2 extending in the upper and lower direction of the lens-barrel 3 of the lens. The first movable holding frame 23 has a through-hole bored through the upper and lower direction and the two-group lens 8 is fixed to the through-hole. The first movable holding frame 23 is configured in such a manner that it can be moved forward and backward within a predetermined range in the direction of the optical axis L of the lens system 2 by a zoom driving mechanism 24 attached to the upper lens-barrel 16.

The zoom driving mechanism 24 is composed of a zoom motor 25, a feed screw shaft 26 provided as a rotary shaft of the zoom motor 25, a feed nut 27 engaged with this feed screw shaft 26 and the like. The zoom motor 25 is fixed to a U-like first bracket 28 and two end portions of the feed screw shaft 26 projected to one end are supported by the first bracket 28 so as to become freely rotatable. The first bracket 28 is attached to the upper lens-barrel 16 by a plurality of fixing screws 29a (two fixing screws 29a in this embodiment) which shows a specific example of a fastening mechanism.

In the state in which the first bracket 28 is attached to the upper lens-barrel 16, the feed nut 27 is slidably engaged with the feed screw shaft 26. The feed nut 27 is held by the first movable holding frame 23 in the state in which it may be restricted from moving in the direction in which the thread grooves thereof are extended. Further, the first movable holding frame 23 has two guide shafts 31a and 31b bored thereon so as to become slidable in the direction parallel to the optical axis L. One ends of the two guide shafts 31a and 31b are held to the upper lens-barrel 16 and the other ends thereof are held to the middle lens-barrel 17.

Thus, when the zoom motor 25 is driven, turning force of the feed screw shaft 26 is transmitted through the feed nut 27 to the first movable holding frame 23. At that time, the feed nut 27 is relatively moved in the axial direction relative to the feed screw shaft 26 rotating at the predetermined position. As a consequence, the first movable holding frame 23 is moved in unison with the feed nut 27, whereby the two-group lens 8 is selectively moved in either the direction in which it approaches the one-group lens 7 or the direction in which it approaches the three-group lens 9 in response to the turning direction of the zoom motor 25. At that time, since the first movable holding frame 23 holding the two-group lens 8 is guided in the direction parallel to the optical axis L by the two guide shafts 31a and 31b, the first movable holding frame 23 is able to move on the optical axis L with high accuracy.

The iris mechanism 12 located under the three-group lens 9 fixedly held to the middle lens-barrel 17 is composed of a diaphragm member 32 of which opening area can be adjusted freely, a diaphragm supporting plate 33 for movably supporting this diaphragm member 32, a stepping motor 34 for opening and closing the diaphragm member 32 and so forth. The stepping motor 34 is fixed to the side portion of the upper surface of the middle lens-barrel 17 through a motor base 35. The middle lens-barrel 17 is placed on the lower lens-barrel 18 and the upper lens-barrel 16 is placed on the middle lens-barrel 17. These three lens-barrels 16, 17 and 18 are fastened and fixed together by a plurality of fixing screws 29b (three fixing screws 29b, 29b, 29b in this embodiment) bored through these lens-barrels 16, 17 and 18 in the upper and lower direction and thereby integrally assembled as the lens-barrel 3 of the lens.

The lower lens-barrel 18 is formed of a case which is opened in the upper surface, the side surface and the lower surface. Within the case of the lower lens-barrel 18, there is supported a second movable holding frame 36 which can be moved in the upper and lower direction parallel to the optical axis L of the lens system 2. The second movable holding frame 36 has a through-hole bored thereon in the upper and lower direction and the four-group lens 10 is fixed to that through-hole. The second movable holding frame 36 is configured such that it can be moved forward and backward within a predetermined range in the direction of the optical axis L of the lens system 2 by a focus driving mechanism 37 attached to the lower lens-barrel 18.

The focus driving mechanism 37 is composed of a focusing motor 38, a feed screw shaft 39 provided as a rotary shaft of this focusing motor 38, a feed nut 41 engaged with this feed screw shaft 39 and so forth. The focusing motor 38 is fixed to a U-like second bracket 42 and respective end portions of the feed screw shaft 39 projected to one end of the second bracket 42 is rotatably supported at the respective ends by the second bracket 42. The second bracket 42 is attached to the lower lens-barrel 18 by a plurality of fixed screws 29c (two fixed screws 29c, 29c) serving as fastening mechanisms.

In the state in which the second bracket 42 is attached to the lower lens-barrel 18, a feed nut 41 is slidably engaged with the feed screw shaft 39. The feed nut 41 is held to the second movable holding frame 36 in the state in which it is restricted from moving in the direction in which its screw thread grooves are extended. Further, two guide shafts 43 (only one guide shaft 43 is shown in FIG. 11) slidably penetrate the second movable holding frame 36 in the direction parallel to the optical axis L. One ends of the two guide shafts 43 are held to the middle lens-barrel 17 and the other ends thereof are held to the lower lens-barrel 18.

Thus, when the focusing motor 38 is driven, turning force of the feed screw shaft 39 is transmitted through the feed nut 41 to the second movable holding frame 36. At that time, the feed nut 41 is relatively moved in the axial direction of the feed screw shaft 39 that is rotated at the predetermined position. As a result, the second movable holding frame 36 is moved in unison with the feed nut 41, whereby the four-group lens 10 is selectively moved in the direction in which it approaches the three-group lens 9 and in the direction in which it approaches the five-group lens 11 in response to the rotation direction of the focusing motor 38. At that time, since the second movable holding frame 36 that holds the four-group lens 10 is guided in the direction parallel to the optical axis L by the two guide shafts 43, it can move on the optical axis L with high accuracy.

The CCD 4 is attached to the lower surface of the lower lens-barrel 18 through a CCD adapter 44. The CCD adapter 4 is formed of a plate body with a square opening hole bored through the central portion thereof and the CCD 4 is integrally fastened to one surface of the CCD adapter 44 by a fastening mechanism such as an adhesive through a square frame-like seal rubber 45. A light-shielding plate 46 to which the optical filter 14 is attached is disposed on the other surface of the CCD adapter 44. The CCD adapter 44 and the light-shielding plate 46 are pressed by a filter pressing plate 47 and thereby fixed together. Then, in the state in which the optical filter 14 is located at the inside, the CCD adapter 44 is attached to the lower lens-barrel 18 by a fastening mechanism such as fixed screws.

The image stabilizer 5 is detachably attached to an opening portion 48 opened in the side surface of this lower lens-barrel 18. The image stabilizer 5 has the arrangement shown in FIGS. 18 to 27. This image stabilizer 5 includes the above-mentioned correcting lens 15, a first moving frame 51 for supporting this correcting lens 15 and a second moving frame 52 for supporting the first moving frame 51 in such a manner that the first moving frame 51 can move in the first direction X perpendicular to the optical axis L of the lens system 2. There are also included a fixed base 53 for supporting the second moving frame 52 in the second direction Y perpendicular to the optical axis L and which is also perpendicular to the first direction X, an actuator 54 which shows a specific example of a driver for moving the first moving frame 51 in the first direction X and moving the second moving frame 52 in the second direction Y, position detectors 94, 95 for detecting the position of the correcting lens 15 and the like.

When the camera body is shaken or vibrated by hand shake which will be described later on, the correcting lens 15 moves its position in the first direction X or the second direction Y in response to a quantity in which the camera body is shaken to thereby stabilize the image. As shown in FIG. 23, the correcting lens 15 has at its outer peripheral edge formed a stepped portion 15a continuing at one surface side in the circumferential direction. Further, two recesses corresponding to the diameter direction are formed on the outer peripheral edge of the correcting lens 15, thereby two-surface width portions 15a and 15b being formed. This correcting lens 15 is fixed to the first moving frame 51 which shows a first specific example of the moving frame.

As shown in FIGS. 23 and 24, the first moving frame 51 is composed of an annular lens fixed portion 51a into which the correcting lens 15 is fitted, a crank-like yoke fixed portion 51b continuously formed to one side of the lens fixed portion 51a and to which a yoke 66 is fixed and the like. The lens fixed portion 51a has a shape corresponding to that of the correcting lens 15, and a stepped portion that is engaged with the stepped portion 15a of the correcting lens 15 is provided on the peripheral edge of a fitted hole 58 into which the correcting lens 15 is fitted. Further, the lens fixed portion 51a includes two-surface width portions 51c and 51d corresponding to the two-surface width portions 15a and 15b of the correcting lens 15 and a yoke fixed portion 51b is continued to one side of the direction (first direction X) perpendicular to the direction (second direction Y) to which the two-surface width portions 51c and 51d are opposed.

A first main bearing portion 61 and a first sub bearing portion 62 are provided at the outsides of the two-surface width portions 51c and 51d of the lens fixed portion 51a. The first main bearing portion 61 includes two bearing pieces 61a and 61b which are provided in the first direction X with a predetermined space therebetween. A first main guide shaft 63 penetrates the two bearing pieces 61a and 61b in the first direction X. The first main guide shaft 63 is inserted into and fixed to the two bearing pieces 61a and 61b by press fitting. Respective end portions of the first main guide shaft 63 are projected to the outside from the bearing pieces 61a and 61b, respectively. A bearing groove 64 opened in the lateral direction is bored through the first sub bearing portion 62. A first sub guide shaft 65 is slidably engaged into this bearing groove 64.

The yoke 66 that constructs a part of the actuator 54 is fixed to the yoke fixed portion 51b of the first moving frame 51 by a fastening mechanism such as an adhesive and fixed screws. As shown in FIG. 25, the yoke 66 is composed of an upper piece 66a and a lower piece 66b parallelly opposed to each other with a predetermined space therebetween and a joint piece 66c which joints the upper and lower pieces 66a and 66b. The joint piece 66c is provided on one side of the longitudinal direction of the upper and lower pieces 66a and 66b and a recess 66d into which a part of the yoke fixed portion 51b of the first moving frame 51 is inserted is formed on the lateral direction of the joint piece 66c.

The recess 66d of the yoke 66 is provided in order to approach a coil assembly body 93, which will be described later on, to the correcting lens 15 more. This recess 66d makes it possible to miniaturize the actuator 54 more. Rectangular flat magnets 67a and 67b which are substantially equal to the upper piece 66a and the lower piece 66b in size are respectively fixed to the two inner surfaces of the upper piece 66a and the lower piece 66b of the yoke 66 by a fastening mechanism such as an adhesive. The two magnets 67a and 67b opposing in the upper and lower direction and the yoke 66 constitute a magnetic circuit. Specifically, one set of a magnetic circuit member composed of one yoke 66 and the two magnets 67a and 67b serves as a magnetic circuit for a first driver and a magnetic circuit for a second driver as well.

As shown in FIG. 23, the second moving frame 52 which shows the second specific example of the moving frame is formed of a flat plate body which is slightly wider than the first moving frame 51. The second moving frame 52 is opposed to the underside of the first moving frame and assembled thereto. The second moving frame 52 has a through-hole 68 of substantially the same size as the first fitting hole 58 bored at its position opposing the fitting hole 58 of the first moving frame 51. A second bearing portion is provided on the upper surface of the second moving frame 52 in order to support the first moving frame 51 such that the first moving frame 51 can slide in the first direction X.

The second bearing portion is composed of a second main bearing portion 71 for slidably supporting the first main guide shaft 63 fixed to the first moving frame 51 and a second sub bearing portion 72 for fixedly supporting the first sub guide shaft 65. The second main bearing portion 71 is located at the position in which it is able to support respective end portions of the first main guide shaft 63 in the state in which the first moving frame 51 is placed over the second moving frame 52. Specifically, the second main bearing portion 71 is composed of two bearing pieces 71a and 71b to support respective end portions of the first main guide shaft 63 and it is provided so as to project upwardly on the upper surface of the second moving frame 52.

The two bearing pieces 71a and 71b of the second main bearing portion 71 are spaced apart a distance which results from adding a length long enough for the first moving frame 51 to move in the first direction X to the length in which the first main bearing portion 61 extends in the first direction X. The two bearing pieces 71a and 71b have bearing holes bored thereon and the two end portions of the first main guide shaft 63 are slidably inserted into these bearing holes, respectively.

Also, the second sub bearing portion 72 is located at the position corresponding to the first sub bearing portion 62 in the state in which the first moving frame 51 is placed over the second moving frame 52. Specifically, the second sub bearing portion 72 is composed of two bearing pieces 72a and 72b for supporting respective end portions of the first sub guide shaft 65. The two bearing pieces 72a and 72b have bearing holes bored thereon and two end portions of the first sub guide shaft 65 are inserted into and fixed to these bearing holes by press fitting. The first sub guide shaft 65 is slidably inserted into a bearing groove 64 formed on the first sub bearing portion 62 of the first moving frame 51. The first sub guide shaft 65 and the first main guide shaft 63 are set such that their axial lines may become parallel to each other. The first moving frame 51 is guided by the first sub guide shaft 65 and the first main guide shaft 63 such that it can move in the first direction X.

A third bearing portion is provided on the lower surface of the second moving frame 52 in order to support the second moving frame 52 such that the second moving frame 52 can slide in the second direction Y perpendicular to the first direction X. The third bearing portion is composed of a third main bearing portion 75 and a third sub bearing portion 76. The third sub bearing portion 75 is composed of two bearing pieces 75a and 75b located at one end portion of the first direction X of the second moving frame 52 and which are located with a predetermined space therebetween in the second direction Y. The two bearing pieces 75a and 75b have bearing holes bored thereon, respectively, and two end portions of a second main guide shaft 77 extended in the second direction Y are slidably inserted into these bearing holes, respectively.

Also, the third sub bearing portion 76 is provided on the second moving frame 52 at substantially the central portion of its other end portion of the first direction X. A bearing groove 78 opened in the lateral direction is provided on the third sub bearing portion 76. A second sub guide shaft 79 extended in the second direction Y perpendicular to the first direction X is slidably engaged with this bearing groove 78. The second main guide shaft 77 and the second sub guide shaft 79 are fixed to the fixed base 53, respectively. The fixed base 53 shows a specific example of a supporting frame and the second moving frame 52 is opposed to and assembled to this fixed base 53.

As shown in FIG. 23, the fixed base 53 is composed of a moving frame supporting portion 53a of size corresponding to the second moving frame 52, a coil fixed portion 53b continuously formed as one body with this moving frame supporting portion 53a and the like. The moving frame supporting portion 53a is formed of a flat plate body which is substantially the same as the second moving frame 52 in size, and the coil fixed portion 53b is continued to one end of this moving frame supporting portion 53a in the first direction X. The moving frame supporting portion 53a has a through-hole 81 substantially the same size as the through-hole 68 of the second moving frame 52 at its position corresponding to the through-hole 69 of the second moving frame 52. A fourth bearing portion is provided on the upper surface of the moving frame supporting portion 53a at its respective end portions of the first direction X in such a manner that it can slide the second moving frame 52 in the second direction Y through the second guide shaft.

The fourth bearing portion is composed of a fourth main bearing portion 82 located on one side of the first direction X and a fourth sub bearing portion 83 located on the other side of the first direction X. The fourth main bearing portion 82 is composed of two bearing pieces 82a and 82b provided with a proper space in the second direction Y and they are upwardly projected over the upper surface of the moving frame supporting portion 53a. The two bearing pieces 82a and 82b have bearing holes bored thereon, respectively, and two axial direction middle portions of the second main guide shaft 77 are inserted into and fixed to these bearing holes by press fitting. Accordingly, respective end portions of the second main guide shaft 77 are respectively projected toward the outsides of the two bearing pieces 82a and 82b.

The two bearing pieces 75a and 75b of the third main bearing portion 75 provided on the second moving frame 52 are slidably engaged with projected portions of both ends of the second main guide shaft 77. The two bearing pieces 75a and 75b are spaced apart a distance which results from adding a length long enough for the second moving frame 52 to move in the second direction Y to the lengths of the two bearing pieces 82a and 82b. Accordingly, the third main bearing portion 75 of the second moving frame 52 is supported to the second main guide shaft 77 fixed to the fourth main bearing portion 82 of the fixed base 53 such that it can move at the outsides of the two bearing pieces 82a and 82b.

Also, the fourth sub bearing portion 83 is composed of two bearing pieces 83a and 83b provided with a proper space therebetween in the second direction Y and they are provided so as to upwardly project to the upper surface of the moving frame supporting portion 53a. The two bearing pieces 83a and 83b have bearing holes bored thereon. A second sub guide shaft 79 is inserted into and fixed to these bearing holes by press fitting and thereby supported at its respective end portions in the axial direction. Between the two bearing pieces 83a and 83b, the bearing groove 78 of the third sub bearing portion 76 provided on the second moving frame 52 is slidably engaged with the second sub guide shafts 79. Accordingly, the third sub bearing portion 76 is guided by the second sub guide shaft 79 between the two bearing pieces 83a and 83b such that it can move a predetermined distance in the second direction Y.

The coil fixed portion 53b of the fixed base 53 is formed of a substantially square flat portion having a supporting wall 48 projecting in the upper direction and the supporting wall 84 is located at one side of the second direction Y. A coil supporting holder 85 is fixed to the coil fixed portion 53b and a coil assembly body 93 is attached to the coil supporting holder 85. As shown in FIG. 25, the coil supporting holder 85 is provided in order to keep the coil assembly body 93 at a predetermined height and it is formed as a frame body having a U-like flat surface. This coil supporting holder 85 is placed on the coil fixed portion 53b so as to extend along the supporting wall 84 and it is integrally fixed to the fixed base 53 by a fastening mechanism such as an adhesive and fixed screws. An attachment boss portion 53c for fixing the fixed base 53 to the lens-barrel 3 of the lens is provided on the lower surface of the fixed base 53.

The upper surface of the coil supporting holder 85 is formed as a flat surface and two positioning convex portions 85a and 85a for properly positioning a flexible reinforcing plate 86 are provided on the upper surface of the coil supporting holder 85. The two positioning convex portions 85a and 85a are located at a predetermined space in the second direction Y and the flexible reinforcing plate 86 properly positioned by the two positioning convex portions 85a and 85a is fixed to the upper surface of the coil supporting holder 85. A flexible printed circuit board 87 in which predetermined electric circuits are printed and molded in the upper and lower surfaces is fixed to the flexible reinforcing plate 86 by a fastening mechanism such as an adhesive tape.

A flat coil 83 with a planar winding is mounted on the upper surface of the flexible reinforcing plate 86 and it is electrically connected to a predetermined wiring pattern provided on the upper surface of the flexible printed circuit board 87. As shown in FIG. 25 and so forth, the flat coil 88 has such a shape that two elliptic coil portions 88a and 88b are located side by side. The two coil portions 88a and 88b are substantially the same in length in the width direction but they are different in length in the longitudinal direction. The reason that the two coil portions 88a and 88b are different in length in the longitudinal direction is that the joint piece 66c of the yoke 66 can be located at the outside of the shorter coil portion 88b so that it can approach the correcting lens 15 while keeping a wide area of the flat surface side of the flat coil 88, thereby making it possible to miniaturize the whole of the actuator 54.

The two coil portions 88a and 88b are formed by winding one coil wire and the winding direction of one coil wire is set in such a manner that an electric current flows in the same direction in thrust generating portions 89a and 89b of which long sides adjacent in the width direction are extended straight when the flat coil 88 is energized. This flat coil 88 is fixed to the flexible reinforcing plate 86 by a fastening mechanism such as an adhesive in the state in which the longitudinal directions of the two coil portions 88a and 88b are directed in the second direction Y. Thus, when an electric current flows through the two coil portions 88a and 88b, since magnetic force from the magnets 67a and 67b acts on the direction vertical to the flat coil 88, owing to Fleming's left hand rule, force directed in the first direction X acts on the side of the magnets 67a and 67b.

A cylindrical coil 91 is attached to the lower surface of the flexible reinforcing plate 86 and both ends of the cylindrical coil 91 are electrically connected to a predetermined wiring pattern provided on the lower surface of the flexible printed circuit board 87. As shown in FIG. 25 and so on, the cylindrical coil 91 includes a rectangular space portion provided at its central portion so as to make the whole become a rectangular cylinder and it is shaped like a square cylinder by winding a coil wire a predetermined amount so as to provide a predetermined thickness in the laminated direction. This cylindrical coil 91 has a thrust generating portion 92 fixed to the flexible printed circuit board 87 by a fastening mechanism such as an adhesive in the state in which the direction in which the coil wire is extended is directed in the first direction X.

The lower piece 66b of the yoke 66 and the lower magnet 67b integrally fastened as one body with the lower piece 66b may be inserted into the central space portion of the cylindrical coil 91. Thus, when an electric current flows through the cylindrical coil 91, since magnetic force generated from the magnets 67a and 67b acts on the direction vertical to the thrust generating portion 92, owing to Fleming's left hand rule, force directed toward the second direction Y acts on the side of the magnets 67a and 67b. The flexible reinforcing plate 86, the flexible printed circuit board 87, the flat coil 88 and the cylindrical coil 91 constitute the coil assembly body 93.

FIGS. 26 and 27 show the actuator 54 configured by the above-mentioned coil assembly body 93, the yoke 66 and the two magnets 67a and 67b. Of the actuator 54, the yoke 66, the two magnets 67a and 67b and the flat coil 88 constitute a first driver that moves the correcting lens 15 through the first moving frame 51 in the first direction X. Then, the first main bearing portion 61 and the first sub bearing portion 62, the first main guide shaft 63 and the first sub guide shaft 65, the second main bearing portion 71 and the second sub bearing portion 72 of the first moving frame 51 constitute a first guide that moves the correcting lens 15 through the first moving frame 51 in the first direction X perpendicular to the optical axis L of the lens apparatus 1.

Further, the yoke 66, the two magnets 67a and 67b and the cylindrical coil 91 constitute a second driver that moves the correcting lens 15 through the second moving frame 52 in the second direction Y. Then, the third main bearing portion 75, the third sub bearing portion 76, the second main guide shaft 77, the second sub guide shaft 79, the fourth main bearing portion 82 and the fourth sub bearing portion 83 of the second moving frame 52 constitute a second guide that moves the correcting lens 15 through the second moving frame 52 not only in the direction perpendicular to the optical axis L of the lens apparatus 1 but also in the second direction Y perpendicular to the first direction X.

As described above, according to this embodiment, since one set of magnetic circuit member composed of one yoke 66 and the two magnets 67a and 67b serves as the magnetic circuit for the first driver and the magnetic circuit for the second driver as well. For this reason, since the magnetic circuit member need not be provided at every driver, the number of parts can be reduced and the structure can be simplified, whereby the whole of the apparatus can be miniaturized.

Also, as shown in FIG. 25, a first Hall element 94 which shows a specific example of a first position detector, a second Hall element 95 which shows a specific example of a second position detector and a thermistor 96 which shows a specific example of a temperature detector are attached to the lower surface of the flexible reinforcing plate 86, respectively. The first Hall element 94 is adapted to detect the position of the correcting lens 15 concerning the first direction X through the first moving frame 51. Also, the second Hall element 95 is adapted to detect the position of the correcting lens 15 concerning the second direction Y through the second moving frame 52. The first Hall element 94 is located at one side of the cylindrical coil 91 and the second Hall element 95 is located at the other side of the cylindrical coil 91.

The first and second Hall elements 94 and 95 are adapted to detect strength of magnetic force of the lower magnet 67b at the predetermined position and output detection signals corresponding to the strength of the magnetic force. The control apparatus computes and calculates the position of the correcting lens 15 based on the detection signals from the two Hall elements 94 and 95. Also, the thermistor 96 detects temperature around the coil assembly body 93 and adds temperature correction to correction of the image blurred by hand shake and vibration when ambient temperature rises in excess of a predetermined temperature. Positional relationships among the first and second Hall elements 94 and 95, the magnets 67a and 67b and the yoke 66, detected magnetic flux density and the like will be described in detail later on.

The image stabilizer 5 having the above-mentioned arrangement is assembled as follows, for example. First, as shown in FIGS. 25 to 27, the flat coil 88 is fixed to one surface of the flexible reinforcing plate 86 and the cylindrical coil 91 is fixed to the opposite side of the surface to which the flexible printed circuit board 87 is connected, thereby constructing the coil assembly body 93 in which the flexible reinforcing plate 86 and the two coils 88 and 91 are integrally formed as one body.

The lower piece 66b of the yoke 66 is inserted into the hole of the cylindrical coil 91 of the coil assembly body 93 from the lateral direction and the lower magnet 67b fixed to the inner surface of the lower piece 66b is opposed to the thrust generating portion 92 of the cylindrical coil 91. At the same time, the upper magnet 67a is opposed to the upper surface of the flat coil 88. As a consequence, the upper and lower magnets 67a and 67b sandwich the thrust generating portions 89a and 89b of the flat coil 88 and the thrust generating portion 92 of the cylindrical coil 91 to construct the actuator 54. The flexible reinforcing plate 86 of the actuator 54 is placed on the upper surface of the coil supporting holder 85 and it is properly positioned by the two positioning convex portions 85a and 85b. Then, the flexible reinforcing plate 86 is fixed to the coil supporting holder 85 by the fastening mechanism such as an adhesive.

Next, the second moving frame 52 is faced onto the moving frame supporting portion 53a of the fixed base 53 and the two bearing pieces 82a and 82b of the fourth main bearing portion 82 are provided between the two bearing pieces 75a and 75b of the third main bearing portion 75. Then, the third sub bearing portion 76 is provided between the two bearing pieces 83a and 83b of the fourth sub bearing portion 83. Next, the second main guide shaft 77 is penetrated into the respective bearing holes of the four bearing pieces 75a, 75b, 82a and 82b of the third main bearing portion 75 and the fourth main bearing portion 82. At that time, while the second main guide shaft 77 is fixed to the fourth main bearing portion 82 by press fitting, it is made slidable relative to the third main bearing portion 75.

Further, the second sub guide shaft 79 is penetrated into the two bearing holes of the bearing pieces 83a and 83b of the fourth sub bearing portion 83 and the bearing groove 78 of the third sub bearing portion 76. At that time, while the second sub guide shaft 79 is fixed to the fourth sub bearing portion 83 by press fitting, it is made slidable relative to the third sub bearing portion 76. As a result, the second moving frame 52 can move a predetermined distance relative to the fixed base 53 in the second direction Y, that is, a distance which results from subtracting a distance between the outer surfaces of the two bearing pieces 82a and 82b of the fourth main bearing portion 82 from a distance between the inner surfaces of the two bearing pieces 75a and 75b of the third main bearing portion 75.

Next, the lens fixed portion 51a of the first moving frame 51 is faced onto the second moving frame 52 and the two bearing pieces 61a and 61b of the first main bearing portion 61 are provided between the two bearing pieces 71a and 71b of the second main bearing portion 71. Then, the first sub bearing portion 61 is provided between the two bearing pieces 72a and 72b of the second sub bearing portion 72. Next, the first main guide shaft 63 is penetrated into the respective bearing holes of the four bearing pieces 61a, 61b, 71a and 71b of the first main bearing portion 61 and the second main bearing portion 71. At that time, while the first main guide shaft 63 is fixed to the first main bearing portion 61 by press fitting, it is made slidable relative to the second main bearing portion 71.

Further, the first sub guide shaft 65 is penetrated into the bearing holes of the two bearing pieces 72a and 72b of the second sub bearing portion 72 and the bearing groove 64 of the first sub bearing portion 62. At that time, while the first sub guide shaft 65 is fixed to the second sub bearing portion 72 by press fitting, it is made slidable relative to the first sub bearing portion 62. As a result, the first moving frame 51 is able to move a predetermined distance in the first direction X relative to the second moving frame 52, that is, a distance which results from subtracting a length between the outer surfaces of the two bearing pieces 61a and 61b of the first main bearing portion 61 from a distance between the inner surfaces of the two bearing pieces 71a and 71b of the second main bearing portion 71.

Next, the yoke 66 with the two magnets 67a and 67b fastened thereto is attached to the first moving frame 51. The yoke 66 may be attached in advance to the first moving frame 51 before the first moving frame 51 is attached to the second moving frame 52. Then, the coil supporting holder 85 with the coil assembly body 93 attached thereto is attached to the coil fixed portion 53b of the fixed base 53. The coil supporting holder 85 should preferably be attached to the coil fixed portion 53*b* of the fixed base 53 as follows, for example.

First, the first moving frame 51 and the fixed base 53 are properly positioned at predetermined positions and they are fixed temporarily. When the first moving frame 51 and the fixed base 53 are fixed temporarily, as shown in FIG. 23, for example, positioning shafts are fitted into a positioning hole 311 bored at substantially the central portion of the first moving frame 51 and a positioning hole 312 bored at substantially the central portion of the fixed base 53. At that time, an escape hole 313 of which diameter is larger than that of the positioning shaft is bored on the second moving frame 52 to prevent the positioning shaft from contacting with the inner peripheral surface of the escape hole 313. Thus, a space between the first moving frame 51 and the fixed base 53 can be properly positioned at the predetermined position with the result that the optical axis of the correcting lens 15 can be properly positioned at the predetermined position relative to the fixed base 53.

At that time, the cylindrical coil 91 is fitted into the hole from the lateral direction and the lower piece 66*b* and the lower magnet 67*b* of the yoke 66 are inserted into the hole. At that time, the coil supporting holder 85 is properly moved in the first direction X and the second direction Y and magnetic-flux densities obtained by actions of the magnets 67*a* and 67*b* and which are detected by the two Hall elements 94 and 95 fixed to the flexible printed circuit board 87 are measured. Then, the first moving frame 51 and the fixed base 53 are properly positioned at the positions of proper values in which magnetic force received by the two Hall elements 94 and 95 from the magnets 67*a* and 67*b* is taken as a reference value. Such positioning work will be described in detail later on.

In this state in which the first moving frame 51 and the fixed base 53 are properly positioned at the predetermined positions, the coil supporting holder 85 is fixed to the fixed base 53 by a fastening mechanism such as an adhesive. In this manner, the assembly work of the image stabilizer 5 is completed and the image stabilizer 5 having the arrangement shown in FIGS. 18 to 22 may be obtained. Alternatively, as will be described later on, a coil and two Hall elements may be fixed to the first moving frame, the magnet, which is relatively moved relative to the coil and the two Hall elements, is moved to detect magnetic force received by the two Hall elements 94 and 95 from the magnets 67*a* and 67*b*, the magnet may be properly positioned based on the detected result and then the magnet may be fixed to the fixed base 53 by an adhesive and the like.

Action of the image stabilizer 5 having the above-mentioned arrangement is as follows. The correcting lens 15 of the image stabilizer 5 is moved by selectively or simultaneously supplying driving currents of suitable values through the flexible printed circuit board 87 to the flat coil 88 and the cylindrical coil 91 of the actuator 54.

The flat coil 88 and the cylindrical coil 91 of this image stabilizer 5 are fixed through the flexible reinforcing plate 86 to the coil supporting holder 85 and they are further fixed through the coil supporting holder 85 to the fixed base 53. At that time, the thrust generating portions 89*a* and 89*b* of the flat coil 88 are extended in the second direction Y and the thrust generating portion 92 of the cylindrical coil 91 is extended in the first direction X. Also, since the two magnets 67*a* and 67*b* fixed to both ends of the yoke 66 are located in the upper and lower directions of the two coils 88 and 91, magnetic flux of a magnetic circuit formed of the yoke 66 and the two magnets 67*a* and 67*b* acts so as to vertically pass the thrust generating portions 89*a* and 89*b* of the flat coil 88 and the thrust generating portion 92 of the cylindrical coil 91.

On the other hand, the yoke 66 and the two magnets 67*a* and 67*b* are fixed to the first moving frame 51 that holds the correcting lens 15. The correcting lens 15 is supported to the second moving frame 52 by a first guide having the first moving frame 51 in such a manner that it can move in the first direction X. Further, the correcting lens 15 is supported to the fixed base 53 by a second guide having the second moving frame 52 in such a manner that it can move in the second direction Y. Accordingly, owing to the action of the first guide and the second guide, the correcting lens 15 is able to freely move in any of the first direction X and the second direction Y within a predetermined range.

Now, when an electric current flows to the flat coil 88, since the thrust generating portions 89*a* and 89*b* of the flat coil 88 are extended in the second direction Y, the electric current flows to the second direction Y in the thrust generating portions 89*a* and 89*b*. At that time, since the magnetic flux of the magnetic circuit acts on the upper and lower direction vertical to the thrust generating portions 89*a* and 89*b*, owing to Fleming's rule, force oriented in the first direction X acts on the magnets 67*a* and 67*b* and the yoke 66. Thus, the first moving frame 51 with the yoke 66 and the like fixed thereto is moved in the first direction X. As a consequence, the correcting lens 15 held on the first moving frame 51 is guided by the first guide and moved in the first direction Y in response to a magnitude of an electric current flowing through the flat coil 88.

On the other hand, when an electric current flows through cylindrical coil 91, since the thrust generating portion 92 of the cylindrical coil 91 is extended in the first direction X, the electric current flows to the first direction X in the thrust generating portion 92. At that time, since the magnetic flux of the magnetic circuit acts on the upper and lower direction vertical to the thrust generating portion 92, owing to Fleming's rule, force oriented in the second direction Y acts on the magnets 67*a* and 67*b* and the yoke 66. Accordingly, the second moving frame 52 is moved in the second direction Y through the first moving frame 51 to which the yoke 66 and the like are fixed. As a result, the correcting lens 15 is moved in the second direction Y in response to the magnitude of the electric current flowing to the cylindrical coil 91 as the second moving frame 52 is guided and moved in the second direction Y together with the first moving frame 51.

Also, when the electric current flows through the flat coil 88 and the cylindrical lens 91 at the same time, the moving operation done by the above-mentioned flat coil 88 and the moving operation done by the cylindrical coil 91 are executed in a compound fashion. More specifically, at the same time the correcting lens 15 is moved in the first direction Y by action of the electric current flowing to the flat coil 88, the correcting lens 15 is moved in the second direction Y by action of the electric current flowing to the cylindrical coil 91. As a consequence, the correcting lens 15 becomes able to move in the slanting direction to steady blurry images of the lens system 2.

The image stabilizer 5 having the above-mentioned arrangement and action is attached to the lens apparatus as shown in FIGS. 1 to 11. The image stabilizer 5 is inserted into and removed from the opening portion 48 bored on the lower lens-barrel 18 of the lens-barrel 3 of the lens in the lateral direction and it is detachably attached to the lower lens-barrel 18. In this case, since the image stabilizer 5 according to the embodiment of the present invention is configured as a unit of a single apparatus, it can be attached to and detached from the lower lens-barrel 18 extremely easily and rapidly. Reference numeral 98 in FIG. 11 and the like denotes a cover member that covers the image stabilizer 5. This cover member 98 is detachably attached to the lower lens-barrel 18 of the lens-barrel 3 of the lens by the fastening mechanism such as fixed screws.

Next, operations of the lens system 2 of the lens apparatus 1 with the image stabilizer 5 attached thereto will be described with reference to FIG. 12. As shown in FIG. 12, when the objective lens 7A of the lens apparatus 1 is directed toward the subject, light from the subject is inputted into the lens system 2 from the objective lens 7A. At that time, light passed through the objective lens 7A is refracted 90 degrees by the prism 7B, whereafter it is moved toward the CCD 4 along the optical axis L of the lens system 2. Specifically, light passed through the second lens 7C of the one-group lens 7 after it has been reflected by the prism 7B is passed through the two-group lens 8, the three-group lens 9, the four-group lens 10, the seventh lens 11A of the five-group lens 11 and the correcting lens 15 to the optical filter 14 by which an image corresponding to the subject is focused on the focusing screen of the CCD 4.

In this case, when taking a picture, if the lens apparatus 1 is neither shaken nor vibrated by camera shake, then light from the subject is moved through the central portions of the one-group lens to the five-group lens along the optical axis L of the lens apparatus 1 like light 6A shown by a solid-line in FIG. 12 so that an image can be focused at the predetermined position of the focusing screen of the CCD 4, thereby making it possible to obtain a beautiful image without being blurred.

On the other hand, when taking a picture, if the lens apparatus 1 is shaken or vibrated by camera shake, light from the subject is inputted into the one-group lens in the state in which it is slanted like light 6B shown by a dot-and-dash line or like light 6C shown by a dashed line in FIG. 12. Although such incident lights 6B and 6C are respectively passed through the one-group lens to the five-group lens in the state in which they are displaced from the optical axis L of the lens apparatus 1, it is possible to correct the blurry image by moving the correcting lens 15 a predetermined amount in response to the camera shake and the like. As a result, an image can be focused at the predetermined position of the focusing screen of the CCD 4 and hence a beautiful image can be obtained by removing blurry images.

Camera shakes, vibrations and the like of this lens apparatus 1 can be detected by a hand-shake detector. A gyro sensor, for example, may be used as this hand-shake detector. This gyro sensor is mounted on the camera body together with the lens apparatus 1 to detect acceleration, angular velocity, angular acceleration and the like generated to act on the lens apparatus 1 from cameraman's hand shake, movement, vibration and the like. Information such as acceleration and angular velocity detected by the gyro sensor are supplied to a control apparatus to drive the actuator 54 under control of the control apparatus in such a manner that the first moving frame 51 is moved in the first direction X with respect to movement and vibration in the first direction X and that the second moving frame 52 is moved in the second direction Y with respect to movement and vibration in the second direction Y, thereby an image being formed at the predetermined position of the focusing screen of the CCD 4.

FIGS. 13 to 17 are diagrams showing a digital still camera 100 that shows a first embodiment of an imager apparatus equipped with the lens apparatus 1 having the aforementioned arrangement. This digital still camera 100 uses a semiconductor recording media as an information recording medium and it is able to convert an optical image from the subject into an electrical signal by a CCD (solid-state imager) and to record such electrical signal on the semiconductor recording medium or to display such electrical signal on a display apparatus such as a liquid-crystal display (LCD) as an image.

This digital still camera 100 includes, as shown in FIG. 13 and the like, a camera body 101, the lens apparatus 1 for receiving an image of the subject as light and introducing this light into the CCD 4 serving as an imager, a display apparatus 102 formed of a liquid-crystal display and the like to display an image based on a video signal outputted from the CCD 4, a control apparatus 103 for controlling operations of the lens apparatus 1, display operations of the liquid-crystal display 102 and the like and a battery power supply (not shown), etc.

The camera body 101 is formed of an oblong flat case and includes a front case 105 and a rear case 106 placed one another in the front and back direction, a main frame 107 for dividing a space portion formed by the front case 105 and the rear case 106 in the front and back direction, a lens cover 108 attached to the front of the front case 105 so as to become slidable in the upper and lower direction and the like. The lens apparatus 1 is fixed to one side portion of the front of the main frame 107 in the state in which the CCD 4 is placed with the optical axis L oriented in the upper and lower direction. Further, the control apparatus 103 formed by mounting a predetermined microcomputer, resistors, capacitors and other electronic assemblies on the printed circuit board, a flash apparatus 110 and the like are attached to the main frame 107.

The control apparatus 103 is juxtaposed with the lens apparatus 1 and the flash apparatus 110 is located above the control apparatus 103 and the lens apparatus 1. The flash apparatus 110 includes a light-emitting portion 110a exposed to the front of the front case 105, a driving unit 110b for driving the light-emitting portion 110a, a capacitor 110c for supplying predetermined electric power to the driving unit 110b and the like. A lens fitting hole 111a and a flash fitting hole 111b are bored at the corresponding positions of the front case 105 in order to expose the light-emitting portion 110a of the flash apparatus 110 and the objective lens 7A of the lens apparatus 1. The objective lens 7A is fitted into the lens fitting hole 111a together with the panel 21 and the light-emitting portion 110a is fitted into the flash fitting hole 111b.

Further, the front case 105 has a plurality of opening holes 111c into which a plurality of leg pieces provided on the lens cover 108 is inserted. The lens cover 108 can be prevented from being dropped inadvertently from the front case 105 by retaining portions provided on a plurality of leg pieces. This lens cover 108 can be moved in the upper and lower direction by a plurality of opening holes 111c and it can also be locked at the upper end portion and at the lower end portion by a locking mechanism (not shown). As shown in FIG. 14, when the lens cover 108 is placed at the upper end portion, the objective lens 7A is closed completely, whereby the objective lens 7A can be protected. On the other hand, as shown in FIG. 15, when the lens cover 108 is moved to the lower end portion, the objective lens 7A is opened completely and the power supply switch is turned on so that shooting becomes possible.

As shown in FIGS. 13 and 16, the rear case 106 includes a square opening window 112 to expose the display screen of the display apparatus 102. The opening window 112 is provided by opening the back of the rear case 106 on a large scale, and the display apparatus 102 is disposed in the inside of the opening window 112. The display apparatus 102 is composed of a combination of a liquid-crystal display of a size corresponding to the opening window 112 and a backlight closely placed over the inner surface of this liquid-crystal display. A protective plate 114 is disposed on the display apparatus 102 at its side of the liquid-crystal display through a seal frame 113 and a peripheral edge portion of the protective plate 114 is brought in contact with the inner surface of the opening window 112.

Further, the rear case 106 is provided with a variety of operation switches. A mode selecting switch 115 for selecting function modes (still picture, moving picture, playback, etc.), a zoom button 116 for executing zoom operations, a screen display button 117 for displaying screens, a menu button 118 for selecting a variety of menus, a direction key 119 for moving a cursor to select menus and the like, a screen button 121 for switching a screen size and for deleting a screen and the like are disposed on the rear case 106 at its proper positions as the operation switches. A speaker hole 122 is bored on the rear case 106 at its end portion of the side of the display apparatus 102 and a speaker is housed within the speaker hole 122. A strap supporting metal fittings 123 is attached to the end portion of the opposite side of the rear case 106.

Also, as shown in FIG. 17 and the like, the camera body 101 has on its upper surface provided a power supply button 125 for turning on and off the power supply, a shooting button 126 for starting and stopping shooting, a camera shake setting button 127 for executing correction of blurry images by operating the image stabilizer 5 when the camera body is moved or vibrated by camera shake. Further, a microphone hole 128 is bored at substantially the central portion of the upper surface of the camera body 101 and a microphone is housed within the microphone hole 128. These power supply button 125, shooting button 126 and camera shake setting button 127 are attached to a switch holder 124 that is mounted onto the camera body 101. Furthermore, the microphone hole 128 also is bored on the switch holder 124 and a built-in microphone is fixed to this switch holder 124.

FIG. 31 is a block diagram used to explain a concept to control the aforementioned image stabilizer 5. As shown in FIG. 31, the control unit 130 includes an image stabilization calculating unit 131, an analog servo unit 132, a driving circuit unit 133, four amplifiers (AMP) 134A, 134B, 135A and 135B and the like. A first gyro sensor 135 is connected through the first amplifier (AMP) 134A to the image stabilization calculating unit 131 and a second gyro sensor 136 is connected through the second amplifier (AMP) 134B to the image stabilization calculating unit 135.

The first gyro sensor 135 is adapted to detect an amount in which the camera body 101 is displaced in the first direction X by camera shake or hand shake and the like applied to the camera body 101. The second gyro sensor 136 is adapted to detect an amount in which the camera body 101 is displaced in the second direction Y by camera shake or hand shake and the like applied to the camera body 101. While the two gyro sensors 135 and 136 are provided in order to separately detect the amount in which the camera body 101 is displaced in the first direction X and the amount in which the camera body 101 is displaced in the second direction Y as described above in the embodiment of the present invention, the present invention is not limited thereto and it is needless to say that a single gyro sensor may be provided in order to detect the amounts in which the camera body is displaced in the two directions, that is, the first direction X and the second direction Y.

The analog servo unit 132 is connected to the image stabilization calculating unit 131. The analog servo unit 132 converts a value calculated by the image stabilization calculating unit 131 in the form of digital to analog value and outputs a control signal corresponding to the thus obtained analog value. The driving circuit unit 133 is connected to the analog servo unit 132. The first Hall element 94 that is the first position detecting element is connected through the third amplifier (AMP) 135A to the driving circuit unit 133, and the second Hall element 95 that is the second position detecting element is connected through the fourth amplifier (AMP) 135B to the driving circuit unit 133. Further, the flat coil 88 that is the first direction driving coil is connected to the driving circuit unit 133 and the cylindrical coil 91 that is the second direction driving coil is also connected to the driving circuit unit 133.

An amount in which the first moving frame 51 is displaced in the first direction X is detected by the first Hall element 94 and it is inputted through the third amplifier 135A to the driving circuit unit 133. Also, an amount in which the second moving frame 52 is displaced in the second direction Y is detected by the second Hall element 95 and it is inputted through the fourth amplifier 135B to the driving circuit unit 133. In order to move the correcting lens 15 so as to correct blurry images based on these input signals and the control signal from the analog servo unit 132, the driving circuit unit 133 outputs a predetermined control signal to either of or both of the flat coil 88 and the cylindrical coil 91.

FIG. 32 is a block diagram showing a first embodiment of a schematic arrangement of the digital still camera 100 including the image stabilizer 5 having the aforementioned arrangement and actions. As shown in FIG. 32, this digital still camera 100 includes the lens apparatus 1 having the image stabilizer 5, the control unit 140 that plays a central role of the control apparatus, the memory apparatus 141 including a program memory to drive the control unit 140, a data memory, other RAM (random-access memory), ROM (read-only memory) and the like. The camera 100 also includes the operation unit 120 for inputting a variety of command signals to turn on and off the power supply, to select shooting modes or to take a picture, the display apparatus 102 to display shot pictures and the like, the external memory 143 to enlarge a storage capacity and the like.

The control unit 140 is composed of an arithmetic circuit including a microcomputer (CPU), for example, and the like. This control unit 140 is connected with the memory apparatus 141, the operation unit 142, an analog signal processing unit 144, a digital signal processing unit 145, two A/D (analog-to-digital) converters 146, 147, a D/A (digital-to-analog) converter 148 and a timing generator (TG) 149. The analog signal processing unit 144 is connected to the CCD 4 attached to the lens apparatus 1 and it executes predetermined signal processing based on an analog signal corresponding to a shot image outputted from the CCD 4. This analog signal processing unit 144 is connected to the first A/D converter 146 and the output from the analog signal processing unit 144 is converted into a digital signal by the A/D converter 146.

The digital signal processing unit 145 is connected to the first A/D converter 146 and the digital signal processing unit 145 executes predetermined signal processing by using a digital signal supplied from the first A/D converter 146. The display apparatus 102 and the external memory 143 are connected to this digital signal processing unit 145, whereby an image corresponding to the subject is displayed on the display apparatus 102 or it is stored in the external memory 143 on the basis of a digital signal which is an output signal from the digital signal processing unit 145. A gyro sensor 151 that shows a specific example of a hand shake and camera shake detecting unit is connected to the second A/D converter 147. This gyro sensor 151 detects movement, vibration and the like of the camera body 101 and blurry images may be corrected in response to the detected result.

A driving control unit 152 that is a servo calculating unit for image stabilization is connected to the D/A converter 148. The driving control unit 152 may correct blurry images by driving and controlling the image stabilizer 5 in response to the position at which the correcting lens 5 is located. The image stabilizer 5, the first position detector (first Hall element) 94 and the second position detector (second Hall element) 95 which are the position detecting units for detecting the position of the correcting lens 15 by detecting the positions of the two moving frames 51 and 52 are connected to the driving control unit 152. The timing generator (TG) 149 is connected to the CCD 4.

Thus, when the image of the subject is inputted into the lens system 2 of the lens apparatus 1 and it is focused on the focusing screen of the CCD 4, an image signal of the focused image is outputted as an analog signal and supplied to the analog signal processing unit 144, in which it is processed in a predetermined processing manner and then the thus processed analog signal is converted into a digital signal by the first A/D converter 146. An output from the first A/D converter 146 is processed in a predetermined processing manner by the digital signal processing unit 145 and thereby it is displayed on the display apparatus 102 as an image corresponding to the subject or it is stored in the external memory 143 as memory information.

In such shooting state, if the image stabilizer 5 is placed in the operable condition, then when the camera body 101 is moved or vibrated, the gyro sensor 151 detects such movement and vibration and outputs a detection signal to the control unit 140. In response to the detection signal supplied thereto, the control unit 140 executes predetermined calculation processing and outputs a control signal to control operations of the image stabilizer 5 to the driving control unit 152. The driving control unit 152 outputs a predetermined driving signal to the image stabilizer 5 based on the control signal from the control unit 140 to thereby move the first moving frame 51 by a predetermined amount in the first direction X and to thereby move the second moving frame 52 by a predetermined amount in the second direction Y. As a result, a blurry image can be removed through the movement of the correcting lens 15 and hence a beautiful image can be obtained.

FIG. 33 is a block diagram showing a second embodiment of a schematic arrangement of the digital still camera including the image stabilizer 5 having the aforementioned arrangement and actions. As shown in FIG. 33, this digital still camera 100A includes the lens apparatus 1 having the image stabilizer 5, a video recording/reproducing circuit unit 160 which plays a central role of the control apparatus, a built-in memory 161 including a program memory, a data memory and other RAM and ROM to drive the video recording/reproducing circuit unit 160, a video signal processing unit 162 for processing a shot image and the like as a predetermined signal, a display apparatus 163 for displaying shot images and the like. The camera 100A also includes an external memory 164 for increasing a storage capacity, a correcting lens control unit 165 for driving and controlling the image stabilizer 5 and the like.

The video recording/reproducing circuit unit 160 includes a calculating circuit having a microcomputer (CPU) and the like. The built-in memory 161, the video signal processing unit 162, the correcting lens control unit 165, a monitor driving unit 166, an amplifier 167 and three interfaces (I/F) 171, 172 and 173 are connected to this video recording/reproducing circuit unit 160. The video signal processing unit 162 is connected through the amplifier 167 to the CCD 4 attached to the lens apparatus 1, whereby a signal processed as a predetermined video signal is inputted into the video recording/reproducing circuit unit 160.

The display apparatus 163 is connected through the monitor driving unit 166 to the video recording/reproducing circuit unit 160. Also, a connector 168 is connected to the first interface (I/F) 171 and the external memory 164 can be detachably connected to this connector 168. A connection terminal 174 provided on the camera body 101 is connected to the second interface (I/F) 172.

An acceleration sensor 175 that is the hand shake and camera shake detecting unit is connected through the third interface (I/F) 173 to the correcting lens control unit 165. This acceleration sensor 175 is adapted to detect displacement added to the camera body 101 from movement and vibration as acceleration and a gyro sensor can be applied to this acceleration sensor 175. A lens driving unit of the image stabilizer 5 which drives and controls the correcting lens 15 is connected to the correcting lens control unit 165 and the two position detecting sensors 94 and 95 for detecting the position of the correcting lens 15 are also connected to the correcting lens control unit 165.

Thus, when an image of the subject is inputted into the lens system 2 of the lens apparatus 1 and an image is focused on the focusing screen of the CCD 4, an image signal of the focused image is inputted through the amplifier 167 to the video signal processing unit 162. The signal processed as a predetermined video signal by this video signal processing unit 162 is inputted into the video recording/reproducing circuit unit 160. Consequently, the signal corresponding to the image of the subject is outputted from the video recording/reproducing circuit unit 160 to the monitor driving unit 166 and the built-in memory 161 or the external memory 164. As a result, an image corresponding to the image of the subject is displayed on the display apparatus 163 through the monitor driving unit 166 or it is recorded on the built-in memory 161 or the external memory 164 as the information signal, if necessary.

In this shooting state, if the image stabilizer 5 is placed in the operable condition, then when the camera body 101 is moved or vibrated, the acceleration sensor 175 detects movement or vibration of the camera body 101 and outputs a detection signal through the correcting lens control unit 165 to the video recording/reproducing circuit unit 160. In response to the detection signal supplied thereto, the video recording/reproducing circuit unit 160 executes predetermined calculation processing and outputs a control signal to control the operations of the image stabilizer 5 to the correcting lens control unit 165. This correcting lens control unit 165 outputs a predetermined driving signal to the image stabilizer 5 based on the control signal from the video recording/reproducing circuit unit 160 to thereby move the first moving frame 51 by a predetermined amount in the first direction X and to thereby move the second moving frame 52 by a predetermined amount in the second direction Y. As a result, a blurry image can be removed through movements of the correcting lens 15 and hence a beautiful image can be obtained.

FIG. 28 is a diagram showing other embodiment of the aforementioned actuator 54. This actuator 54A is configured by changing the direction in which the coil assembly body 93 is assembled and assemblies of the actuator 54A are similar to those of the above-described embodiment. In this embodiment, the coil assembly body 93 is attached to the fixed base 53 in such a manner that the longitudinal direction (direction in which the thrust generating portion is extended) of the flat coil 88 is oriented in the first direction X. Then, the longitudinal direction of the yoke 66 (this relationship applies for the magnets 67a and 67b as well) is made coincident with the longitudinal direction of the flat coil 88 and the yoke 66 with the magnets 67a and 67b fixed thereto is attached to the first moving frame 51. Accordingly, the thrust generating portion of the cylindrical coil 91 is extended in the second direction Y perpendicular to the first direction X.

In the case of this embodiment, when an electric current flows to the flat coil 88, there is generated force by which the second moving frame 52 can be moved in the second direction Y. Also, when an electric current flows to the cylindrical coil 91, there is generated force by which the first moving frame 51 can be moved in the first direction X.

FIGS. 29 and 30 are diagrams showing other embodiment of the aforementioned coil assembly body 93. A coil assembly body 181 shown in this embodiment uses a flat coil 182 as a coil for use with a first driver and it also uses a flat coil 183 as a coil for use with a second driver. The two flat coils 182 and 183 are formed as elliptic coils of the same size. The coil assembly body 181 is configured in such a manner that an upper flat coil 182 is mounted on one surface of a flexible printed circuit board 184, a lower flat coil 183 being attached to the other surface of the flexible printed circuit board 184. The upper flat coil 182 and the lower flat coil 183 are located in such a manner that their longitudinal directions are crossing each other at right angles.

Further, in this embodiment, one magnet 186 is attached to an upper piece of a U-like yoke 185 and thereby a magnetic circuit is constructed. The longitudinal direction of the magnet 186 is set to the direction perpendicular to the thrust generating portion of the upper flat coil 182. Even the coil assembly body 181 having the above arrangement can achieve effects similar to those of the above-described embodiment. In particular, in the case of this embodiment, since the coil assembly body 181 can be made extremely thin as compared with the above-described coil assembly body 93, it is possible to decrease the thickness of the whole of the apparatus.

Next, relationships between the two Hall elements 94 and 95 for detecting the position of the correcting lens 15 by detecting magnetic force of the magnets 67*a* and 67*b* and the magnets 67*a* and 67*b* will be described with reference to FIGS. 34 to 45. In FIGS. 34 to 45, elements and parts identical (or similar) to those of FIGS. 1 to 33 are denoted by identical reference numerals.

FIGS. 34 to 37 show an embodiment in which the present invention is applied to an image stabilizer 300 including a moving magnet system driver. Also, FIGS. 38 to 41 show other embodiment in which the present invention is applied to an image stabilizer 301 including a moving coil (moving Hall element) system driver. FIGS. 42A to 42D are diagrams used to explain a positional relationship among the magnets 67*a* and 67*b*, the yoke 66 and the two Hall elements (position detectors) 94 and 95 and the like. FIGS. 43A, 43B, FIGS. 44A, 44B and FIGS. 45 and 46 are diagrams used to explain differences of magnetic flux density detected values obtained by the Hall element 95 when the yoke 66 is provided with the projected portion or when the yoke 66 is not provided with the projected portion.

As shown in FIGS. 34 to 37, the image stabilizer 300 is composed of a first moving frame 51A, a second moving frame 52A and a fixed base 53A. The first moving frame 51A includes an annular lens fixed portion 51*a* and a yoke fixed portion 51*b* integrally formed as one body with the annular lens fixed portion 51*a*. The correcting lens 15 is fitted into and fixed to a fitting hole 58*a* bored at the central portion of the lens fixed portion 51*a*. The first main bearing portion 61 is provided at one side of the lens fixed portion 51*a* and the first sub bearing portion 62 is provided at the other side which is the opposite side of the above one side.

The first main guide shaft 63 is penetrated into the first main bearing portion 61 in the horizontal direction and the first main guide shaft 63 is fixed to the first main bearing portion 61 at its middle portion by press fitting. Further, a positioning hole 311 is bored on the first main bearing portion 61, the bearing groove 64 opened in the lateral direction is formed on the first sub bearing portion 62 and the first sub guide shaft 65 is slidably engaged with the bearing groove 64.

The U-like yoke 66 is integrally fixed to the yoke fixed portion 51*b*. In the state in which the opposing two pieces 66*a* and 66*b* are directed in the upper and lower direction, the yoke 66 is attached to the yoke fixed portion 51*b* by fixing the joint piece 66*c*, which joints the two pieces 66*a* and 66*b*, to the yoke fixed portion 51*b*. The upper piece 66*a* and the lower piece 66*b* of the yoke 66 are rectangular and the flat and square magnets 67*a* and 67*b* which are substantially the same in planar shape are integrally fixed to the inner surfaces of the respective upper and lower pieces 66*a* and 66*b* by a fastening mechanism such as an adhesive.

Projected portions 321, 322 and 323, 324 to aggressively escape magnetic force of the magnets 67*a* and 67*b* to the side of the yoke 66 are provided at tip end edges and one side edges of the upper piece 66*a* and the lower piece 66*b*. While these four projected portions 321, 322 and 323, 324 are semicircular in this embodiment, the present invention is not limited thereto and they may be square, rectangular, elliptic, triangular and other shapes. Two flat surfaces developed in the directions in which the magnets 67*a* and 67*b* are perpendicular to each other are brought in contact with or they are approaching the inner surfaces of those projected portions 321, 322 and 323, 324.

The first projected portions 321 and 323 formed at the tip end sides of the upper piece 66*a* and the lower piece 66*b* are adapted to escape magnetic force generated at the tip end sides of the magnets 67*a* and 67*b*. Also, the second projected portions 322 and 324 formed at the side edge sides of the upper piece 66*a* and the lower piece 66*b* are adapted to escape magnetic force generated at the side edge sides of the magnets 67*a* and 67*b*. The first Hall element 94 that detects the position of the first direction X is provided between the first projected portions 321 and 323 in a non-contact state. Then, the second Hall element 95 that detects the position of the second direction Y is provided between the second projected portions 322 and 324 in a non-contact state.

The second moving frame 52A is formed as a frame body which is shaped as a C-like frame body in planar shape. The second main bearing portion 71 formed of the two bearing pieces 71*a* and 71*b* is provided at the opening side of the second moving frame 52A. Projected portions of both ends of the first main guide shaft 63 fixed to the first moving frame 51A are slidably inserted into the two bearing pieces 71*a* and 71*b* and thereby rotatably supported thereto. Also, the first sub guide shaft 65 is supported to the second moving frame 52A at its side opposite to the second main bearing portion 71. The direction in which the first sub guide shaft 65 is extended is set to the second direction Y in this embodiment and the third main bearing portion 75 is provided at one side of the second moving frame 52A in the direction parallel to the above-mentioned direction. The third main bearing portion 75 is provided at one side of the second moving frame 52A and the third sub bearing portion 76 is provided at the other side of the second moving frame 52A.

The second main guide shaft 77 is penetrated into the third main bearing portion 75 and the second main guide shaft 77 is fixed to the third main bearing portion 75 at its middle portion by press fitting. The bearing groove 78 opened in the lateral direction is provided on the third sub bearing portion 76 and the second sub guide shaft 79 is slidably engaged with the bearing groove 78.

The fixed base 53A is shaped as substantially a cross-like fixed base having projected portions provided at four portions of the circular central portion and it includes the moving frame supporting portion 53a and the coil supporting portion 53b integrally provided as one body with the moving frame supporting portion 53a. The fourth main bearing portion 82 formed of the two bearing pieces 82a and 82b is provided at one side edge portion of this fixed base 53A and the fourth sub bearing portion 83 formed of the two bearing pieces 83a and 83b is provided at the other side edge portion opposing one side edge portion of the fixed base 53A. Projected portions of both ends of the second main bearing guide shaft 77 of the second moving frame 52A are slidably inserted into the two bearing pieces 82a and 82b of the fourth main bearing portion 82 and thereby rotatably supported thereto. Also, both end portions of the second sub guide shaft 79 are fixed to the two bearing pieces 83a and 83b of the fourth sub bearing portion 83 and thereby supported at both ends. Further, a positioning hole 312 that may properly position the fixed base 53A and the first moving frame 51A is bored on the fixed base 53A.

In this embodiment, the direction in which the fourth main bearing portion 82 and the fourth sub bearing portion 83 are opposed to each other is set to the second direction Y. The two Hall elements 94 and 95 and a driving coil (not shown) are provided at one side of the direction perpendicular to this second direction Y. A recess dented portion 330, which is opened in the upper surface and the lateral direction, is provided on the coil supporting portion 53b which is one side of the fixed base 53A in which the two Hall elements 94 and 95 and the driving coil (not shown) are located. The flexible printed circuit board 87 is fixedly supported to the right and left side edge portions surrounding this recess dented portion 330, and the two Hall elements 94 and 95 and the driving coil (not shown) are fixed to predetermined positions of the flexible printed circuit board 87.

In the state in which the first moving frame 51A and the fixed base 53A are properly located at the predetermined positions, the two Hall elements 94 and 95 are located in such a manner that the centers of the detecting portions of the two Hall elements 94 and 95 may overlap with the edge portions of the two flat surfaces which form the reference positions of the magnets 67a and 67b. That is, the first Hall element 94 is located in such a manner that its central portion may cross the edge portions of the tip end sides of the magnets 67a and 67b. Then, the second Hall element 95 is located in such a manner that its central portion may cross the edge portions of one side edge sides of the magnets 67a and 67b.

It is possible to easily and positively position the first moving frame 51A and the fixed base 53A by inserting reference pins (not shown) into the positioning holes 311 and 312 so that the first moving frame 51A and the fixed base 53A may be fixed temporarily.

As shown in FIGS. 38 to 41, the image stabilizer 301 differs from the image stabilizer 300 shown in the above-described embodiment in that the magnets 67a and 67b and the two Hall elements 94 and 95 of the image stabilizer 300 are replaced with each other to thereby construct a driver as a moving Hall element (moving coil) system driver. In this image stabilizer 301, elements and parts identical to those of the image stabilizer 300 are denoted by identical reference numerals and therefore need not be described.

The image stabilizer 301 includes the first moving frame 51B, the second moving frame 52A and the fixed base 53B. The first moving frame 51B includes the annular lens fixed portion 51a and the coil fixed portion 51c integrally formed as one body with the lens fixed portion 51a. The two Hall elements 94 and 95 and a coil (not shown) are fixed to the coil fixed portion 51c. The two Hall elements 94 and 95 and the coil (not shown) are mounted on the flexible printed circuit board 87 and they are fixed to the coil fixed portion 51c through the flexible printed circuit board 87. The arrangement of the second moving frame 52A is similar to that of the above-described embodiment.

While the fixed base 53B has an external appearance shape substantially similar to that of the above-described fixed base 53A, since the flexible printed circuit board 87 is projected in the lateral direction, the recess dented portion 331 of the fixed base 53B is slightly different in shape. Specifically, the recess dented portion 331 of the fixed base 53B is opened in the lateral direction in addition to the upper direction and the front direction and the yoke 66 is housed within this recess dented portion 331. The yoke 66 is not changed in shape and structure but it is different in that its attaching direction is changed 90 degrees in the lateral direction.

The yoke 66 is provided with four projected portions 321, 322 and 323, 324. The two projected portions 321 and 323 provided at one side edges are for use with the first Hall element 94 to detect the first direction X and the two projected portions 322 and 324 provided at the tip ends are for use with the second Hall element 95 to detect the second direction Y. A rest of arrangement is similar to that of the embodiment shown in FIGS. 34 to 37.

FIGS. 42A to 42D are diagrams used to explain relationships between the two Hall elements 94, 95 and the magnets 67a, 67b (or the yoke 66). Specifically, FIGS. 42A and 42B are diagrams used to explain relationships between the projected portions 322, 324 of the yoke 66 and the moving direction of the Hall element 95. The upper piece 66a and the lower piece 66b of the yoke 66 have the projected portions 322 and 324 formed at their positions opposing to the upper and lower direction. The central portion of the edge portion of the upper piece 66a (this relationship applies for the lower piece 66b as well) that is the central portion of the base portion side of each of the projected portions 322 and 324 is set to be a reference point O2. The second Hall element 95 is properly positioned relative to the magnets 67a and 67b by adjusting the position in such a manner that the central portion of the detecting portion of the second Hall element 95 is faced to this reference point O2.

On the other hand, in the embodiment shown in FIG. 42, the first Hall element 94 has the arrangement in which the projected portions need not be provided, which will be described in detail later on. As shown in FIGS. 42C and 42D, the first Hall element 94 is located in such a manner that one edge portion, perpendicular to the edge portion detected by the second Hall element 95, of the magnets 67a and 67b may cross the central portion of the first Hall element 94. The reason that the manners in which the first and second Hall elements 94 and 95 are used are different will be described below.

FIG. 45 is a diagram showing the manner in which strength of magnetic force received by the Hall elements 94 and 95, which pass the magnets 67a and 67b in the cross-sectional direction, from the magnets 67a and 67b is changed depending on the positions of the Hall elements 94 and 95. A magnetic flux density received by the Hall elements 94 and 95 is changed depending on the positions of the Hall elements 94 and 95 as shown by a solid line R in FIG. 45. A magnetic flux density is held at a high value and it is changed relatively gently in the central portions of the magnets 67a and 67b, and it is changed substantially linearly (proportionally) in a range from a portion a little ahead of the edge portion to a portion a little behind the edge portion. Then, when the Hall elements 94 and 95 are considerably displaced from the magnets 67a and 67b, the change of the magnetic flux density is returned gently and decreased to zero.

As shown in FIG. 45, when an inclination is calculated by differentiating the solid line R, the magnetic flux density received by the Hall elements 94 and 95 becomes a curve shown by a solid line R' and its infection point and the edges of the magnets 67a and 67b are substantially overlapping with each other. Therefore, after the solid line R was measured by the Hall elements 94 and 95, when the solid line R' is calculated by differentiating the measured value, the first Hall element 94 can be properly positioned at the first reference point O1 and the second Hall element 95 can be properly positioned at the second reference point O2 relative to the edges of the magnets 67a and 67b.

Examples in which the Hall elements 94 and 95 are to be positioned properly will be described. First, when the first moving frame 51 and the fixed base 53 are positioned properly, the first moving frame 51 and the fixed base 53 are temporarily fixed by inserting reference pins (not shown) into their positioning holes 311 and 312. Next, in the state in which the optical axis of the correcting lens 15 is made coincident with the optical axis L of the lens system 2, the magnets 67a and 67b (or the first Hall element 94) are moved in such a manner that the first Hall element 94 may be relatively moved in the first direction X and the first reference point O1 may be detected by measuring the above-described solid line R. Similarly, in the state in which the optical axis of the correcting lens 15 is made coincident with the optical axis L of the lens system 2, the magnets 67a and 67b (or the second Hall element 95) are moved in such a manner that the second Hall element 95 may be relatively moved in the second direction Y and the second reference point O2 may be detected by measuring the above-described solid line R.

It is possible to reduce the measuring time by simultaneously moving the two Hall elements 94 and 95 relatively in the first direction X and the second direction Y, that is, by moving the magnets 67a and 67b (or the Hall elements 94 and 95) in the directions with an angle of approximately 45 degrees.

Since the Hall elements 94 and 95 and the magnets 67a and 67b which are moved relatively have the relationships shown in FIG. 45, if a moving distance (movable width) of the Hall elements 94 and 95, for example, is taken as Q, when the movable width Q from a point P1 to a point P2 or the movable width Q from a point P3 to a point P4 is used as a detecting width, then a change of its magnetic flux density Δ is small (Δ is small) so that it becomes difficult to accurately detect the change of the magnetic flux density. On the other hand, when the movable width Q from the point P2 to the point P3 is used as a detecting width, the change of the magnetic flux density Δ is large (Δ is large) and it becomes possible to accurately detect a change of the magnetic flux density. In addition, the magnetic flux density Δ is changed substantially linearly and hence it becomes possible to closely and accurately control positions.

The present invention may use such characteristics. Alignment may be made when the edge portions of the magnets 67a and 67b are detected by the Hall elements 94 and 95 and hence positions can be detected with higher accuracy.

FIGS. 46A to 46C are diagrams showing the manner in which strength of magnetic force received by the Hall elements 94 and 95, which pass parallelly the portions near the edges of the upper piece 66a and the lower piece 66b of the yoke 66, from the magnets 67a and 67b changes depending on the positions of the Hall elements 94 and 95. FIG. 46A shows strength of magnetic force received by the second Hall element 95 when the yoke 66 is not provided with the two projected portions 322 and 324. FIG. 46B shows strength of magnetic force received by the second Hall element 95 when the yoke 66 is provided with the two projected portions 322 and 324. FIG. 46C shows strength of magnetic force received by the first Hall element 94 from the magnets 67a and 67b when the first Hall element 94 is moved on the side of the long side of the yoke 66.

Specifically, the reason that the yoke 66 is provided with the projected portions 321 and 322 (321 to 324) is as follows. As shown in FIG. 42C, in the case of the first Hall element 94, since the edge portions of the magnets 67a and 67b with respect to the second direction Y which is the relative moving direction of the first Hall element 94 are sufficiently long, even when the first Hall element 94 is moved relatively a certain distance, strength of magnetic force received by the first Hall element 94 from the magnets 67a and 67b is not changed much.

On the other hand, if the edge portions of the magnets 67a and 67b with respect to the first direction X which is the relative moving direction of the second Hall element 95 are short as in the case of the second Hall element 95, then even when the second Hall element 95 is moved very slightly, the second Hall element 95 unavoidably approaches the ends of the edge portions of the magnets 67a and 67b. Thus, as shown in FIG. 46A, when the second Hall element 95 approaches the ends of the edge portions of the magnets 67a and 67b, magnetic force from the magnets 67a and 67b is decreased so that strength of magnetic force received by the second Hall element 95 from the magnets 67a and 67b is changed. As a result, even when the second Hall element 95 is moved relatively in the first direction X, the output is changed as if the second Hall element 95 were moved in the second direction Y, thereby making it difficult to accurately detect the position.

The yoke 66 is provided with the projected portions 321, 322 (321 to 324) in order to solve the above-mentioned problem. Since the yoke 66 is provided with the projected portions 321 to 324, it is possible to aggressively escape the magnetic flux to the projected portions 321, 322 (321 to 324). Therefore, as shown in FIG. 46B, the magnetic flux density near the centers of the magnets 67a and 67b can be decreased and the output from the second Hall element 95 which detects the position in the second direction Y within the moving range of the first direction X can be kept substantially uniform. As a result, it is possible to considerably decrease mutual interference between the first and second Hall elements 94 and 95.

FIGS. 43A, 43B and FIGS. 44A, 44B are diagrams showing results obtained when magnetic flux density of the Hall element was measured in the state in which the yoke 66 is provided with or the yoke 66 is not provided with the projected portions 321, 322 (321 to 324), which leads to the detected result of the second Hall element 95 shown in FIG. 42C. Also, FIGS. 43B and 44B are diagrams showing results obtained when magnetic flux density of the Hall element was measured in the state in which the yoke 66 is not provided with the projected portions 321, 322 (321 to 324), which leads to the detected result of the second Hall element 95 shown in FIG. 42C. In the respective sheets of drawings, a point 0 denotes a reference position and the point O2 corresponds to the reference point in the second Hall element 95. Then, values detected at positions moved 0.2 mm each from respective reference points to the first direction X and the second direction Y are shown in respective tables and graphs.

The unit of each value is gauss ($G=10^{-4}$ $Wb/m^2$).

Also, the equation of the magnetic flux density Δ is as follows:

magnetic flux density Δ=Hall element output/moving distance

As described above, according to the image stabilizer, the lens apparatus and the imager apparatus of the present invention, since outputs from the Hall elements are detected by moving the Hall elements or the magnets, the Hall elements and the magnets are properly positioned based on the detected results and they are fastened by an adhesive and the like, the Hall elements and the magnets can be properly positioned comparatively easily with high accuracy. Hence, productivity of this kind of image stabilizer can be improved. Also, according to the image stabilizer manufactured by the present invention, since one set of magnetic circuit member formed of the magnets and the yoke serves as the magnetic circuit for the first driver and the magnetic circuit for the second driver as well, the number of the parts can be decreased, the image stabilizer itself can be made compact in size and made light in weight. As a result, the lens apparatus on which the image stabilizer of the present invention is mounted and the whole of the imager apparatus including the lens apparatus can be made compact in size and made light in weight.

Also, since the magnets to construct the magnetic circuit member serve as the magnet for the first position detector (first Hall element 94) to detect the position of the first guide (first moving frame 51) and the magnet for the second position detector (second Hall element 95) to detect the position of the second guide (second moving frame 52) as well, much more reduction of the number of the parts can be realized. Further, since the first and second Hall elements are mounted on one substrate, the spaces required to locate the first and second Hall elements can be decreased and hence the image stabilizer can be made much smaller in size.

Further, since the coil assembly body including the two coils, the flexible printed circuit board for supplying electric power to the two coils and the like is fixed to the fixed base and the yoke and the magnets are fixed to the first moving frame, thrust generated by the supply of an electric current to the coils can act on the yoke and the sides of the magnets to thereby make it possible to move the correcting lens. As a result, the flexible printed circuit board connected to the coil assembly body can be fixed to the constant place and the space necessary for moving the flexible printed circuit board need not be maintained so that the apparatus can be miniaturized. In addition, since the correcting lens is not moved in unison with the flexible printed circuit board, a magnitude of thrust to move the correcting lens need not be large enough to bend the flexible printed circuit board and hence power consumption of the image stabilizer can be reduced.

Also, since the lens apparatus is constructed as the collapsible system lens so that light passed through the objective lens is bent 90 degrees by the prism and introduced into the correcting lens (five-group lens) of the image stabilizer, when the imager apparatus is placed in the positive attitude, the correcting lens becomes parallel to the ground so that the first direction and the second direction, which are the moving direction of the correcting lens, and the direction in which gravity acts become perpendicular to each other. As a result, since the first and second moving frames for holding the correcting lens so that the correcting lens can be moved freely are never pulled in the first and second directions by gravity and the first and second moving frames are raised in the opposite direction of gravity and then held, it is not necessary to constantly supply electric power to the image stabilizer. As a consequence, power consumption required when a photographer takes a picture in the state in which the imager apparatus is placed in the positive attitude can be reduced considerably and hence a time in which the imager apparatus can be operated in use can be extended. In addition, since thrust necessary for moving the correcting lens can be decreased, allowance of the weights of the first and second moving frames, that is, camera shake acceleration of about 1 G becomes possible and hence it is possible to cope with movement and vibration of the camera body, such as larger camera shake.

According to an example of the present invention, since the image stabilizer includes the back yoke opposing to the Hall element for detecting the position of the first direction (this relationship can apply for the second direction as well) and the convex portion serving as the projected portion is provided near the outer edge of the opposing yoke to thereby aggressively escape magnetic flux to the projected portion, magnetic flux density near the center of the magnet can be decreased. Also, the output from the Hall element for detecting the position of the first direction within the movement range of the second direction (this relationship can apply for the first direction as well) can be kept nearly uniform. Hence, it is possible to detect positions with high accuracy.

While the example in which the image stabilizer 5 shown in the above-described embodiments uses the moving magnet system actuator in which the two sets of coils 88a, 88b and the coil 91 are fixed, the magnets 67a, 67b and the yoke 66 being made movable has been explained so far, the present invention is not limited thereto. On the contrary, it is needless to say that the above moving magnet type actuator can be constructed as the moving coil system actuator in which the magnets 67a, 67b and the yoke 66 are fixed to the fixed base 53, the two sets of the coils 88a, 88b, the coil 91, the Hall elements 94, 95, the flexible printed circuit board 87 and the flexible reinforcing plate 86 are fixed to the fixed base 53, the coils and the like being made movable together with the correcting lens 15.

The present invention is not limited to the aforementioned embodiments shown in the sheets of drawings and it can be variously modified without departing from the gist of the present invention. For example, while the example in which the digital still camera is applied to the imager apparatus has been described so far in the above-described embodiments, the present invention is not limited thereto and it can be applied to a digital video camera, a personal computer with a built-in camera, a mobile phone with a built-in camera and other imager apparatus. Further, while the example in which the five-group lens is used as the lens apparatus 1 has been described so far, it is needless to say that the present invention can be applied to a lens less than a four-group lens or a lens more than a six-group lens.

It should be understood by those skilled in the art that various modifications, combinations, sub-combinations and alterations may occur depending on design requirements and other factors insofar as they are within the scope of the appended claims or the equivalents thereof.

What is claimed is:

1. An image stabilizer for a lens system having an optical axis, comprising:

a driver having a magnet producing a magnetic force to move a correcting lens in a first direction perpendicular to the optical axis of the lens system and in a second direction perpendicular to the first direction and to the optical axis of the lens system;

a first Hall element detecting, based on the magnetic force, a position of the correcting lens along the first direction;

a second Hall element detecting, based on the magnetic force, a position of the correcting lens along the second direction;

a yoke supporting the magnet and having a first portion which projects beyond an edge of the magnet in the first direction and a second portion which projects beyond an edge of the magnet in the second direction; and a controller controlling the driver such that an optical axis of the correcting lens coincides with the optical axis of the lens system, the first Hall element and the second Hall element being positioned such that the magnetic force is a position reference value when the optical axis of the correcting lens coincides with the optical axis of the lens system.

2. The image stabilizer of claim 1, the driver comprising:

a first coil for moving the correcting lens in the first direction; and a second coil for moving the correcting lens in the second direction, the magnet providing the magnetic force to the first coil and to the second coil jointly.

3. The image stabilizer of claim 2, the first coil and the second coil comprising one or more of flat coils with flat surface windings, cylindrical coils, and laminated flat coils, the first coil fixed to a first surface of a coil support, the second coil fixed to a second surface of the coil support, and a thrust-generating portion of the first coil positioned to cross a thrust-generating portion of the second coil at substantially a right angle, such that the magnetic force acts on the thrust generating portions jointly.

4. The image stabilizer of claim 1, the magnet including a flat body having a first flat surface portion and a second flat surface portion, the first flat surface portion crossing the second flat surface portion at least at a right angle, and the first Hall element and the second Hall element detecting the positions of the correcting lens along the first direction and the second direction based on an edge of the first flat surface portion and an edge of the second flat surface portion, respectively.

5. The image stabilizer of claim 4, wherein the first projecting portion and the second projecting portion are located substantially at a center of the first flat surface portion and at a center of the second flat surface portion, respectively, the first projecting portion is located on the side of the first Hall element at which magnetic flux density increases when the first Hall element is moved in the second direction, and the second projecting portion is located on the side of the second Hall element at which magnetic flux density increases when the second Hall element is moved in the second direction.

6. A lens apparatus, comprising:

a lens system having an optical axis; and an image stabilizer, comprising:

a driver having a magnet producing a magnetic force to move a correcting lens in a first direction perpendicular to the optical axis of the lens system and in a second direction perpendicular to the first direction and to the optical axis of the lens system;

a first Hall element detecting, based on the magnetic force, a position of the correcting lens along the first direction;

a second Hall element detecting, based on the magnetic force, a position of the correcting lens along the second direction;

a yoke supporting the magnet and having a first portion which projects beyond an edge of the magnet in the first direction and a second portion which projects beyond an edge of the magnet in the second direction; and a controller controlling the driver such that an optical axis of the correcting lens coincides with the optical axis of the lens system, the first Hall element and the second Hall element being positioned such that the magnetic force is a position reference value when the optical axis of the correcting lens coincides with the optical axis of the lens system.

7. An imager apparatus, comprising:

a lens system having an optical axis;

a detector for detecting an image collected by the lens system; and an image stabilizer, comprising:

a driver having a magnet producing a magnetic force to move a correcting lens in a first direction perpendicular to the optical axis of the lens system and in a second direction perpendicular to the first direction and to the optical axis of the lens system;

a first Hall element detecting, based on the magnetic force, a position of the correcting lens along the first direction;

a second Hall element detecting, based on the magnetic force, a position of the correcting lens along the second direction;

a yoke supporting the magnet and having a body and a protuberance extending from the body beyond an edge of the magnet in the first direction or in the second direction, the protuberance being narrower than the body; and a controller controlling the driver such that an optical axis of the correcting lens coincides with the optical axis of the lens system, the first Hall element and the second Hall element being positioned such that the magnetic force is a position reference value when the optical axis of the correcting lens coincides with the optical axis of the lens system.

* * * * *